United States Patent [19]

Pesheck et al.

[11] Patent Number: 5,140,121
[45] Date of Patent: * Aug. 18, 1992

[54] MICROWAVE FOOD PRODUCT AND METHODS OF THEIR MANUFACTURE AND HEATING

[75] Inventors: Peter S. Pesheck, Brooklyn Center; William A. Atwell; Madonna M. Krawiecki, both of Andover; George R. Anderson, Minneapolis, all of Minn.

[73] Assignee: The Pillsbury Company, Minneapolis, Minn.

[*] Notice: The portion of the term of this patent subsequent to May 15, 2007 has been disclaimed.

[21] Appl. No.: 685,897

[22] Filed: Apr. 15, 1991

Related U.S. Application Data

[63] Continuation of Ser. No. 85,125, Aug. 13, 1987, Pat. No. 5,008,507, which is a continuation-in-part of Ser. No. 903,007, Sep. 2, 1986, Pat. No. 4,926,020.

[51] Int. Cl.$^5$ ............................................. H05B 6/80
[52] U.S. Cl. ..................... 219/10.55 E; 219/10.55 M; 426/107; 426/234
[58] Field of Search ................. 219/10.55 E, 10.55 F, 219/10.55 M, 10.55 R, 10.55 D; 426/107, 113, 241, 234, 243, 112, 114, 115; 99/451, DIG. 14

[56] References Cited

U.S. PATENT DOCUMENTS

| | | | |
|---|---|---|---|
| Re. 30,310 | 6/1980 | Stenstrom | 219/10.55 M |
| Re. 30,780 | 10/1981 | Stenstrom | 219/10.55 M |
| 2,485,659 | 10/1949 | Robertson | 99/217 |
| 2,495,435 | 1/1950 | Welch | 99/221 |
| 2,600,566 | 6/1952 | Moffett | 99/221 |
| 2,714,070 | 7/1955 | Welch | 99/221 |
| 2,856,497 | 10/1958 | Rudenberg | 219/10.55 |
| 3,256,101 | 6/1966 | Arns | 99/221 |
| 3,271,169 | 9/1966 | Baker et al. | |
| 3,458,700 | 7/1969 | Kohashi | 250/71 |
| 3,666,836 | 5/1972 | Forster | 174/36 |
| 3,809,844 | 5/1974 | Stenstrom | 219/10.55 |
| 3,809,845 | 5/1974 | Stenstrom | 219/10.55 |
| 3,865,301 | 2/1975 | Pothier et al. | 229/14 H |
| 3,983,256 | 9/1976 | Norris et al. | 426/107 |

(List continued on next page.)

FOREIGN PATENT DOCUMENTS

| | | |
|---|---|---|
| 0024605 | 3/1981 | European Pat. Off. |
| 0155760 | 9/1985 | European Pat. Off. |
| WO8605072 | 9/1986 | PCT Int'l Appl. |
| 2201070A | 8/1988 | United Kingdom |

OTHER PUBLICATIONS

Best, *Microwave Formulation: A New Wave of Thinking*, Prepared Foods, Oct. 1987 at 70.

R. Colin, *Field Theory of Guided Waves*, Chap. 3 (McGraw/Hill Book Co. 1960).

R. Decareau & R. Mudgett, *Microwaves in the Food Processing Industry*, Chap. 4 (Academic Press Inc. 1985).

Freedman, *The Microwave Cooks Up a New Way of Life*, Wall St. J., Sep. 19, 1989.

Krul, Attema & de Haan, *Modelling of Microwave Heat-*

(List continued on next page.)

*Primary Examiner*—Philip H. Leung
*Attorney, Agent, or Firm*—Arnold, White & Durkee

[57] ABSTRACT

Methods and food product structures are provided for controlling heating of multi-component foods in a microwave oven. The structures and methods include the use of a layer of edible substance with preselected properties and positioned adjacent to one or more food items to control the amount of transmitted microwave power to the adjacent food. One or more layers of edible substance has properties selected in relation to the other food substance such that effective shielding or control is achieved which will reliably control the heating of the components of the food product in the time required for heating one or more portions of the multi-component food product. With preselected values for thickness and dielectric properties of one or more layers and the thermal masses of the layers and the other components, the amount of energy transmitted to one or more of the food components and its final temperature can be effectively and reliably controlled.

23 Claims, 49 Drawing Sheets

U.S. PATENT DOCUMENTS

| | | | |
|---|---|---|---|
| 3,985,991 | 10/1976 | Levinson | 219/10.55 E |
| 3,987,267 | 10/1976 | Moore | 219/10.55 E |
| 4,015,085 | 3/1977 | Woods | 219/10.55 E |
| 4,027,384 | 6/1977 | Connolly et al. | 29/592 |
| 4,038,660 | 7/1977 | Connolly et al. | 343/18 A |
| 4,081,646 | 3/1978 | Goltsos | 219/10.55 E |
| 4,082,413 | 4/1978 | Austin et al. | 350/1.1 |
| 4,103,431 | 8/1978 | Levinson | 34/4 |
| 4,122,324 | 10/1978 | Falk | 219/10.55 E |
| 4,133,896 | 1/1979 | Standing et al. | 426/107 |
| 4,144,435 | 3/1979 | Clark et al. | 219/10.455 E |
| 4,154,855 | 5/1979 | Buck | 426/243 |
| 4,190,757 | 2/1980 | Turpin et al. | 219/10.55 E |
| 4,230,924 | 10/1980 | Brastad et al. | 219/10.55 E |
| 4,233,325 | 11/1980 | Slangan et al. | 426/107 |
| 4,267,420 | 5/1981 | Brastad | 219/10.55 E |
| 4,283,427 | 8/1981 | Winters et al. | 426/107 |
| 4,342,788 | 8/1982 | Clatfelter | 426/243 |
| 4,351,997 | 9/1982 | Mattisson et al. | 219/10.55 E |
| 4,390,554 | 6/1983 | Levinson | 426/232 |
| 4,390,555 | 6/1983 | Levinson | 426/234 |
| 4,518,618 | 5/1985 | Hsia et al. | 426/262 |
| 4,520,250 | 5/1985 | Ishihara et al. | 219/10.55 B |
| 4,641,005 | 2/1987 | Seiferth | 219/10.55 E |
| 4,642,434 | 2/1987 | Cox et al. | 219/10.55 E |
| 4,777,053 | 10/1988 | Tobelmann et al. | 426/107 |
| 4,789,552 | 12/1988 | Speakman et al. | 426/107 |
| 4,794,008 | 12/1988 | Schmidt et al. | 426/234 |
| 4,926,020 | 5/1990 | Atwell et al. | 219/10.55 E |
| 5,008,507 | 4/1991 | Pesheck et al. | 219/10.55 E |

OTHER PUBLICATIONS

*ing Processes*, Digest Microwave Power Symposium 77 (1978).

A. Metaxas & R. Meredith, *Industrial Microwave Heating* 78 (Peter Peregrinus Ltd. 1983).

Mudgett, *Electrical Properties of Foods in Microwave Processing*, Food Technology, Feb. 1982 at 109.

Ofoli and Komolprasert, On the Thermal Modeling of Foods in Electromagnetic Fields, 12 Journal of Food Processing and Preservation 219 (1988).

O'Meara, *Using Science for Consumer Products: An Ismi--CAS Connection?*, 9(6) Microwave World 6 (1988).

Roebuck, et al., *Dielectric Properties of Carbohydrate-Water Mixtures at Microwave Frequencies*, 37 Journal of Food Science 199 (1972).

Rubbright, *Microwave Technology & Food Science: Where Are They in the Market Place*, 9(6) Microwave World 12 (1988).

Taokis, et al., Mathematical Modeling of Microwave Thawing by the Modified Isotherm Migration Method, 52 Journal of Food Science 455 (1987).

De Wagter, *Computer Simulation Predicting Temperature Distributions Generated by Microwave Absorption in Multilayered Media*, 19(2) Journal of Microwave Power 97 (1984).

De Wagter et al., *Microwave Absorption in Multilayered Media Due to Bilateral Illumination*, 1983 Microwave Power Symposium Proceedings 18.

De Wagter et al., *Microwave Heating of Laminated Materials*, Digest Microwave Power Symposium 225 (1981).

Wei, et al., *Heat and Mass Transfer in Water-Laden Sandstone: Microwave Heating*, 31 AIChE Journal 842 (1985).

Mudgett, *Microwave Properties and Heating Characteristics of Foods*, Food Technology, pp. 84–93 (Jun. 1986).

*Aluminum Foil Containers for Microwave Oven Use*, International Microwave Power Institute, pp. 8–12 (Sep. 17, 18 & 19, 1984).

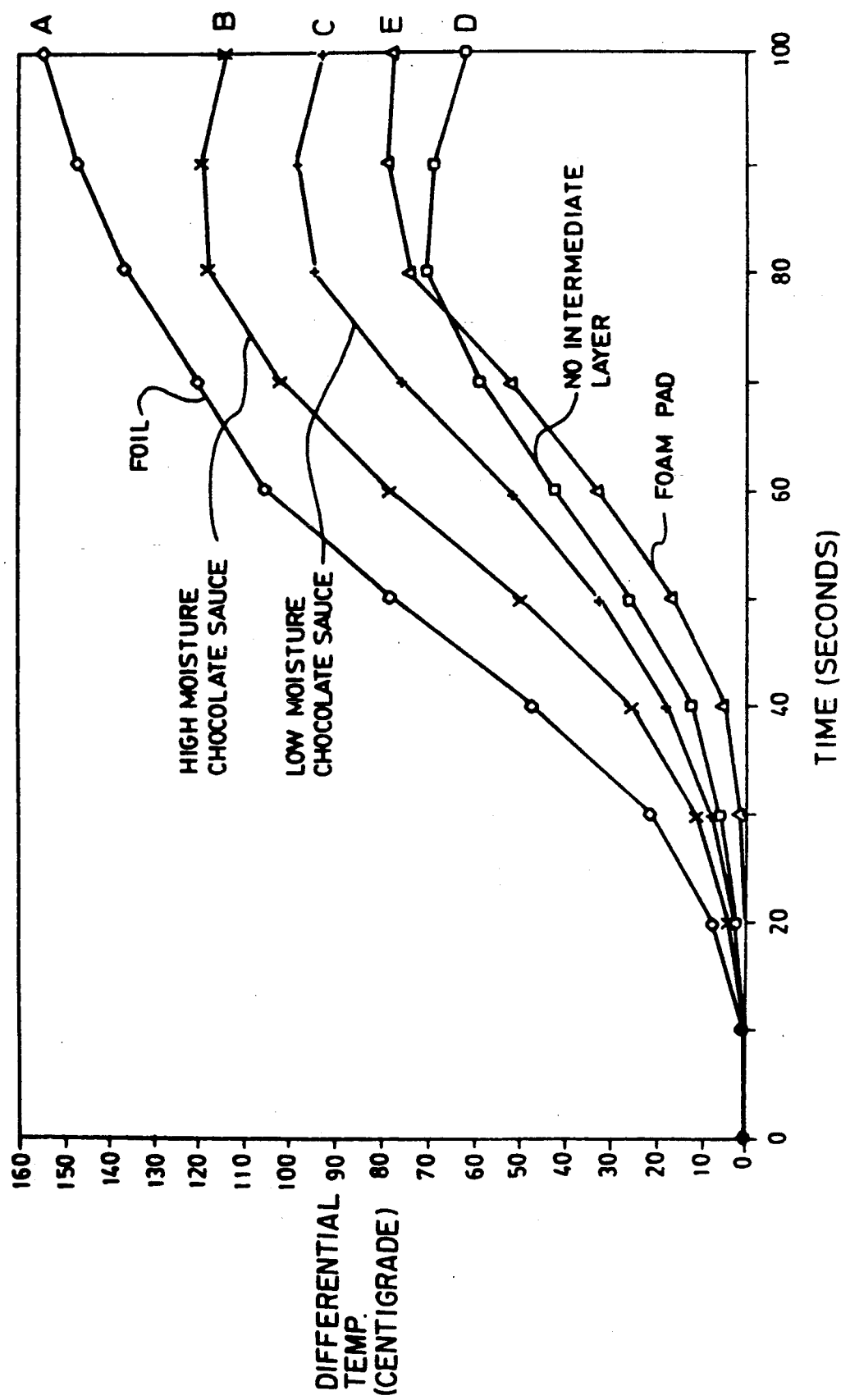

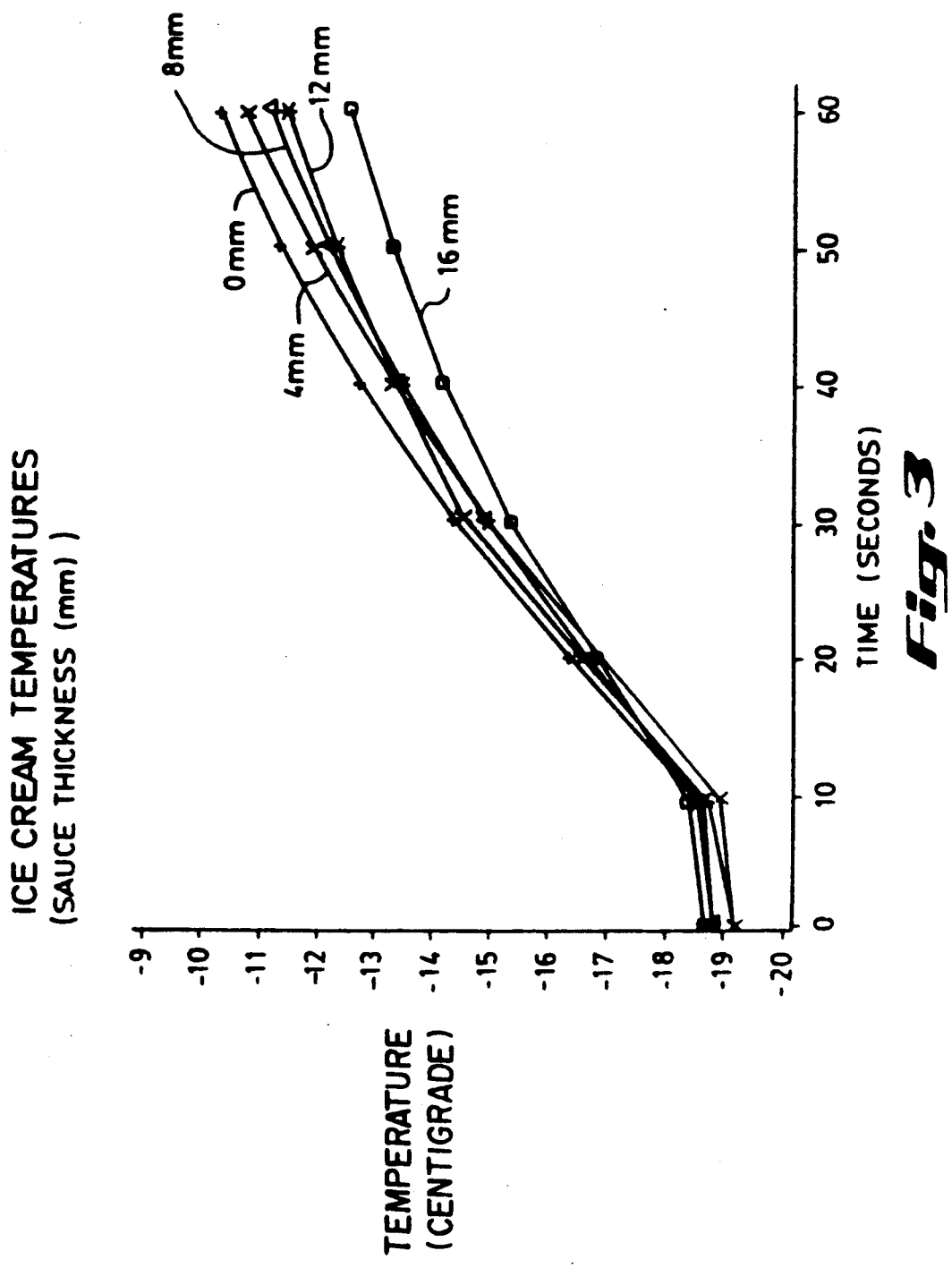

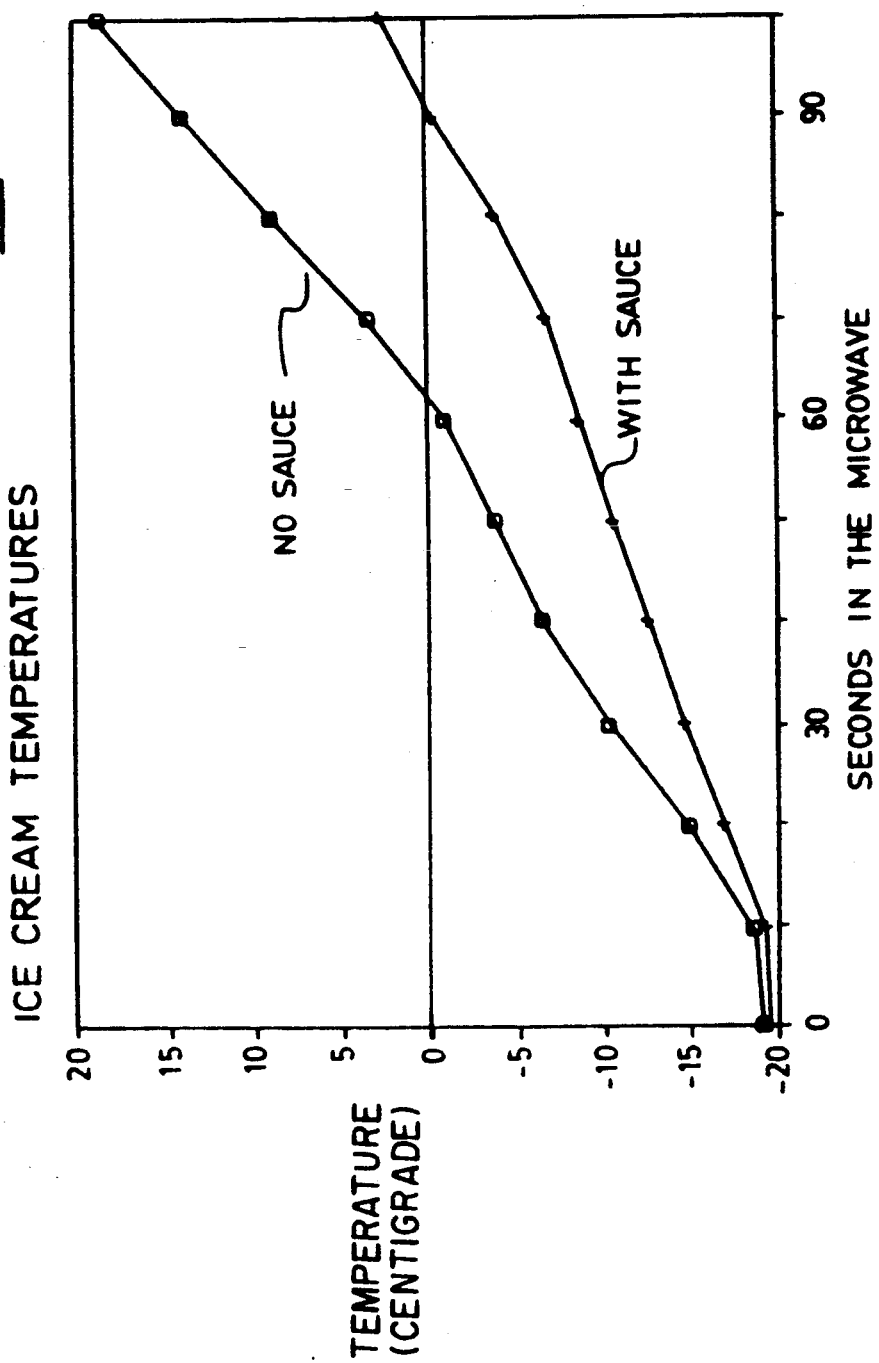

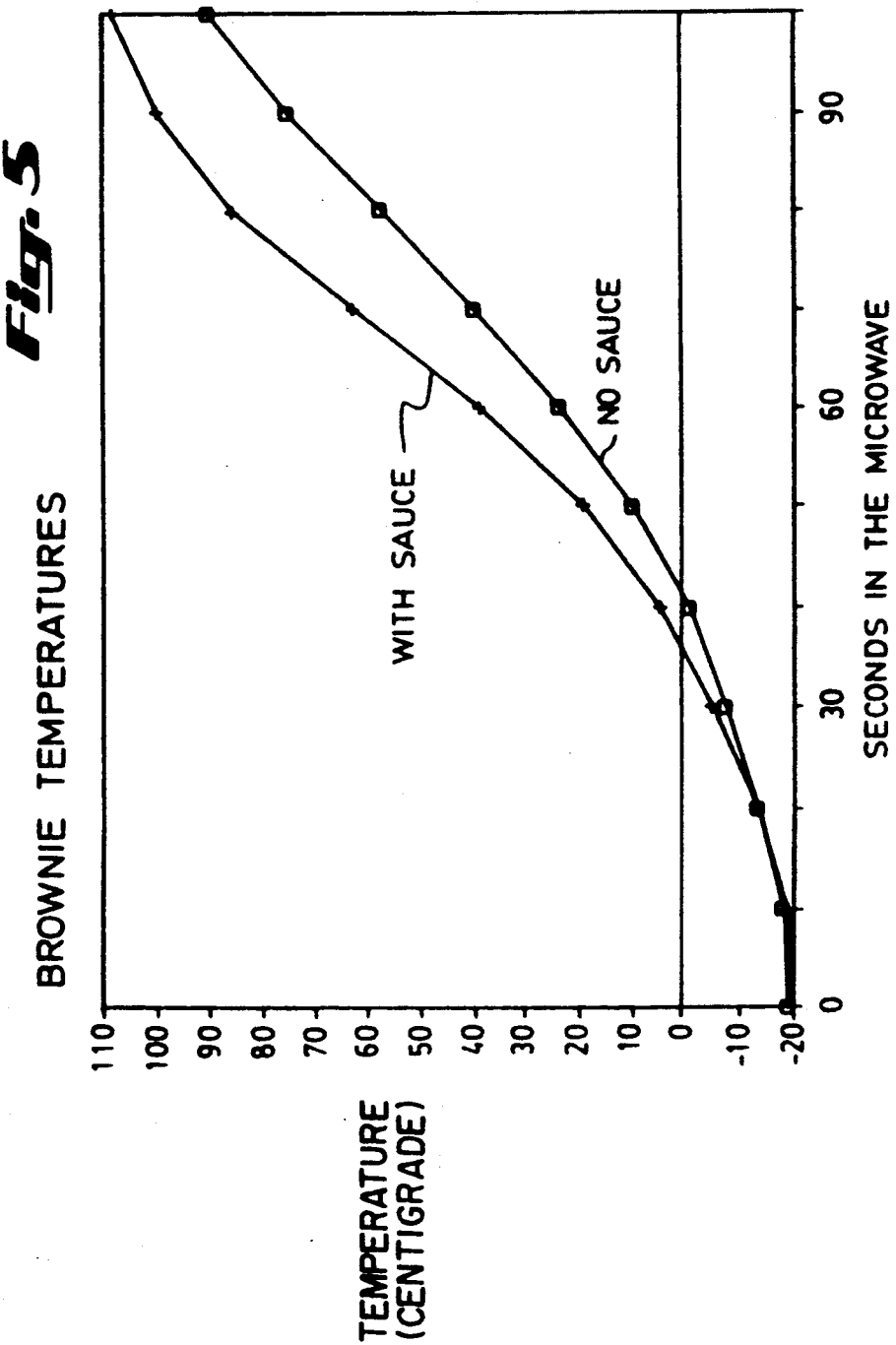

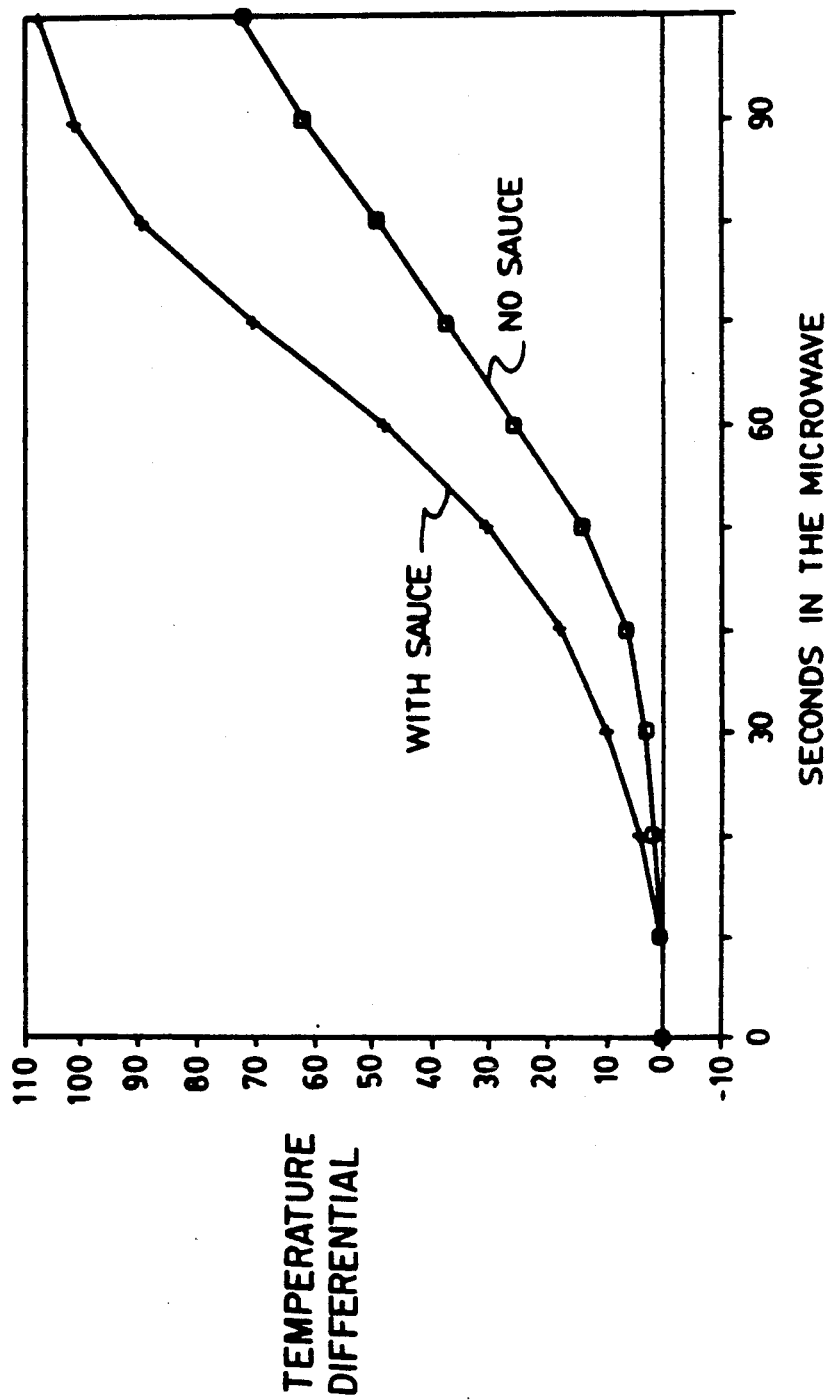

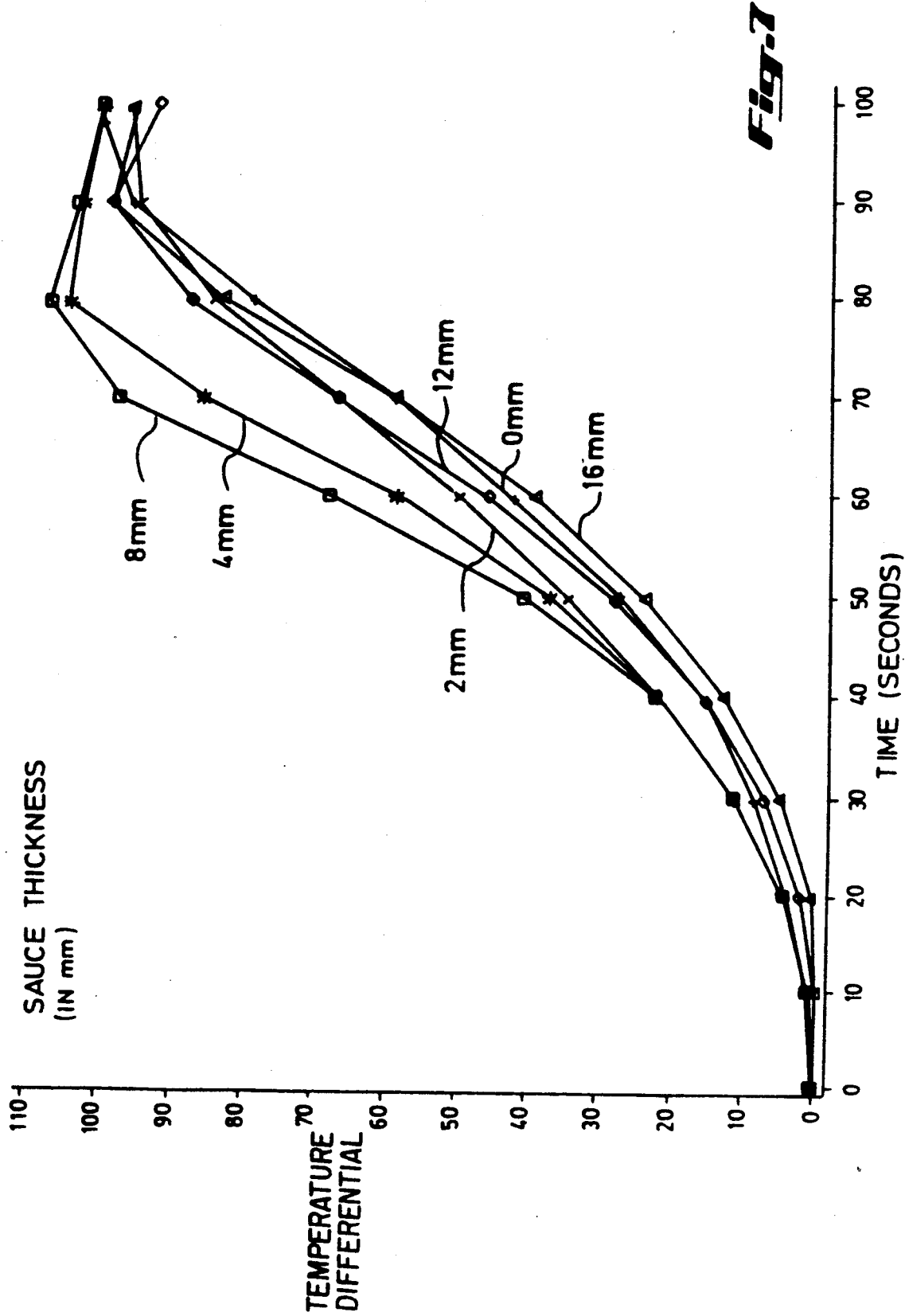

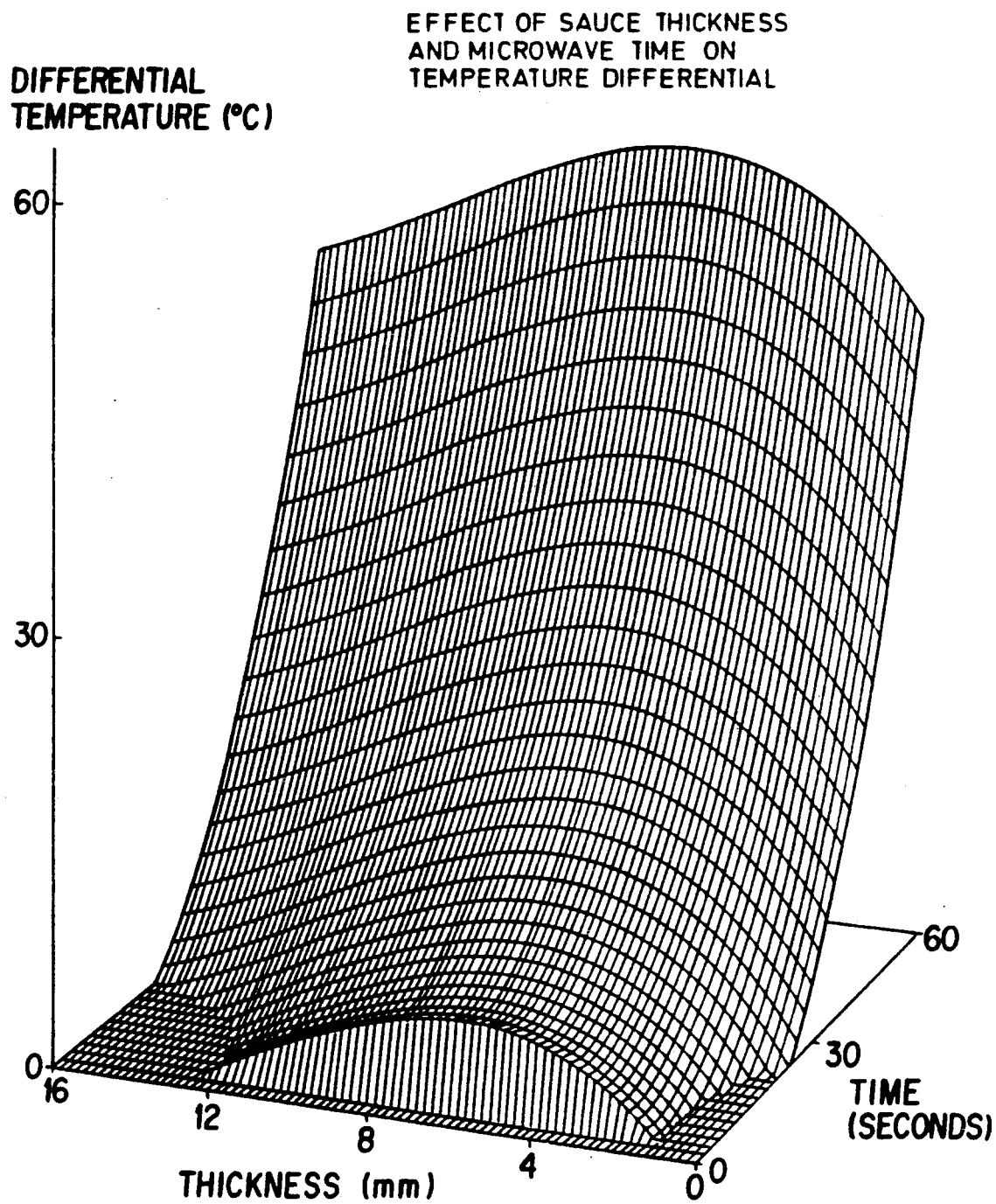

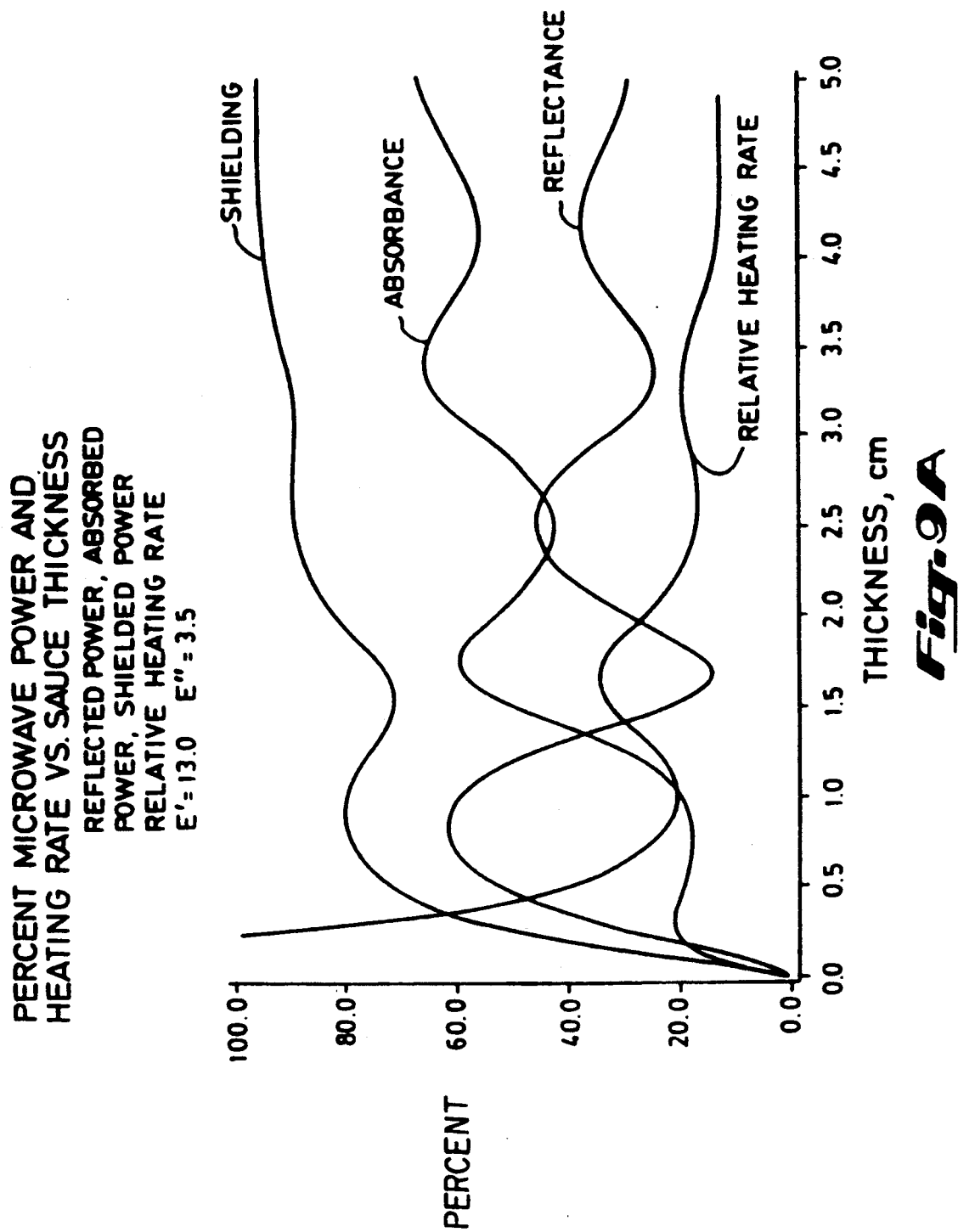

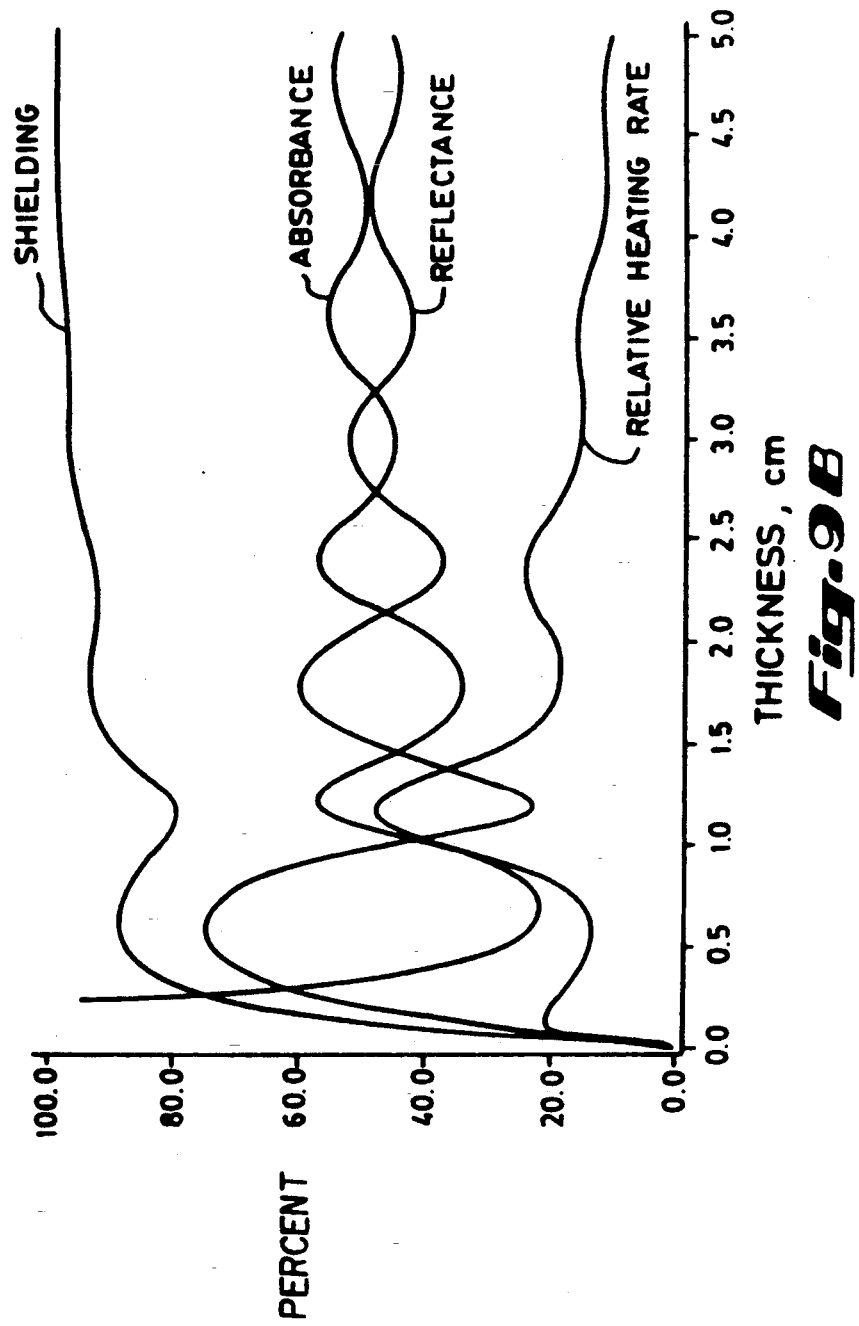

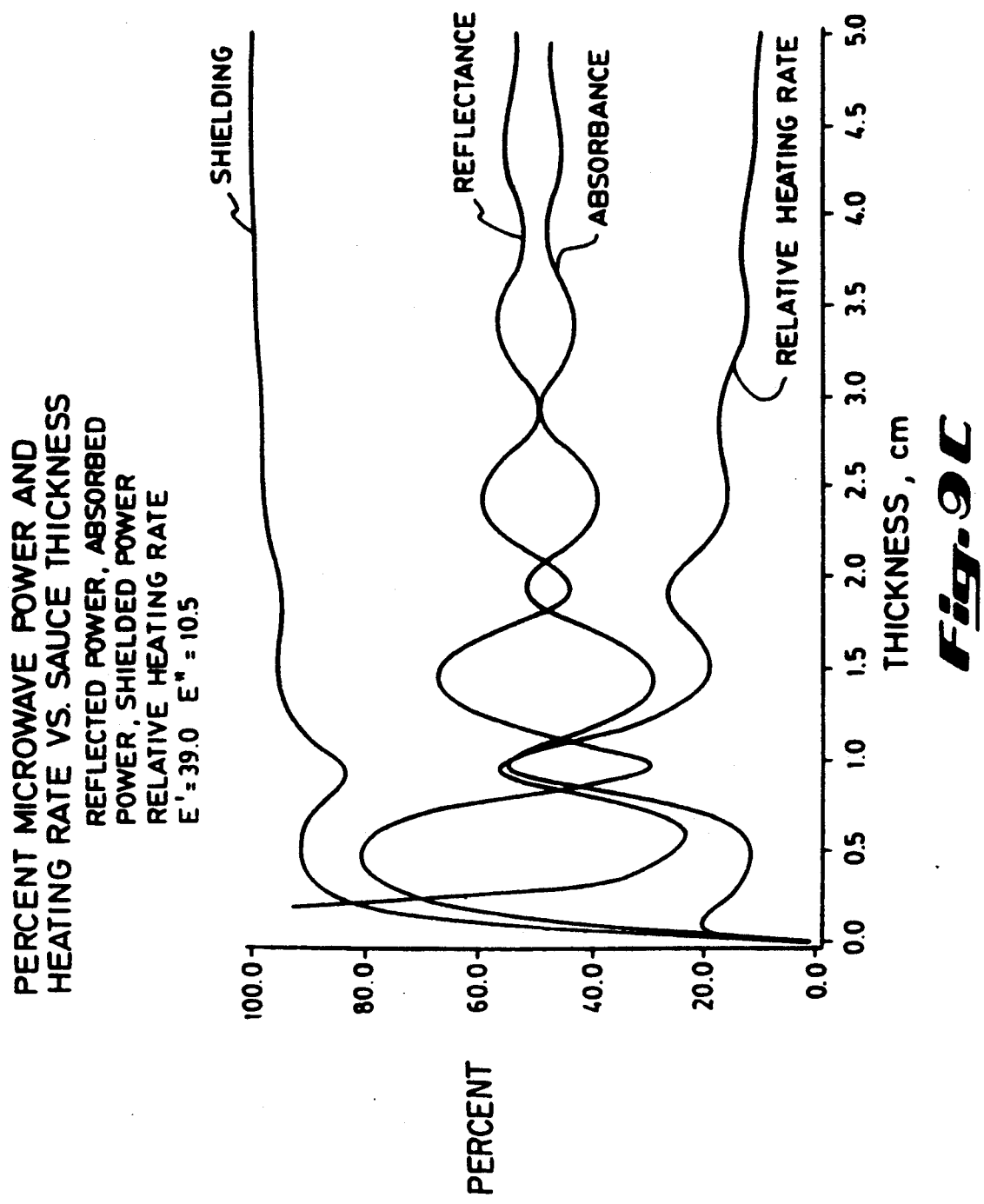

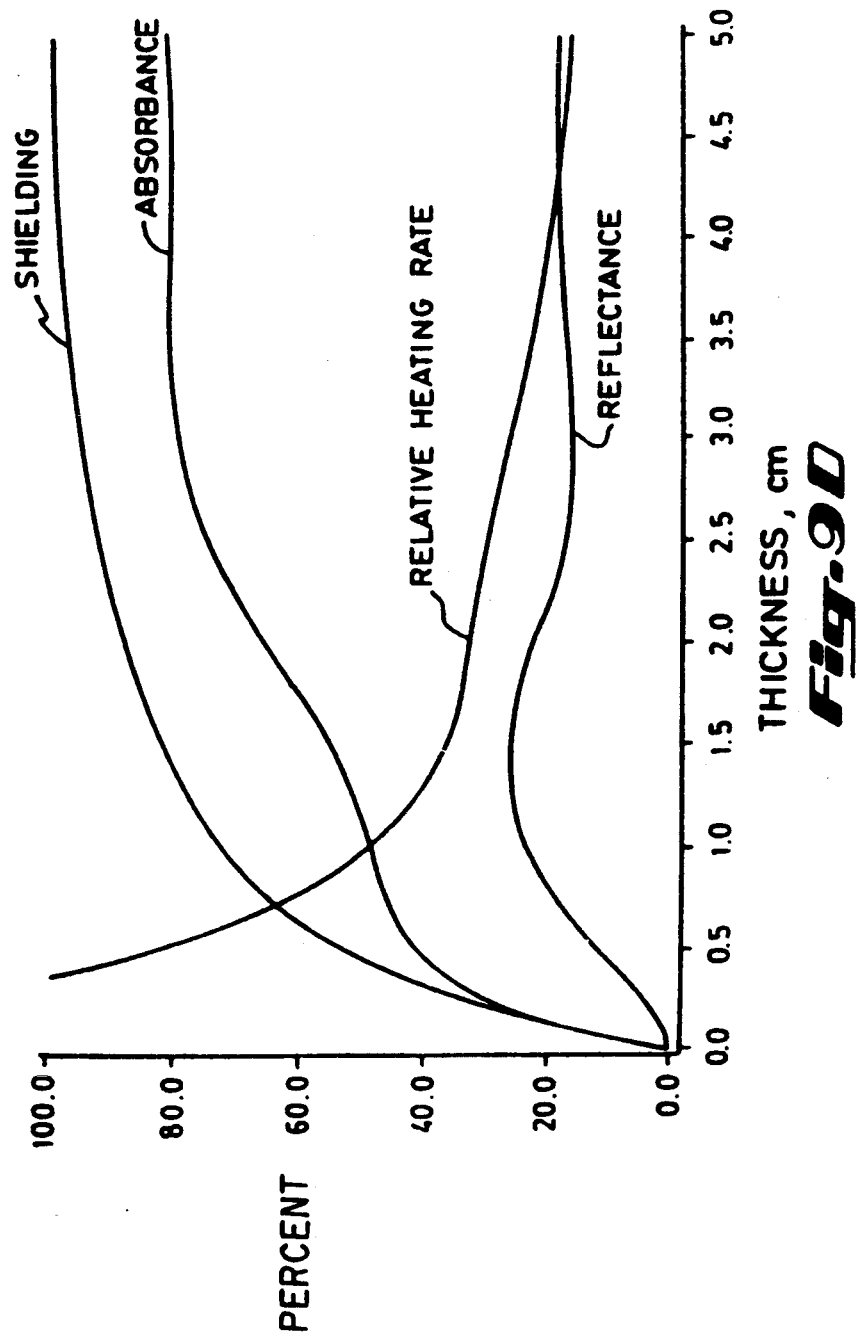

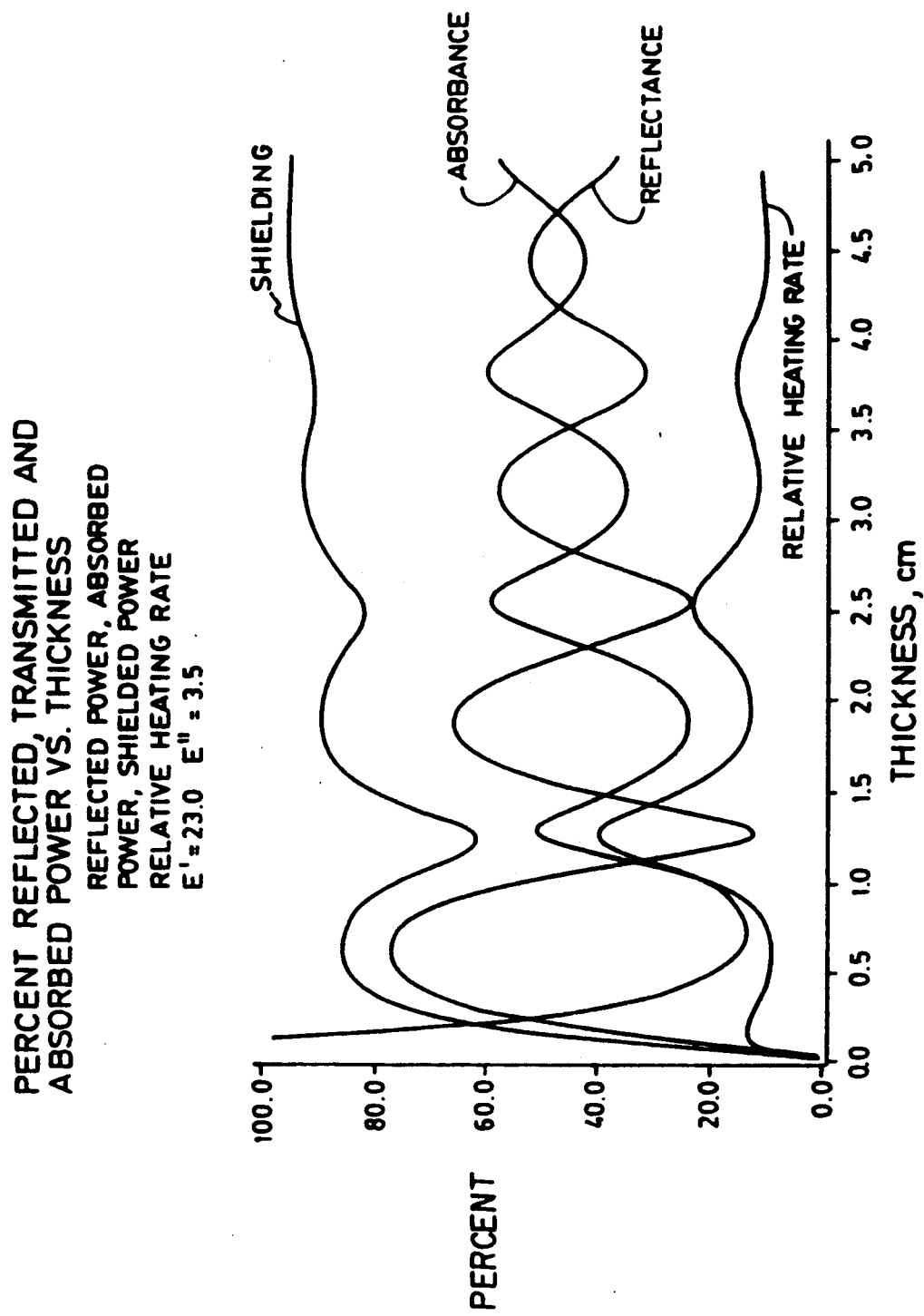

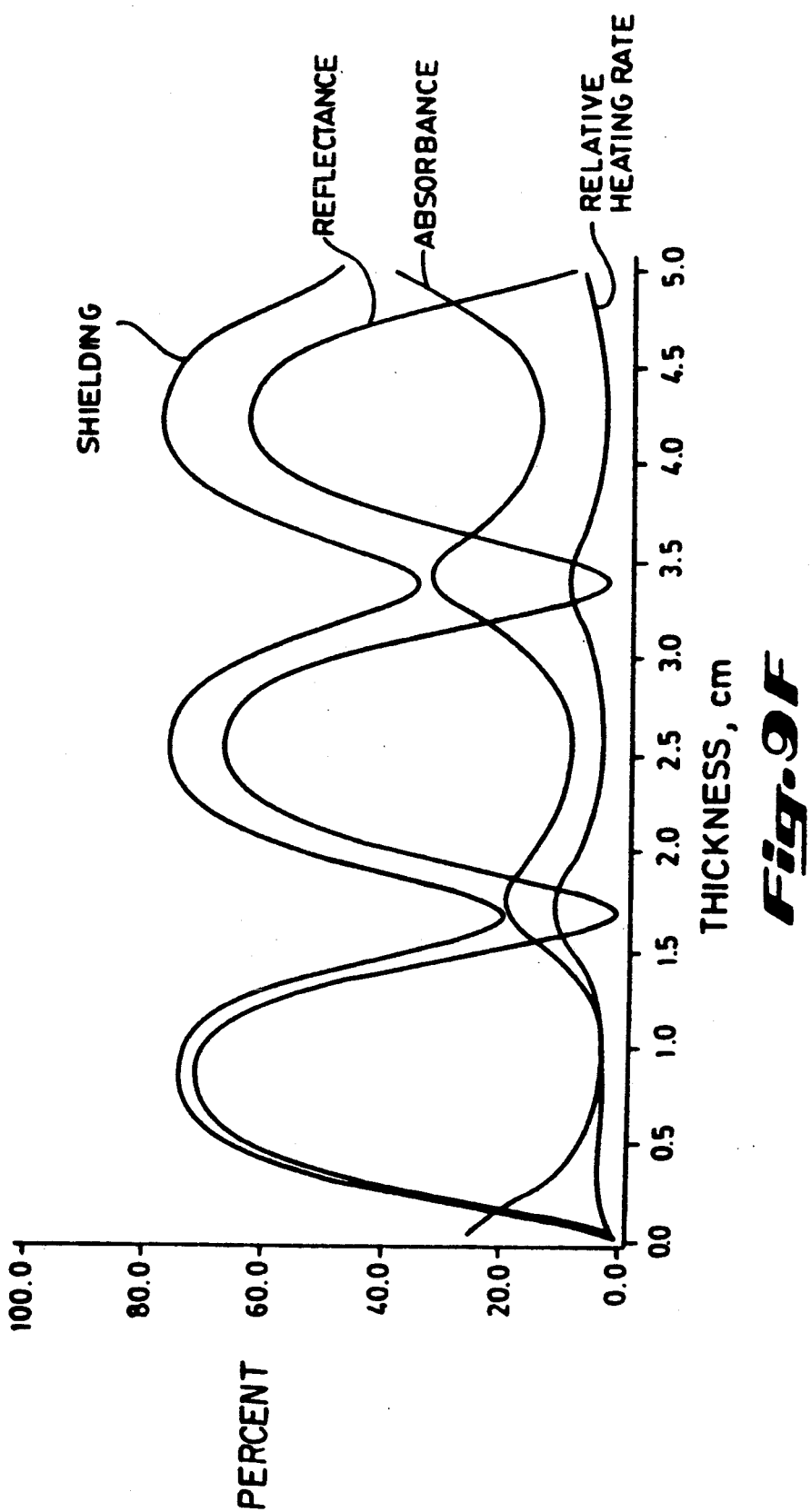

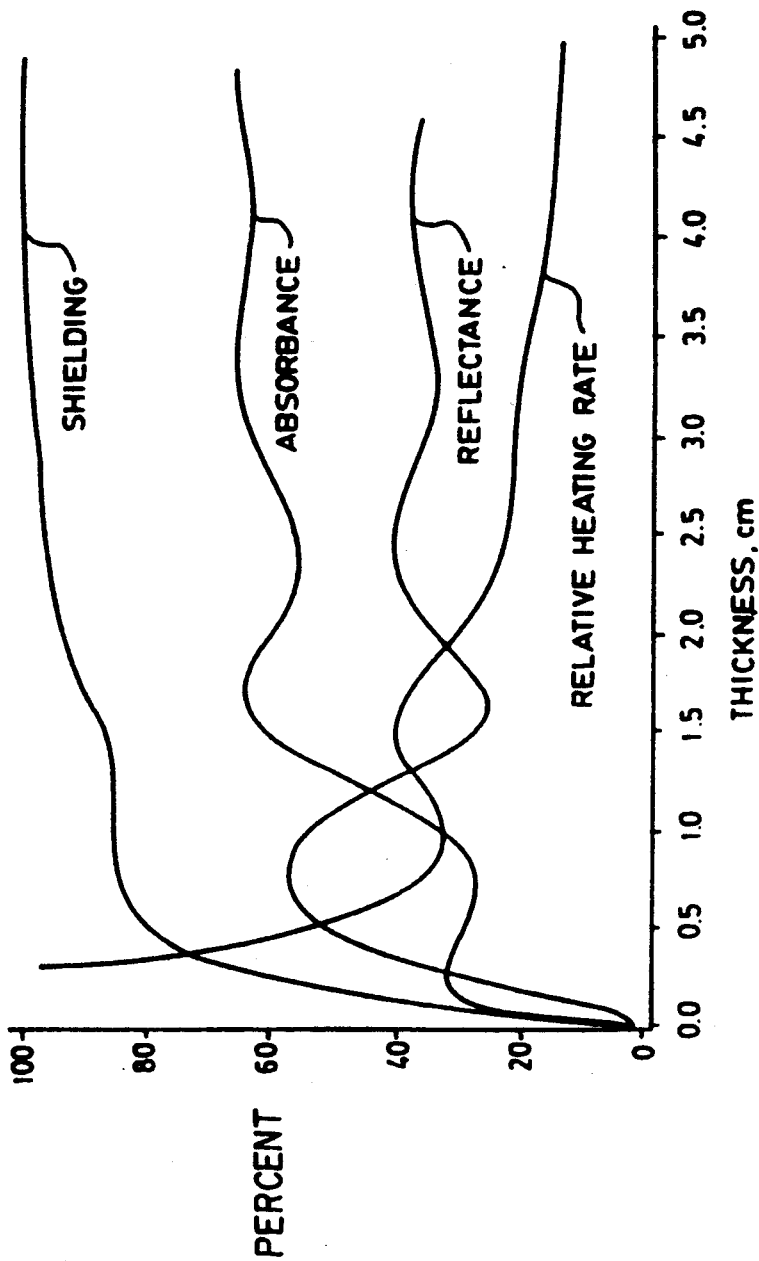

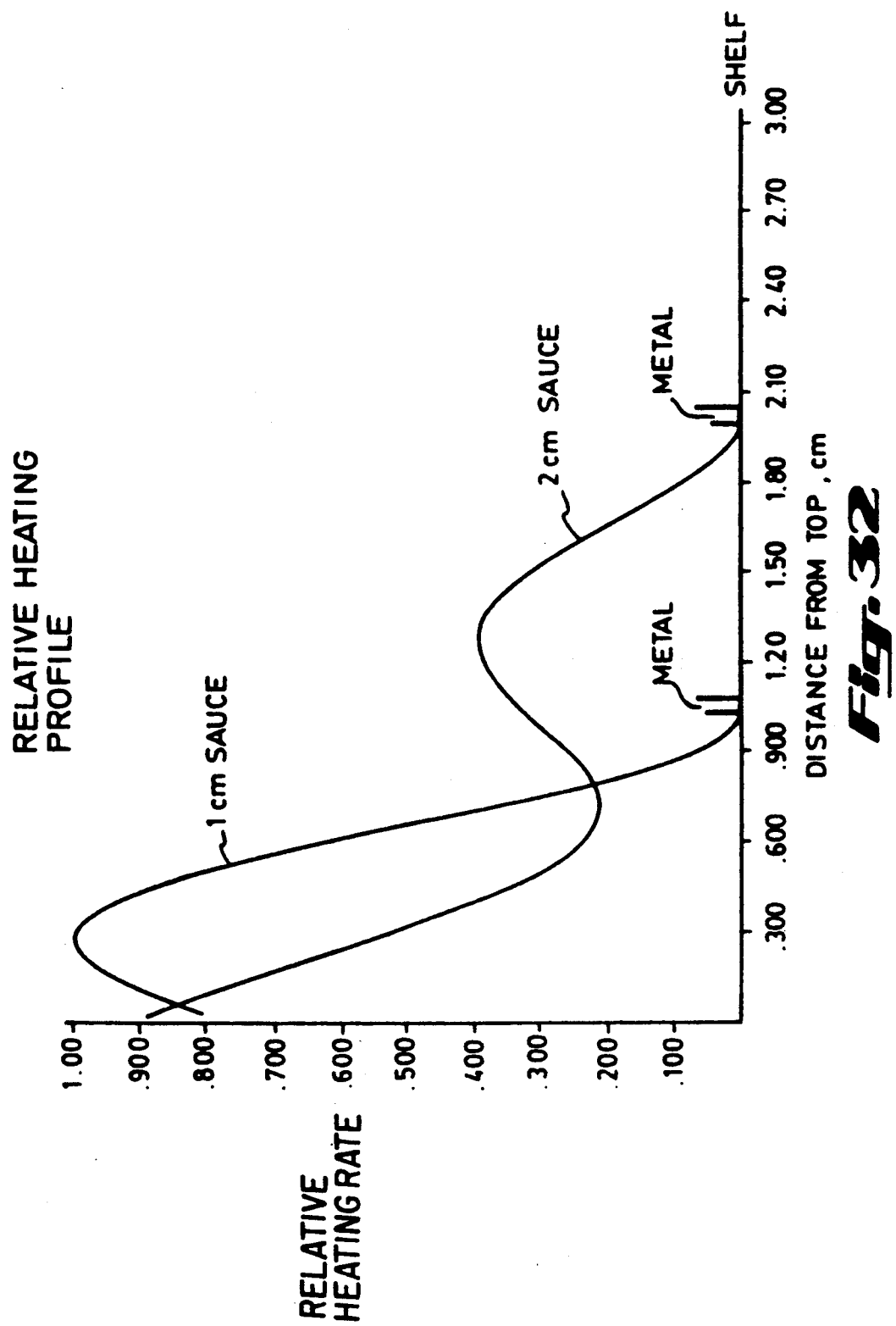

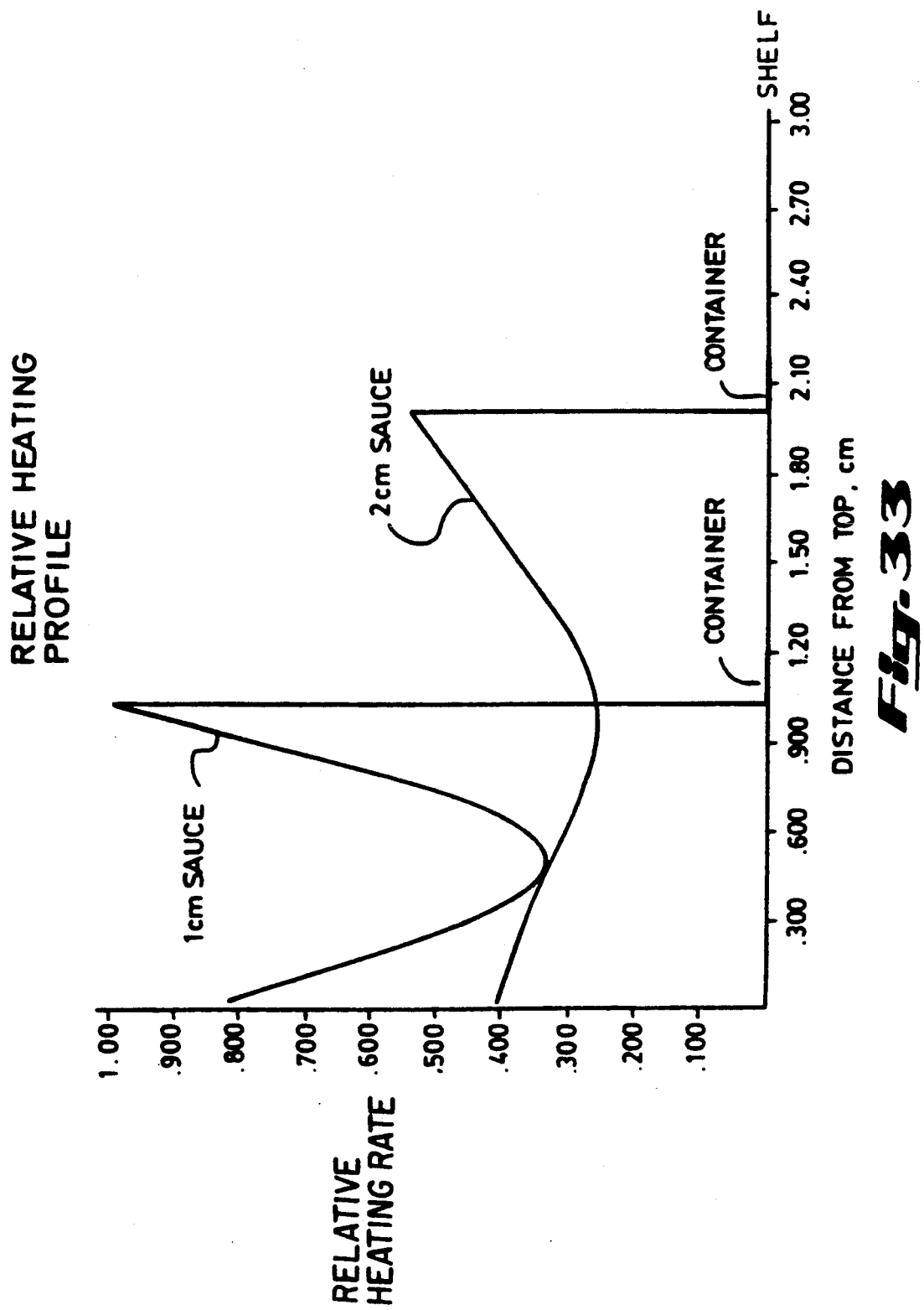

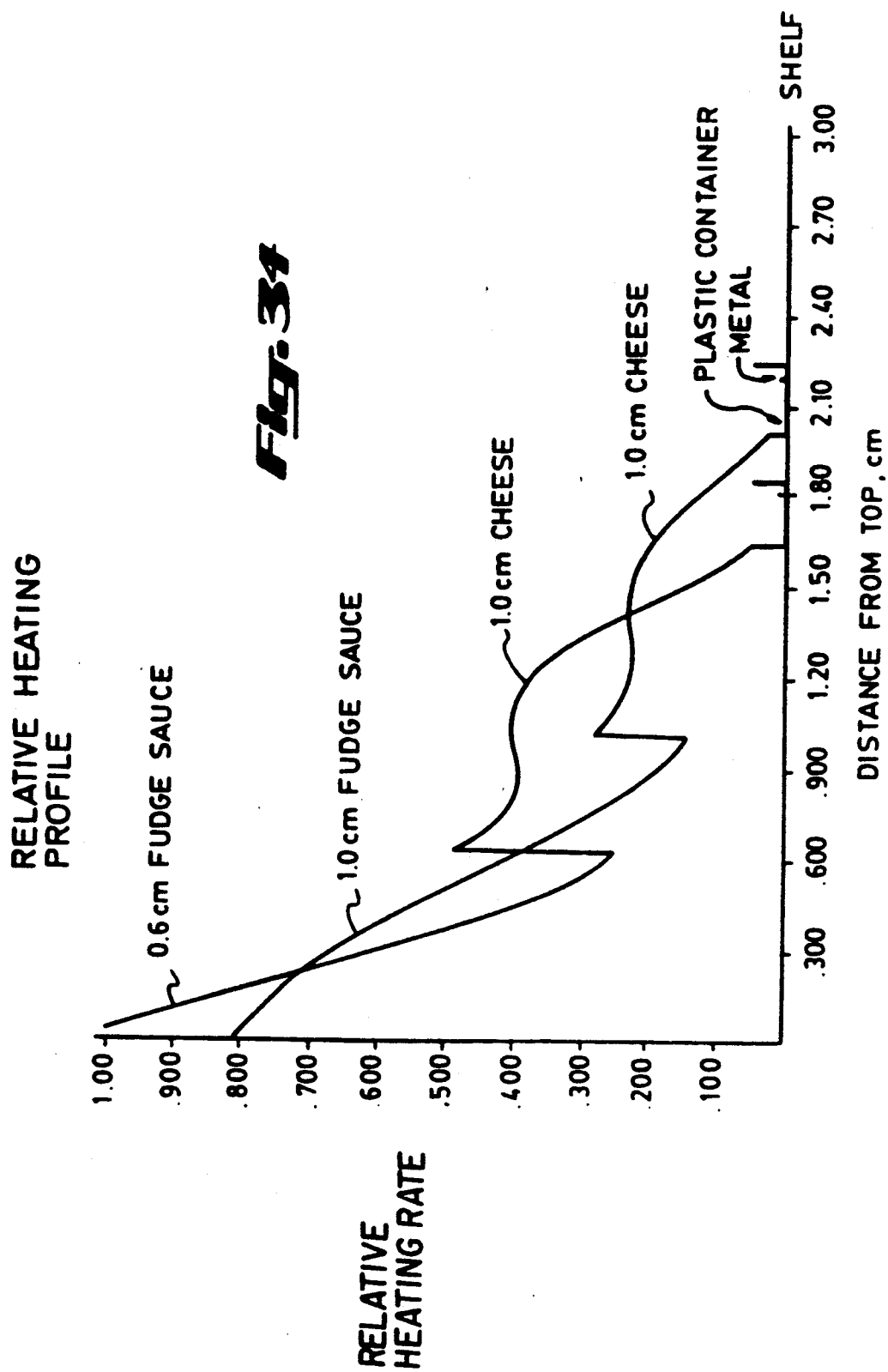

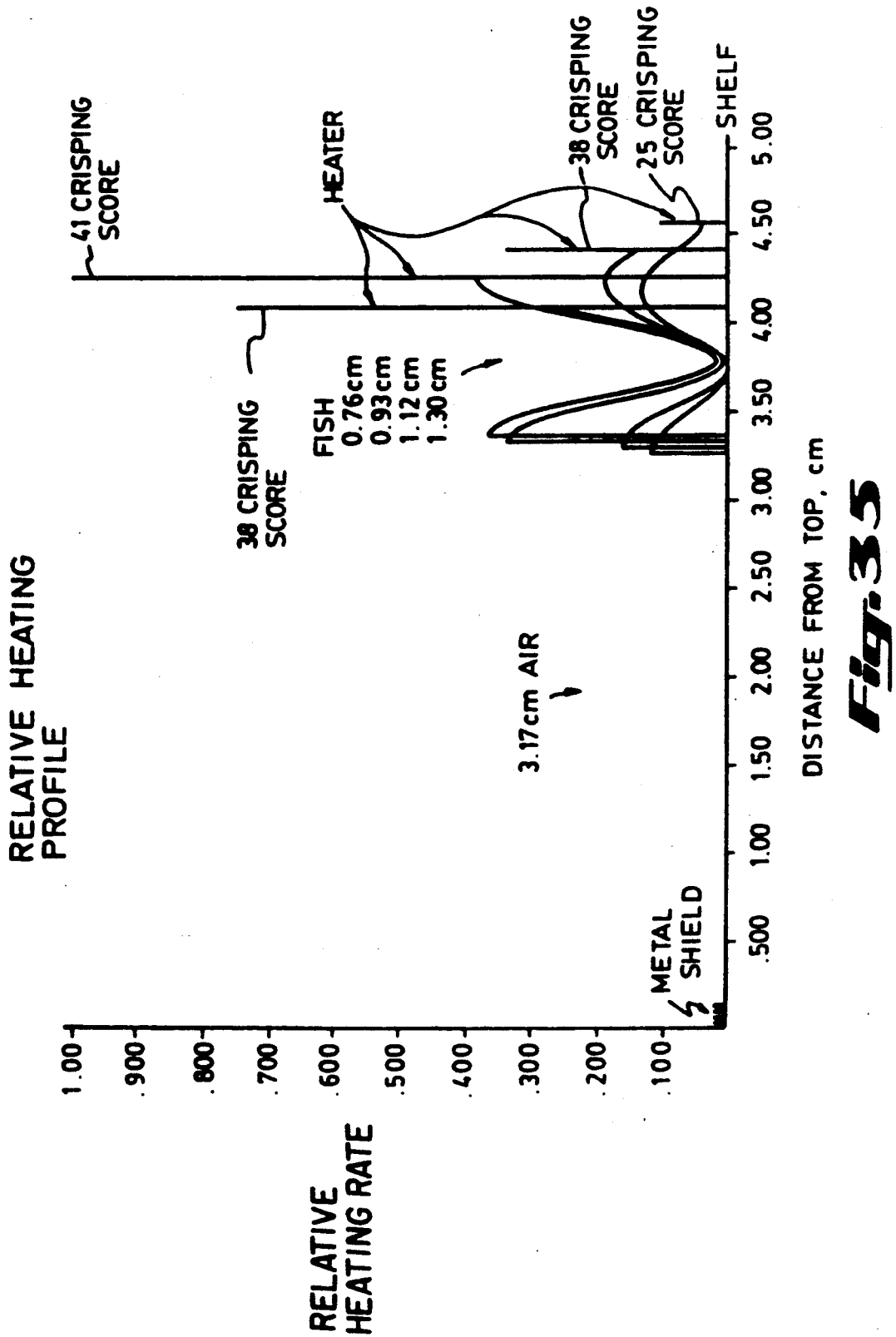

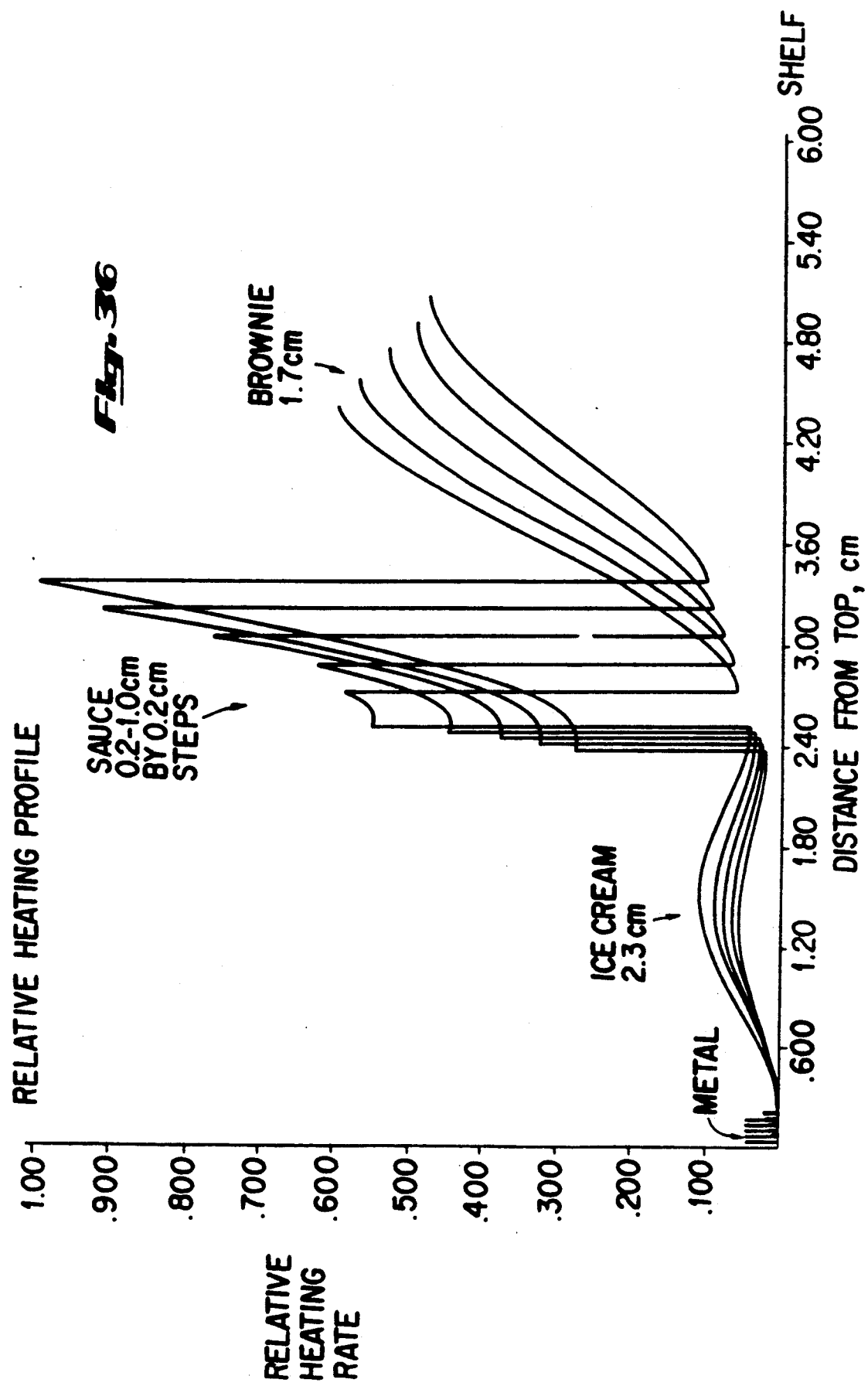

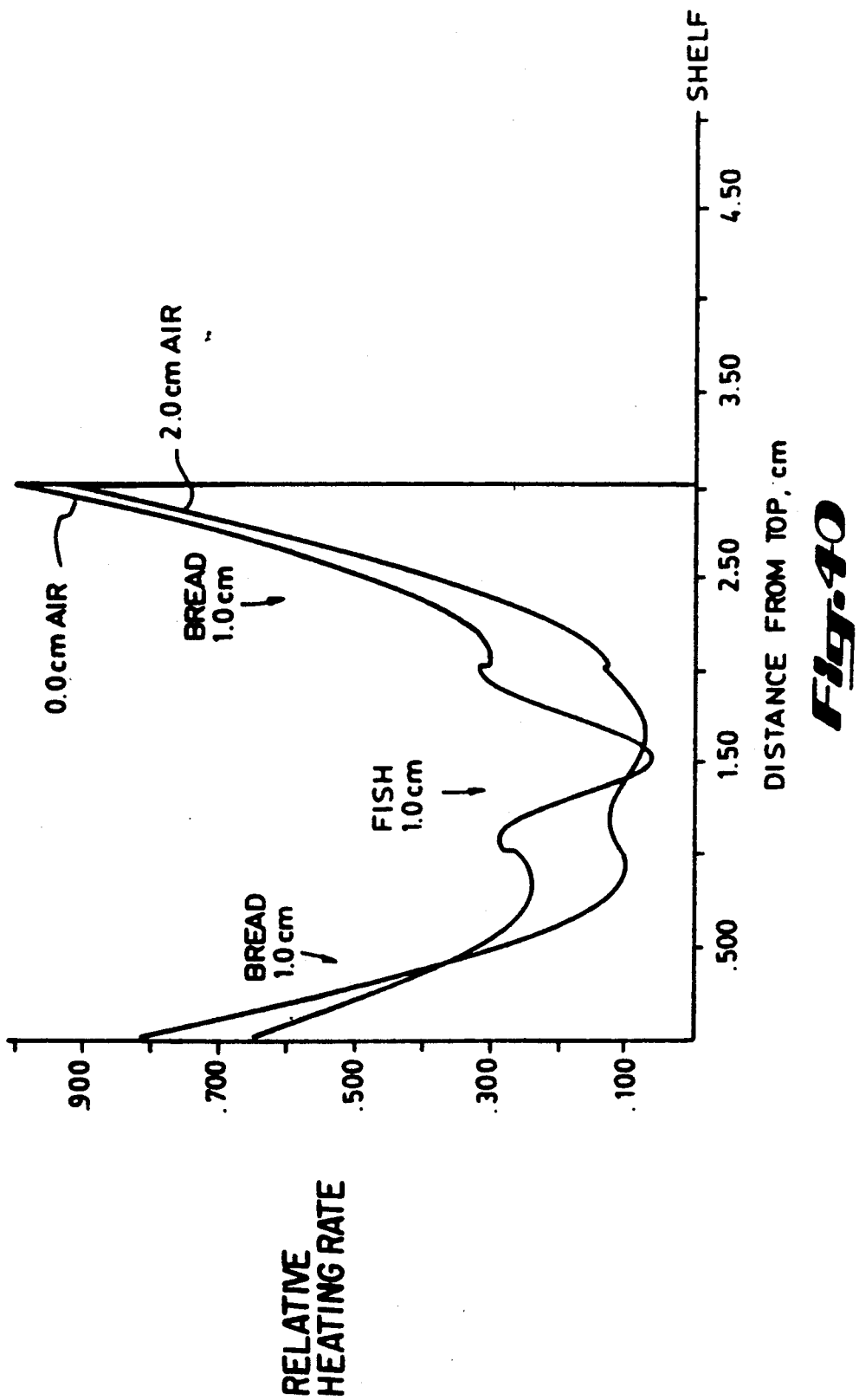

MICROWAVE FOOD PRODUCT AND METHODS OF THEIR MANUFACTURE AND HEATING

BACKGROUND OF THE INVENTION

This is a continuation of application Ser. No. 07/085,125, filed Aug. 13, 1987, Pat. No. 5,008,507 which in turn is a continuation-in-part of Ser. No. 06/903,007 filed Sep. 2, 1986 Pat. No. 4,926,020.

The present invention relates to a means and methods of controlling the heating of foods in a microwave oven, primarily to achieve differential heating between two or more edible substances positioned adjacent one another in a multi-component food product. It has been found that the desired degree of control by one food and hence the amount of heating of the other food is determined by certain physical properties of the food products.

In the heating of foods in a microwave oven, temperature differentials and differential heating have been achieved through the use of package shielding material. For example, it has long been practiced in microwave cooking to use microwave reflective packaging with various sized apertures to control the amount of microwave radiation simultaneously impinging on various foods. Such reflective packaging was metal or contained metal. The foods desired to be heated were separated in the package with each food having one or more preselected apertures in the shield adjacent the food. The heating of each food was tuned by selecting the appropriate size and/or shape of the aperture to achieve a desired temperature within the heating time of the package. Such packaging was relatively effective for certain food concepts which allowed separation of the components, but was expensive and required empirical design to be effective.

A major drawback to such an approach was that it required that each individual food component be in a separate compartment to separate each of the food substances to achieve the proper heating of each component. Another major drawback was that the shielding material was metal. In years past oven manufacturers objected to and recommended against the use of metal in a microwave oven for fear of possible damage to the oven circuitry and because metal packaging can cause arcing which is a consumer detriment. Further, metal shielding is difficult to use with some packaging materials and is also expensive.

Numerous patents have addressed some of these problems, see for example, U.S. Pat. Nos. 4,081,646, 4,233,325, and 4,122,324.

To date, shielding of foods has been a packaging function and no one has been commercially successful in achieving controlled simultaneous heating of two or more foods absent this type of shielding. Even in the use of two of more food components together, no one has taught how to select properties of the control food to function as a microwave energy transmission inhibitor adjacent to and between the source of microwave energy and another food or how to select properties of one food component to accomplish controlled heating of other food components. Further, even with the above described metal shielding being available it has found little use and most microwave heating is still done until the foods being simultaneously heated reach some temperature with little or no control of the balance of the heating.

Likewise, U.S. Pat. Nos. 2,600,566 to Moffet and 2,714,070 to Welch, when read in context, discuss the need for metallic shielding "packaging" to control heating of multi-component food systems. Further, these particular packaging concepts do not appear to be disposable, but appear to be permanent receptacles. Both patents discuss the concept of differential temperatures, for example, between a sauce and an ice cream through the use of metal shielding. Neither Welch nor Moffet discusses controlled heating of one food with a shielding or control food via control of the thickness, and dielectric properties of the shielding layer. For example, Welch states in columns 3 and 4, "Due to the action of shield 45, energy from the cooker 10 can penetrate the food body only from the top, thereof, through paper member 50. Since the sauce 49 is a relatively high loss substance, it will absorb substantially all the microwave energy passing therethrough with the result that little or no microwave energy passes into the ice cream body 47. The ice cream body 47 thus remains frozen and, due to the ice crystals therein, substantially entirely reflects any energy which does pass thru sauce 49 back into sauce 49. Since the cake member 48 is a relatively good heat insulator, the ice cream body 47 is not melted to any substantial extent by conductive heat from the sauce 49 . . . . The resulting product is an ice cream having a hot fudge sauce which may be eaten directly from the paper container 46 inside the shield member 45."

Surprisingly, it has been found that by control of the thickness, and microwave load (a combination of dielectric properties of a control layer and the thermal loads) or by the control of thickness and dielectric constant of a control layer and the thermal loads of each component highly effective cooking control can be achieved. Thermal load can be defined as specific heat in calories/gram multiplied by the mass in grams. Another dimension of thermal performance is thermal diffusivity which is defined as the thermal conductivity (heat input rate in calories/seconds multiplied by distance in centimeters multiplied by temperature difference in degrees centigrade) divided by density and specific heat of the product. It has been found that certain foods can achieve a reflectance of about 65% and a transmission of as low as 20% or even lower, e.g., 10%, for high water layers, of the incident power and can function as an effective shield within given time constraints. Further, it was surprisingly found through calculation that conductive heat transfer from the shielding component to the shielded food component, when made in accordance with the invention, had little practical effect on heating of the shielded component within the short time that is required to heat many foods in a microwave oven, making it possible to allow the shielding layer to heat without detriment to the shielded layer. These factors make it possible to use edible foods or edible substances as shields to control heating of other foods in a microwave environment reducing the need for metal or other nonedible shields and insulating layers. The result is the ability to make new types of microwave foods and food systems that cannot be properly heated together in any other manner.

Given the physical characteristics of the components of the food system and a desired amount of differential heating it is possible to design multiple component food systems with controlled differential heating or temperatures at the end of microwave heating which overcome the above problems.

FIG. 2 is a graph showing the functional relationship between temperature differential and heating time for various multi-component food systems having different intermediate control layers: metal foil, control sauce with 24% water, a silicone foam insert, a high-moisture sauce with 37% water, and no intermediate layer.

FIG. 3 is a graph showing a functional relationship between the temperature and heating time of a shielded component of a multi-component food system as shown in FIG. 1 with different intermediate layer thicknesses.

FIG. 4 is a graph showing a functional relationship between ice cream temperature and heating time of products in a multi-component food system as shown in FIG. 1 with and without an intermediate sauce layer.

FIG. 5 is a graph showing a functional relationship between the temperature of a brownie in a multi-component food system as shown in FIG. 1 and heating time for systems with and without an intermediate layer of shielding sauce.

FIG. 6 is a graph showing a functional relationship between temperature differential, i.e., the temperature of the brownie minus the temperature of the ice cream as a function of heating time for a multi-component food system as shown in FIG. 1 with and without an intermediate layer of sauce.

FIG. 7 is a graph showing a functional relationship between temperature differential, i.e., the temperature of the brownie minus the temperature of the ice cream, as a function of heating time for a multi-component food system as shown in FIG. 1 with different shielding layer thicknesses using the control sauce with 24% free water.

FIG. 8 is a three dimensional representation of a mathematical model showing a functional relationship between temperature differential, microwave heating time, and sauce thickness for the control sauce having a free water content of 24% for a multi-component food system as shown in FIG. 1 having ice cream and brownie on opposite sides of the shielding layer.

FIGS. 9A, B, and C are graphs showing functional relationships between four variables; reflected power, absorbed power, shielded power, and relative heating rate (absorbance/thickness) each as a function of shielding layer thickness for a shield layer having relative dielectric constant (E') (hereinafter dielectric constant) values of 13, 26, and 39 and relative dielectric loss factor (E") (hereinafter dielectric loss factor) values of 3.5, 7.0, and 10.5, respectively. E' is the real part and E" is the imaginary part of the complex permittivity as is well known to those skilled in the art. See, for example, A. Von Hippel, *Dielectric Materials and Applications*, MIT Press, 1954.

FIGS. 9D, E, F, and G are graphs showing functional relationships between four variables; reflected power, absorbed power, shielded power, and relative heating rate. When these figures are viewed in combination with FIG. 9B they show the effect of changing E' or E" while holding the other constant.

Figure 1:
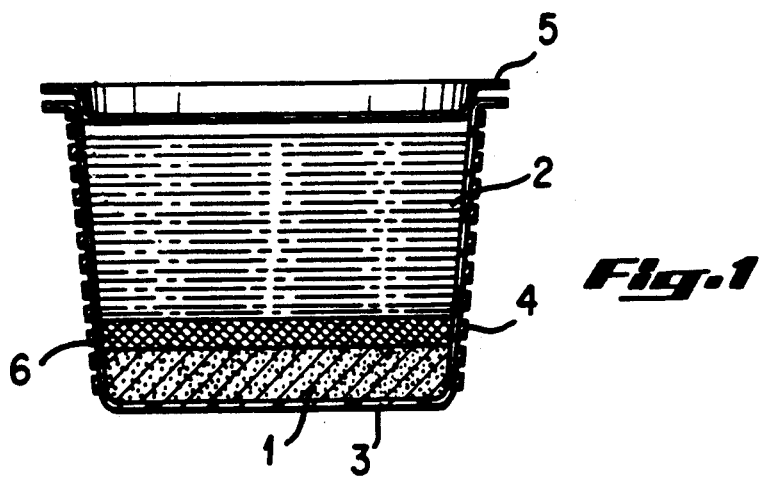
FIG. 1 is a side sectional view of a multi-component food product.
Figure 10:
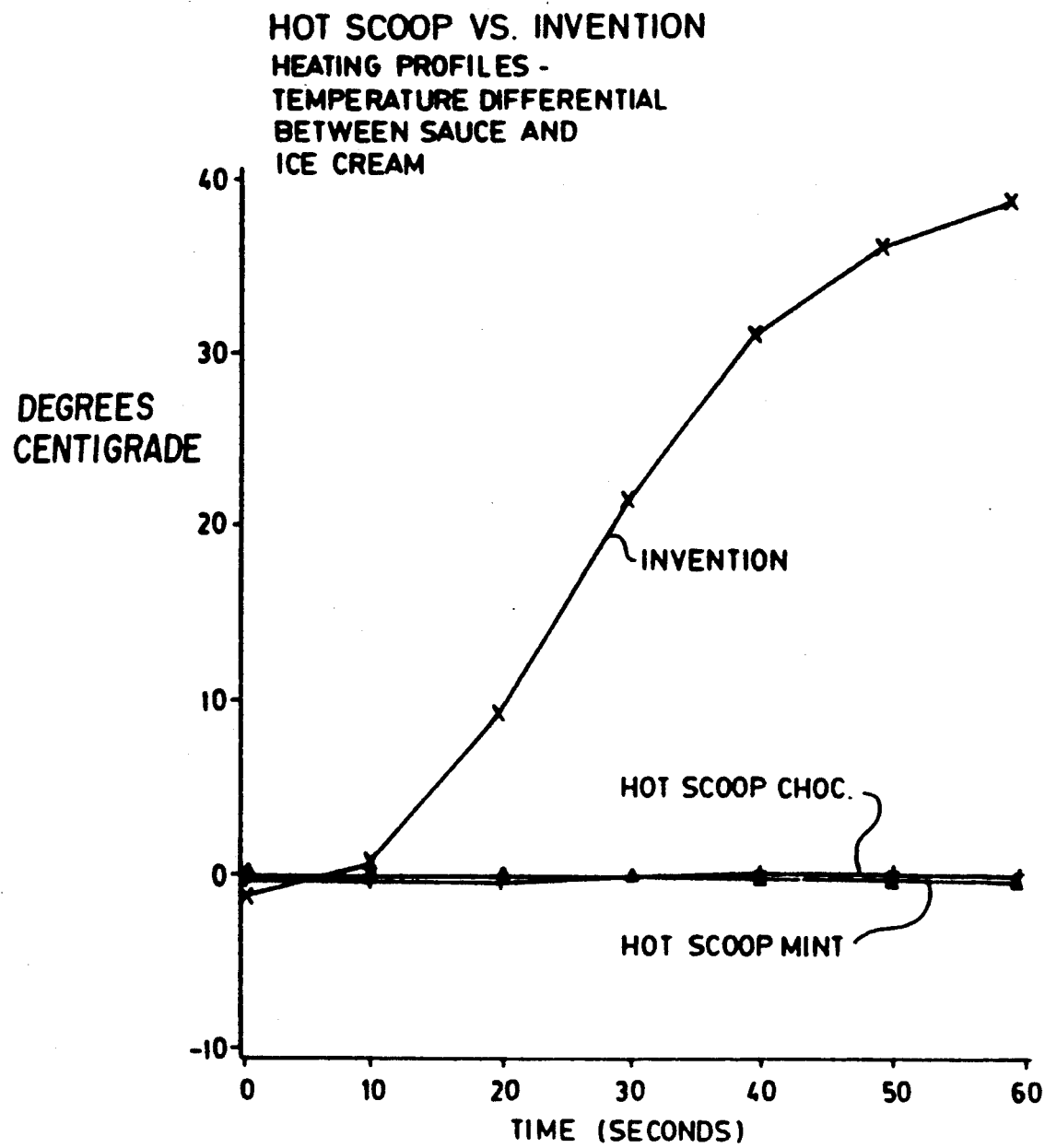

FIG. 10 is a graph showing a functional relationship between the temperature differential between sauce layer and ice cream for a currently existing product called Hot Scoop which is ice cream and sauce in an unshielded paper cup compared to a product similar to that shown in FIG. 1 having a control sauce layer and ice cream, but with metal shielding on the side of the container also as shown in FIG. 1. The limitations on this graph are discussed hereinafter.

Figure 11:
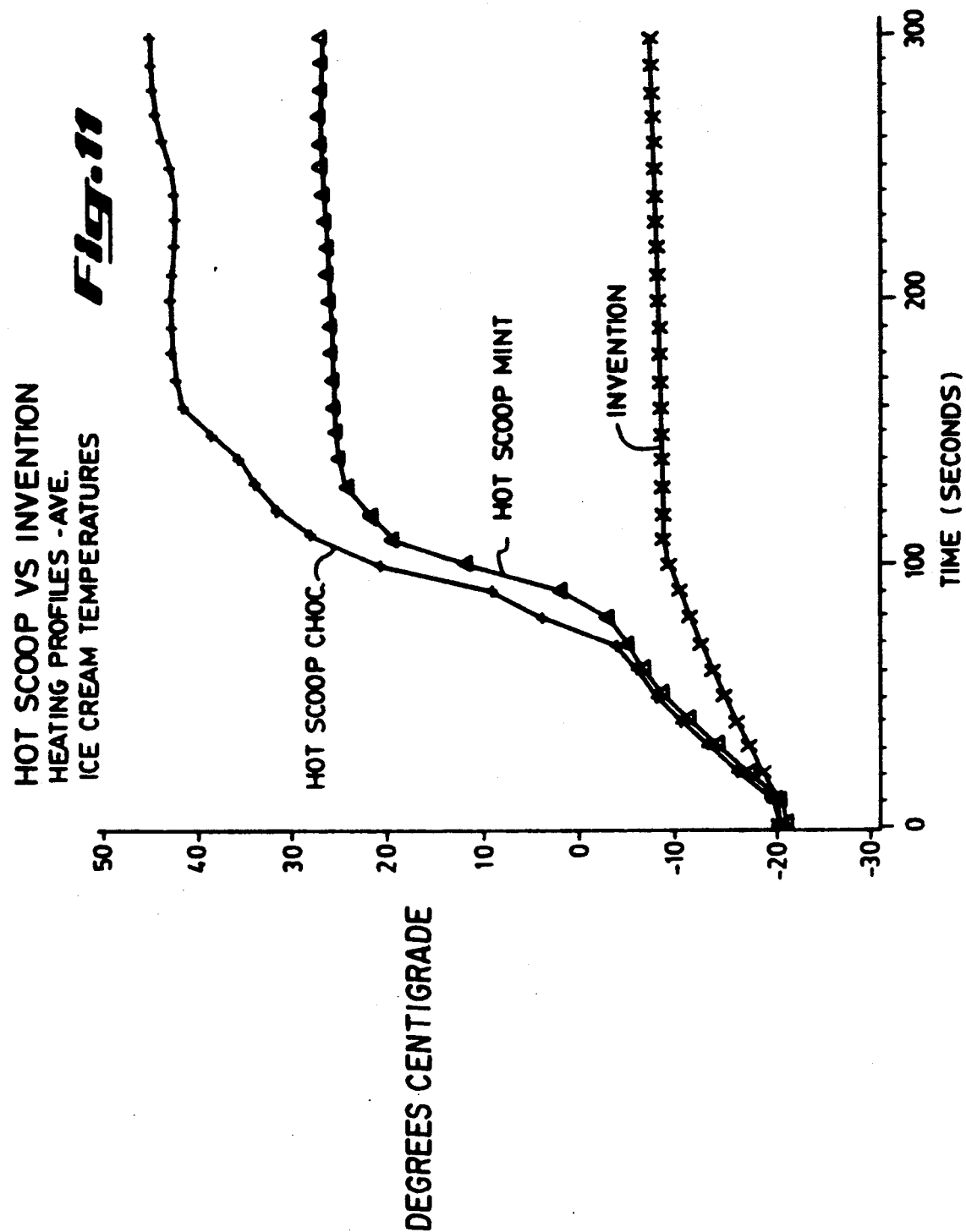

FIG. 11 is a graph showing a comparison of heating temperature profiles of ice cream as a function of heating time in a microwave oven for two Hot Scoop products and the invention using ice cream, brownie, and sauce in a metal shielded cup.

Figure 12:
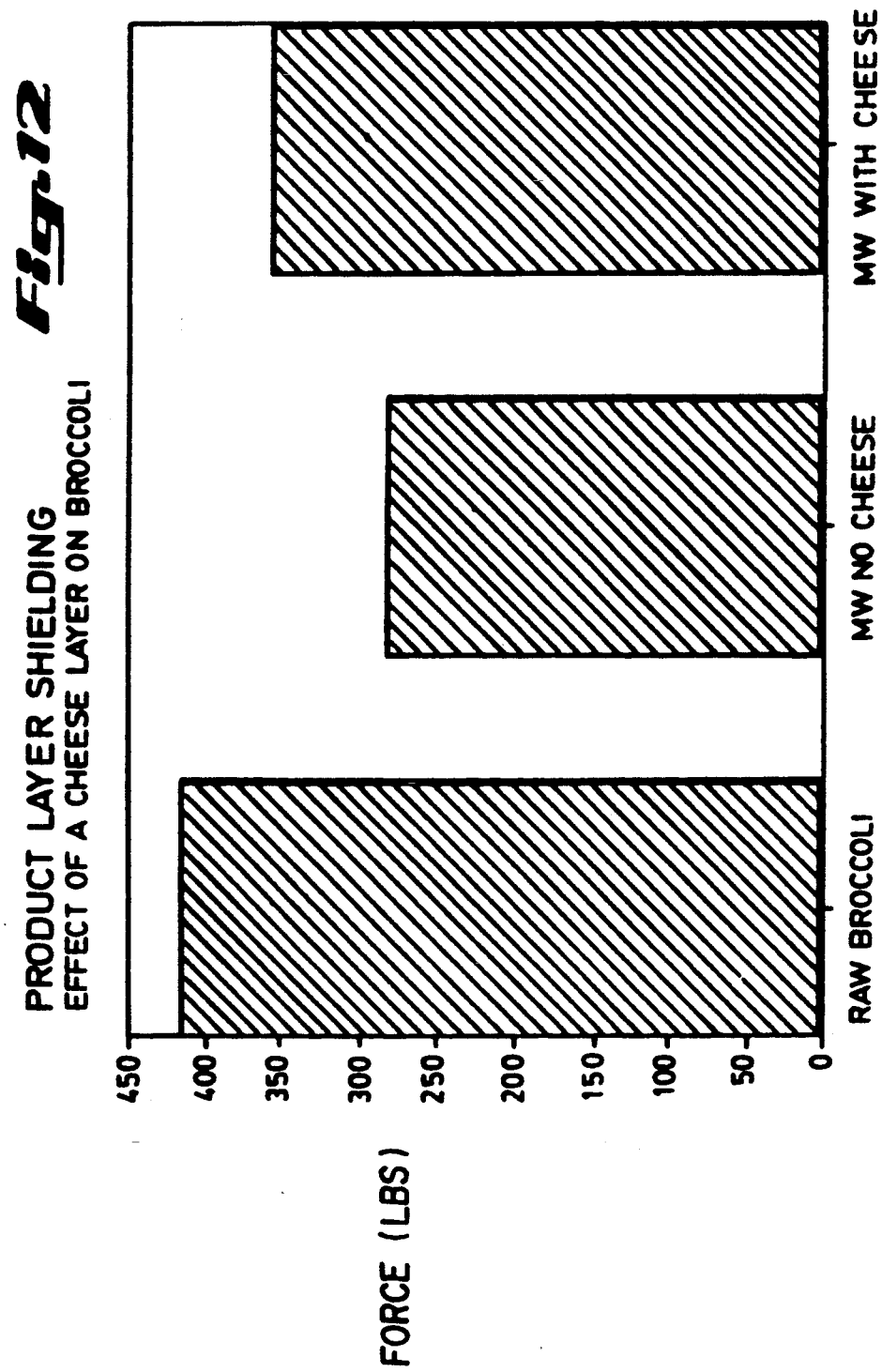

FIG. 12 shows a functional relationship between shear force necessary to shear broccoli after heating in microwave oven for broccoli which was prepared in a microwave oven for a given period of time with no shielding cheese sauce, broccoli with a shielding cheese sauce and for raw broccoli without any heating.

Figure 13:
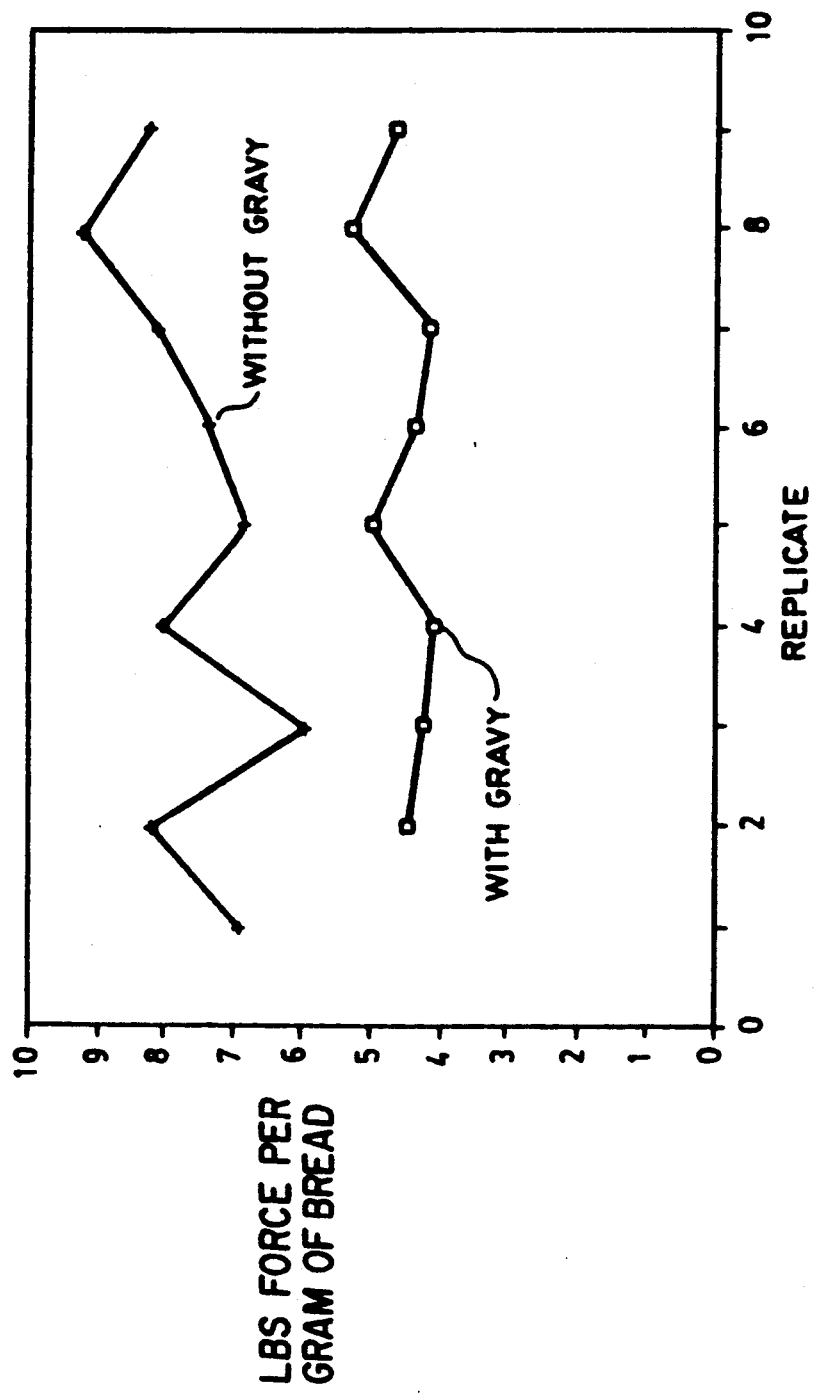

FIG. 13 is a pictorial illustration showing the pounds force per gram necessary to shear bread in an Instron machine for bread heated using a system with and without gravy as a shielding layer. This graph illustrates the increased toughening of bread for a system without a gravy shield.

Figure 14:
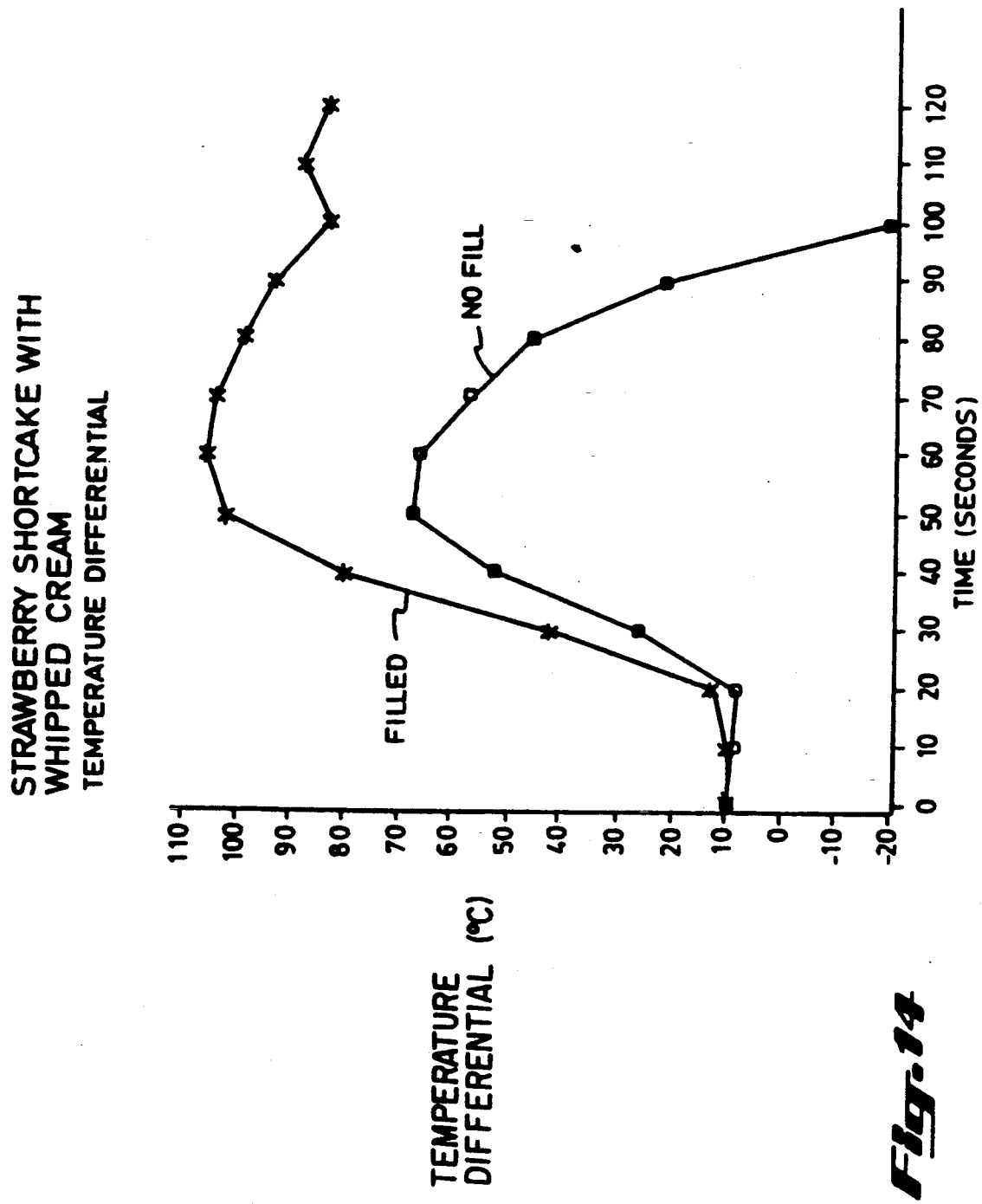

FIG. 14 is a graph illustrating a functional relationship between temperature differential (between shortcake and whipped cream) and microwave heating time with one system having an intermediate layer of strawberry sauce and another system having no intermediate filling layer of strawberry sauce.

Figure 15:
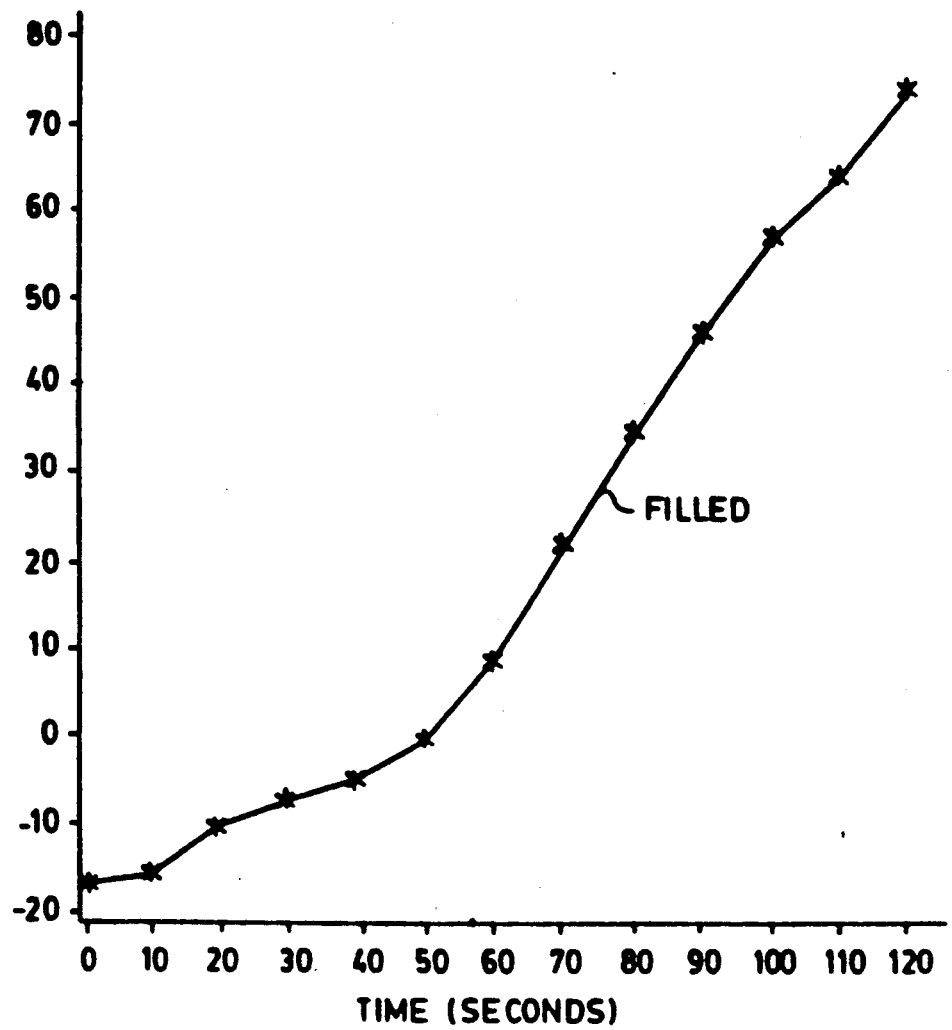

FIG. 15 is a graph illustrating a functional relationship between filling temperature and heating time for the same system as that used to generate the data for FIG. 14.

Figure 16:
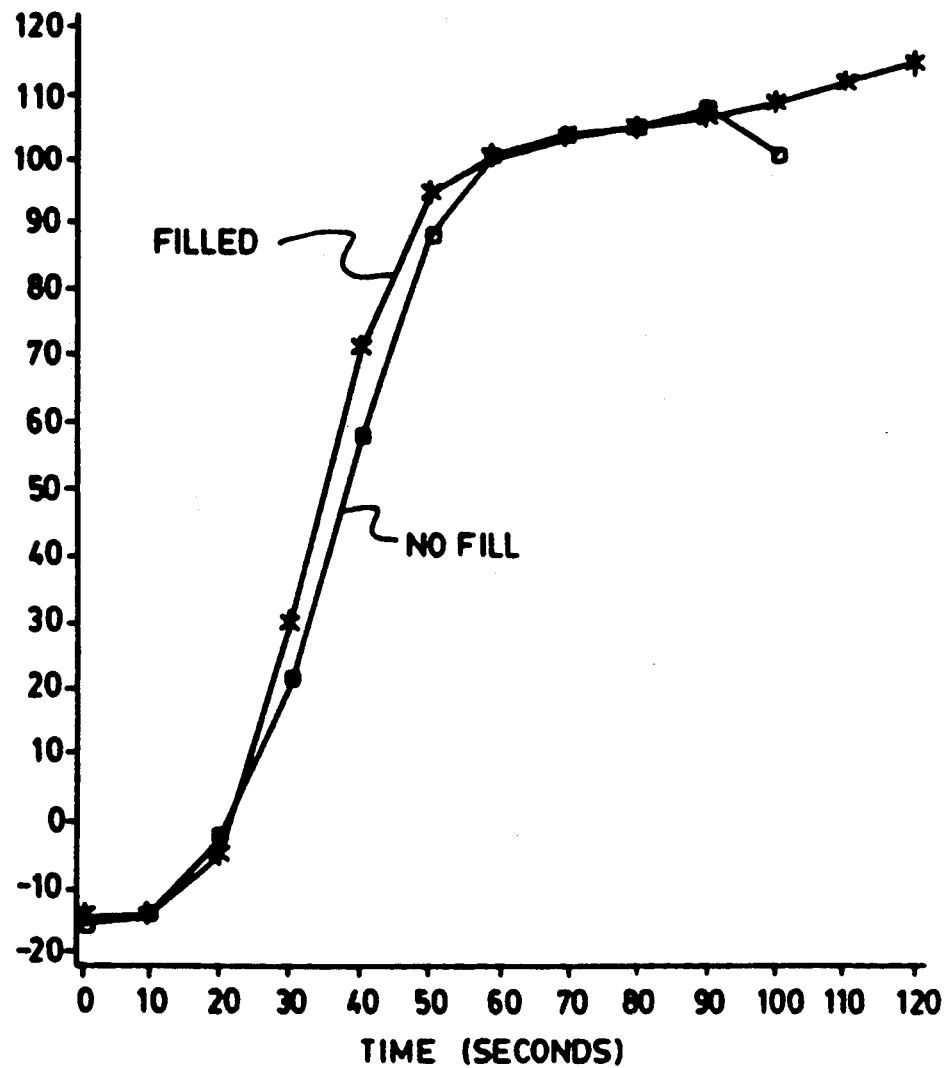

FIG. 16 is a graph showing a functional relationship between shortcake temperature and microwave heating time for a strawberry sauce layer shielded system and for a system without an intermediate shielding layer.

Figure 17:
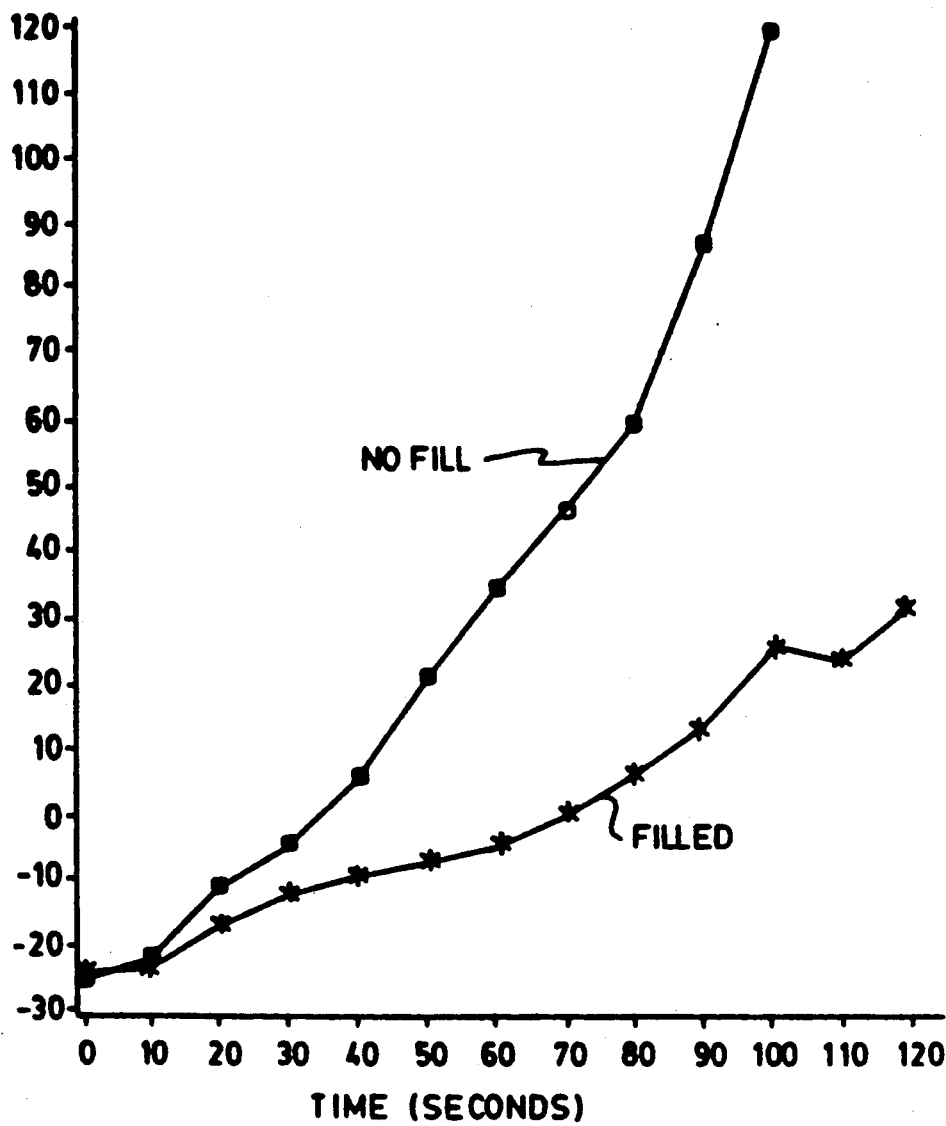

FIG. 17 is a graph illustrating the whipped cream topping temperature as a function of microwave heating time for a product with a strawberry sauce shield layer and for a product without shielding sauce. This was the same system as that which was used to generate the data for FIGS. 14, 15, and 16.

Figure 18:
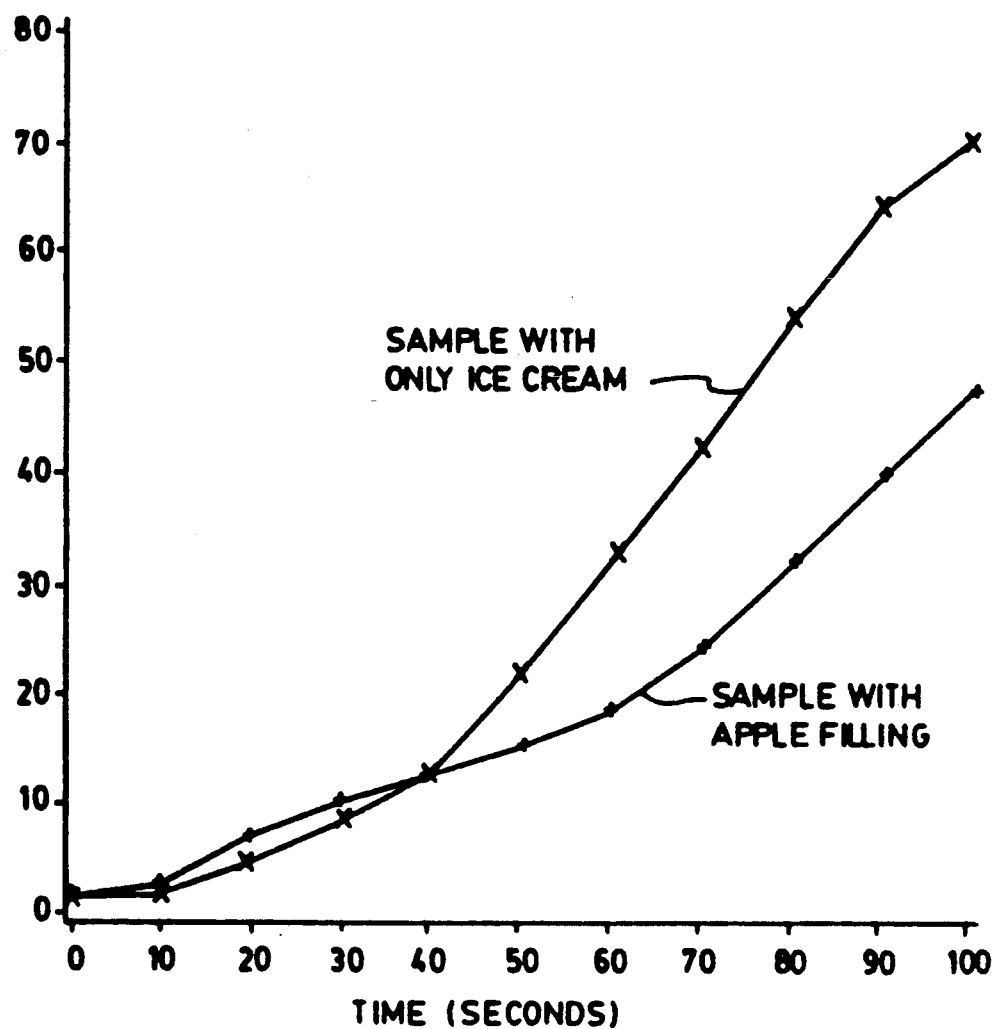

FIG. 18 is a graph illustrating temperature differential between crust and ice cream as a function of microwave heating time for products with and without apple pie filling between the two layers.

Figure 19:
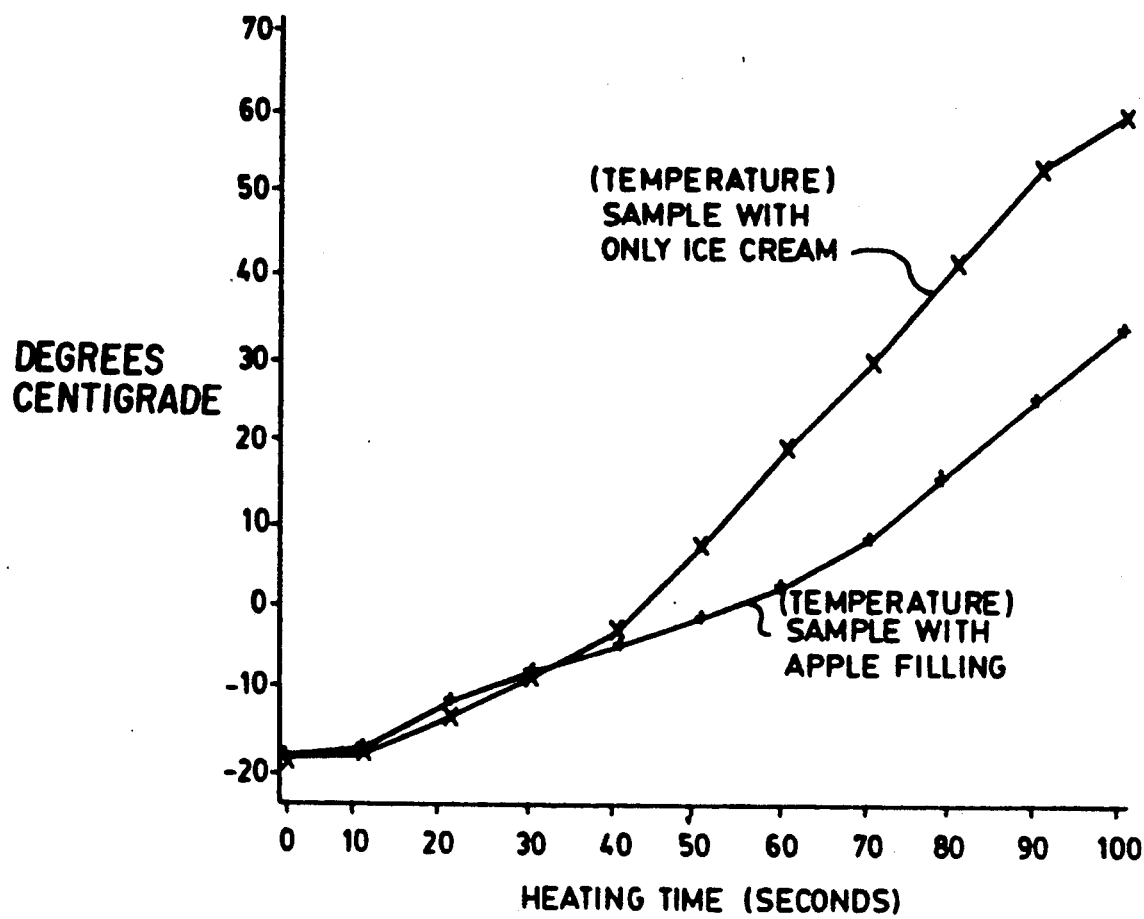

FIG. 19 is a graph illustrating a functional relationship between the temperature of the apple filling and ice cream for the product used to generate the data in FIG. 18.

Figure 20:
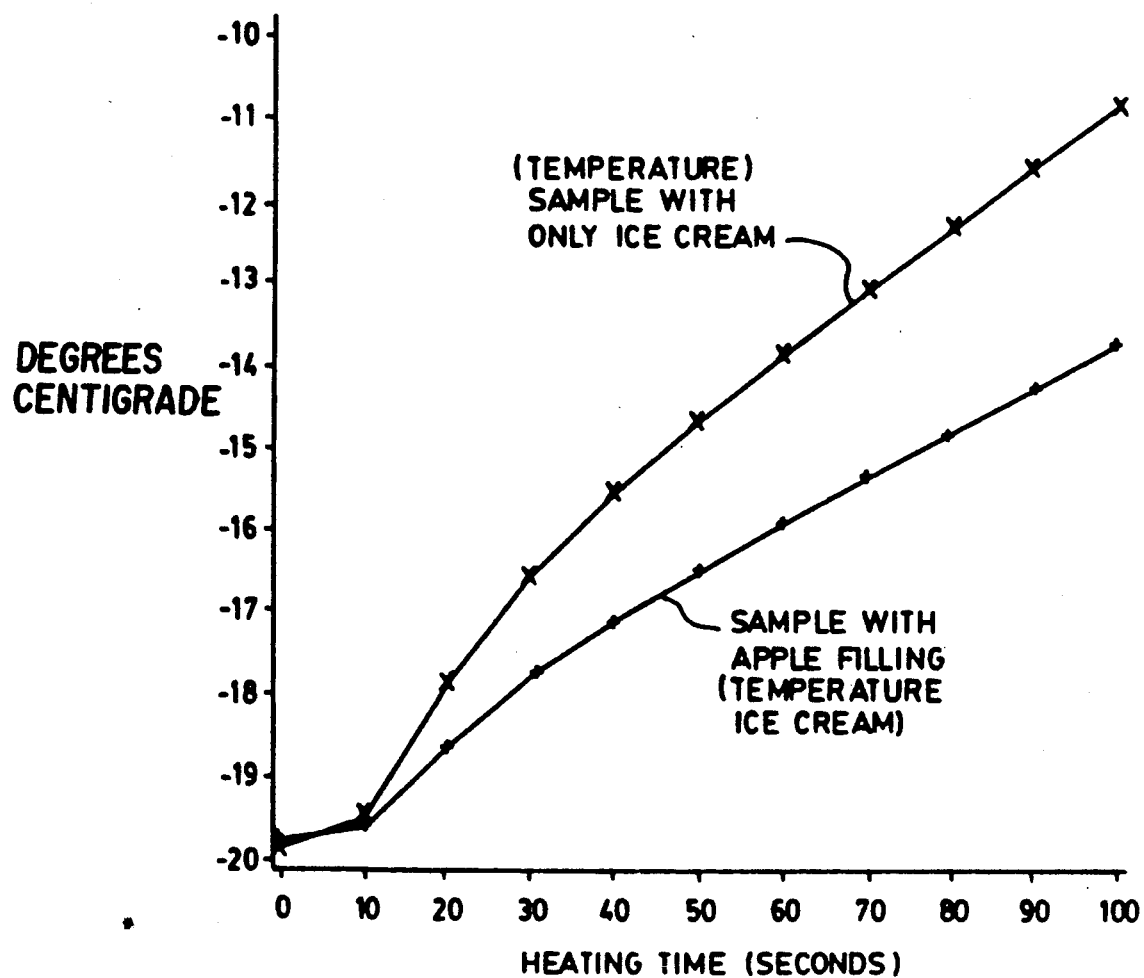

FIG. 20 is a graph illustrating average ice cream temperature as a function of heating time for the apple filling and ice cream system. The data was generated using the same product used to generate the data in FIGS. 18 and 19.

Figure 21:
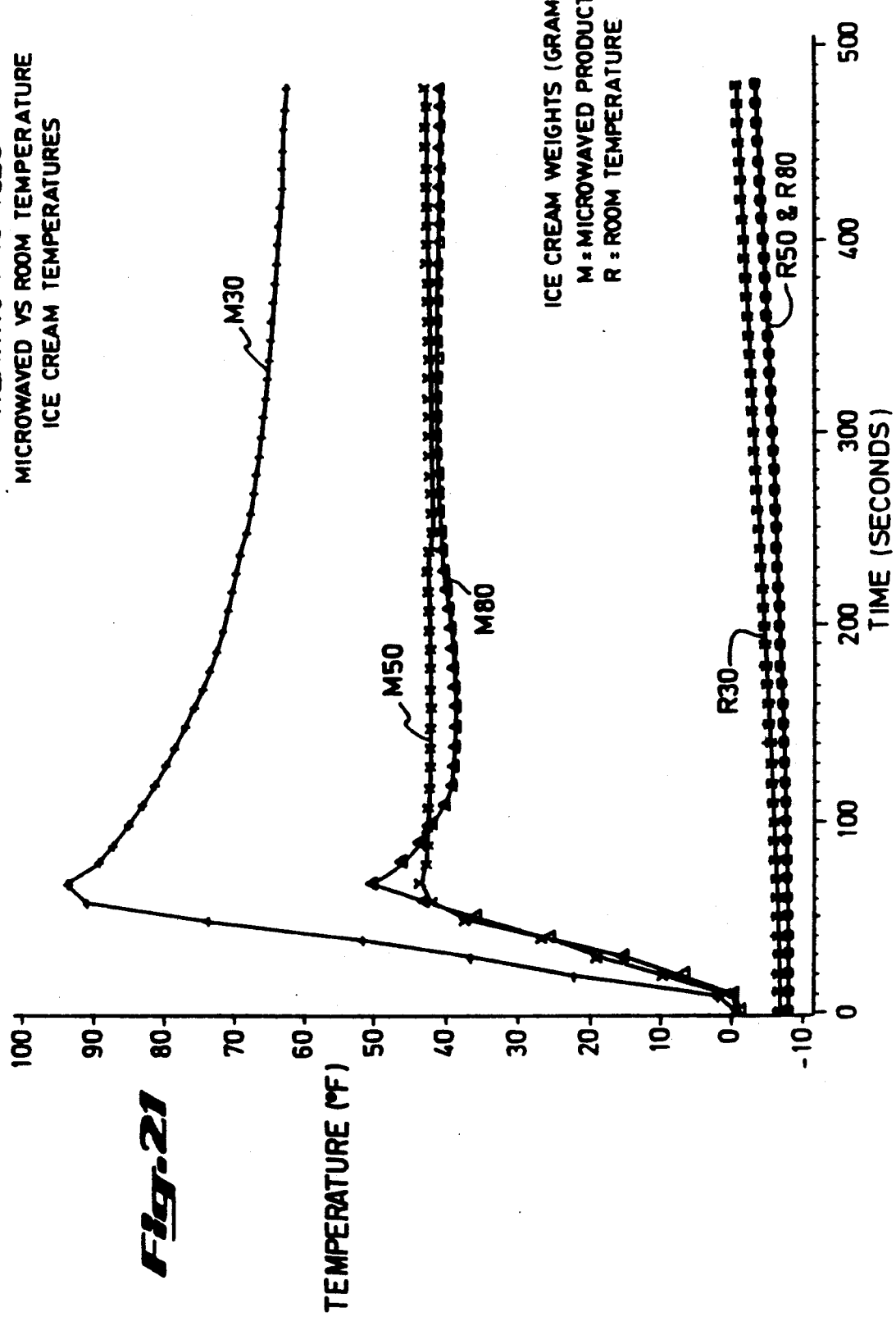

FIG. 21 is a graph showing functional relationships between ice cream temperatures and heating time for products similar to that in FIG. 1 that had different ice cream weights and heated in two different ways, in a microwave oven and sitting in a room at room temperature.

Figure 22:
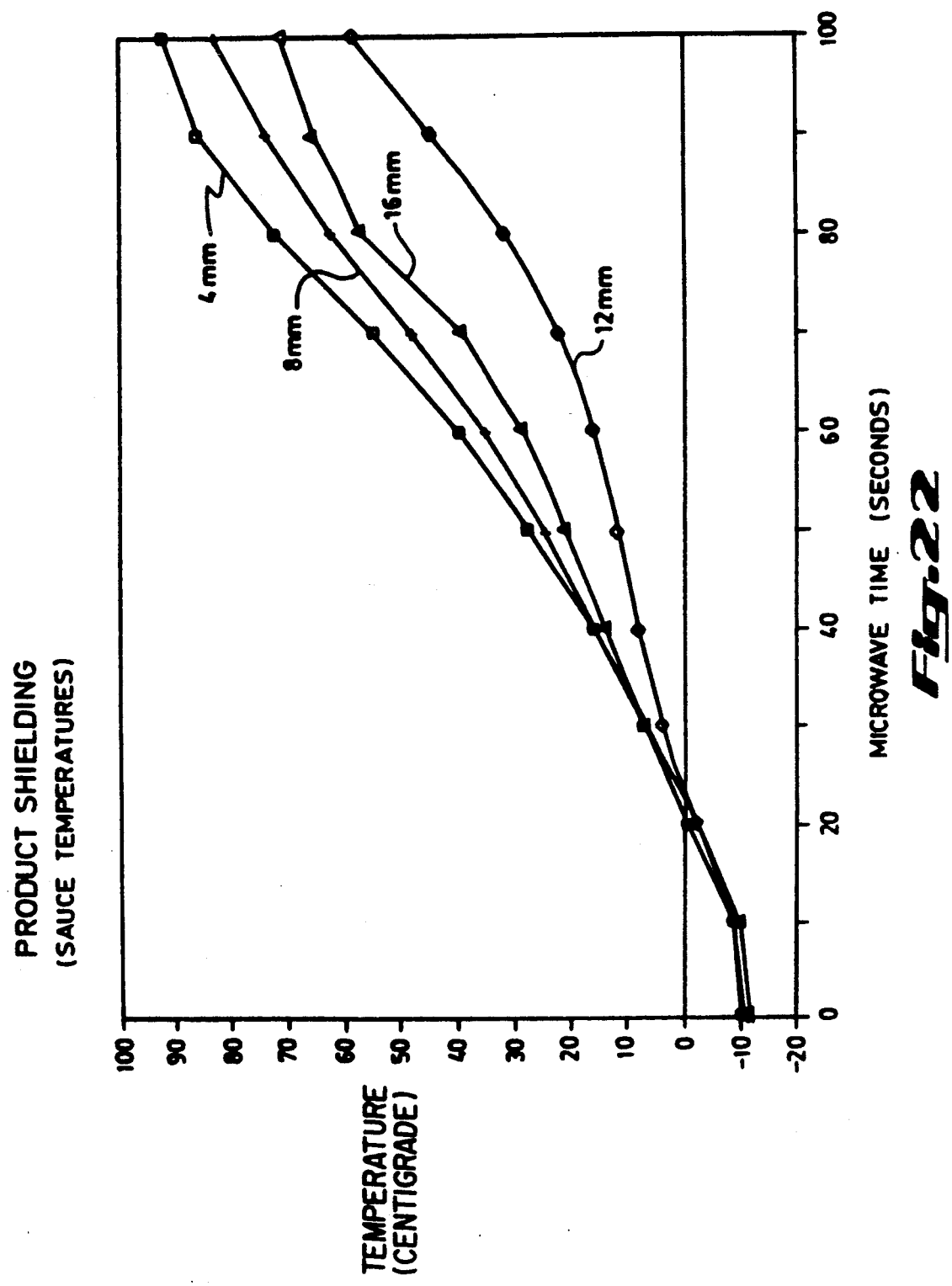

FIG. 22 is a graph showing a functional relationship between temperature of the shielding sauce layer and microwave heating time for four different thicknesses.

Figure 23:
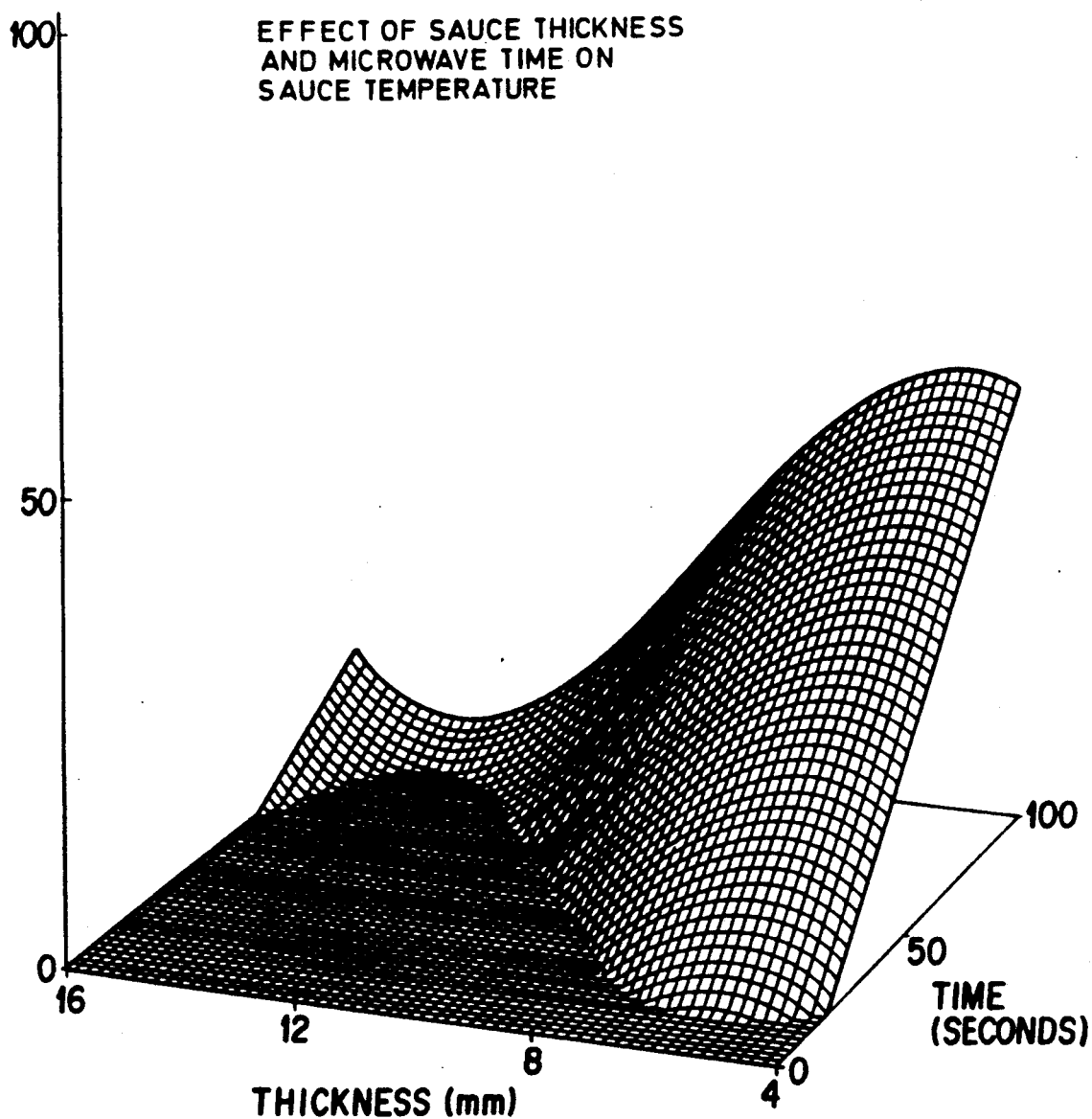

FIG. 23 is a three dimensional representation of a mathematical model showing a functional relationship between intermediate layer sauce temperature, sauce thickness, and microwave heating time for a sauce having a free water content of 24% and a multi-component food system as shown in FIG. 1 having ice cream and brownie on opposite sides of the shielding layer.

Figure 24:
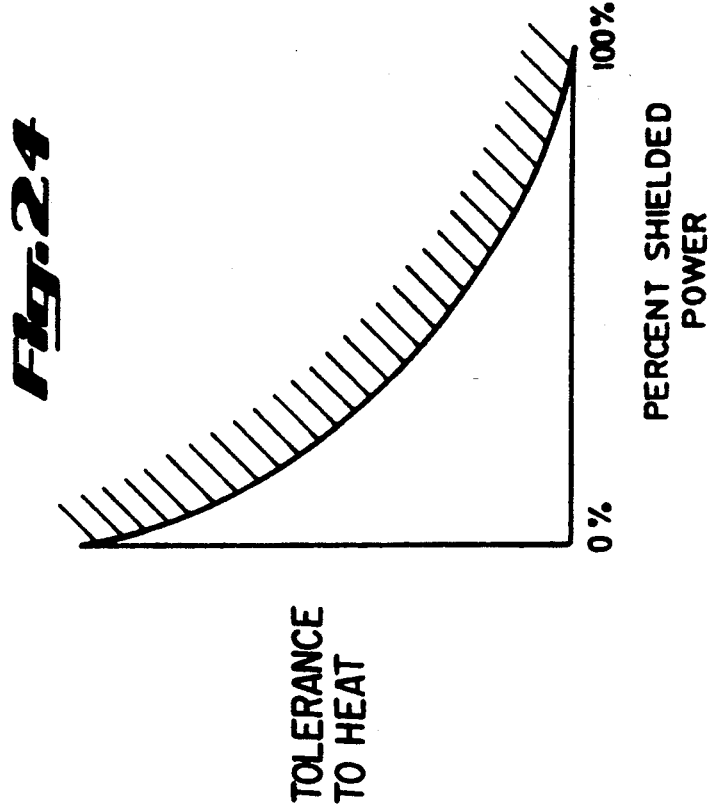

FIG. 24 is an illustration generally showing a possible functional relationship between tolerance to heat of the shielded component and the amount of microwave energy transmitted through the shielding component(s) which is useful to directionally design multi-component food systems.

Figure 25:
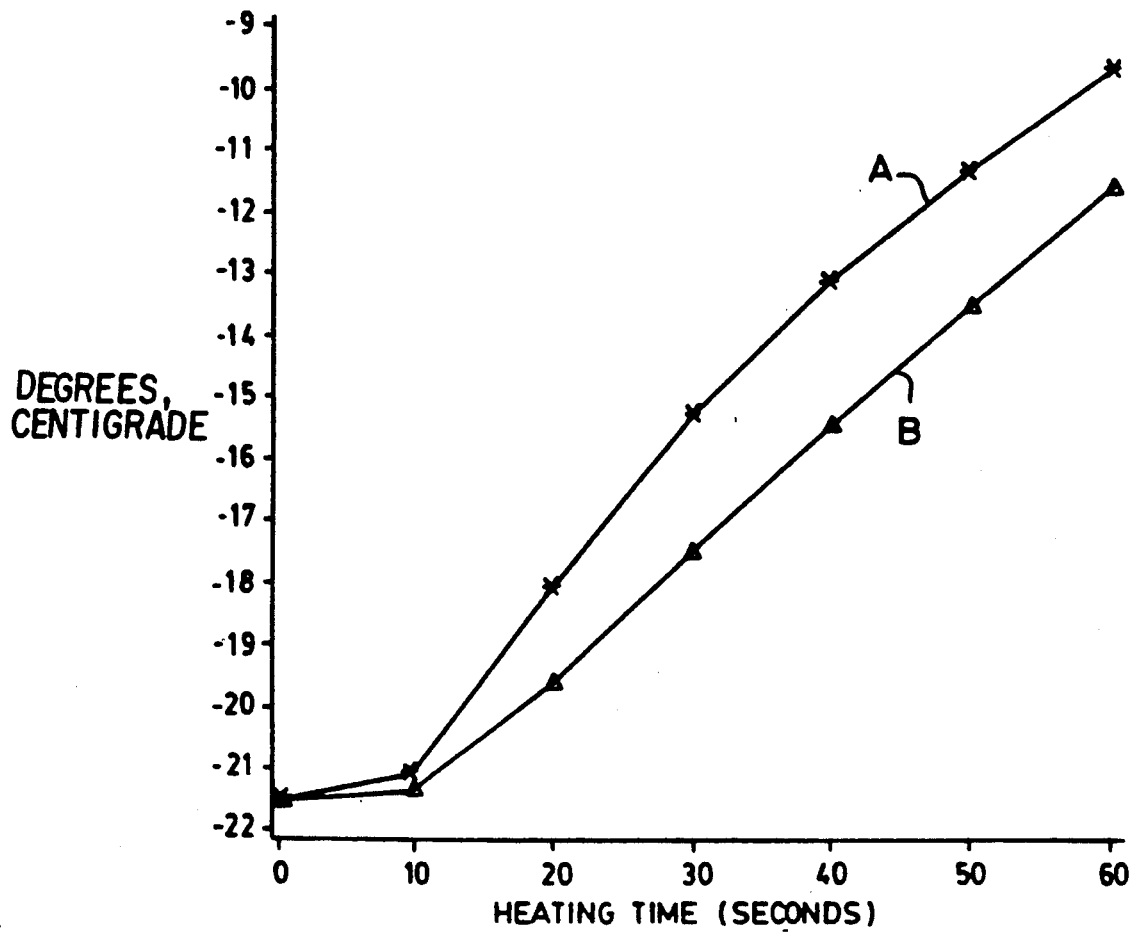

FIG. 25 is a graph illustrating functional relationships between ice cream temperature and microwave heating time. Line A represents a 314 gram ice cream sample and Line B represents a 100 gram charge of ice cream surrounded on all sides by fudge sauce with a substantially uniform thickness and weighing 444 grams. No metal shielding was used.

Figure 26:
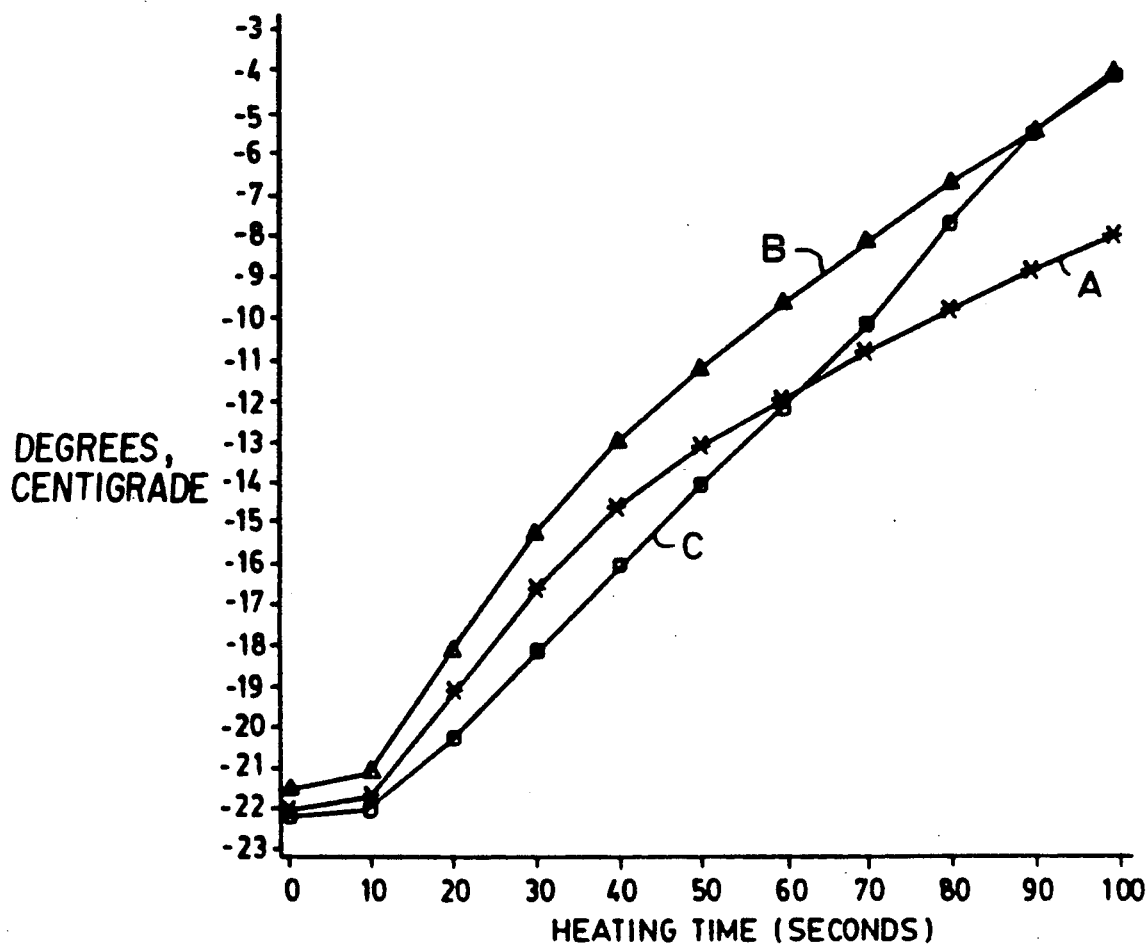

FIG. 26 is a graph showing functional relationships between ice cream temperatures and microwave heating time. Line A represents a 544 gram charge of ice cream, Line B represents a 314 gram charge of ice cream and Line C represents a 100 gram charge of ice cream surrounded with a substantially uniform thickness of fudge sauce weighing 444 grams. No metal shielding was used.

Figure 27:
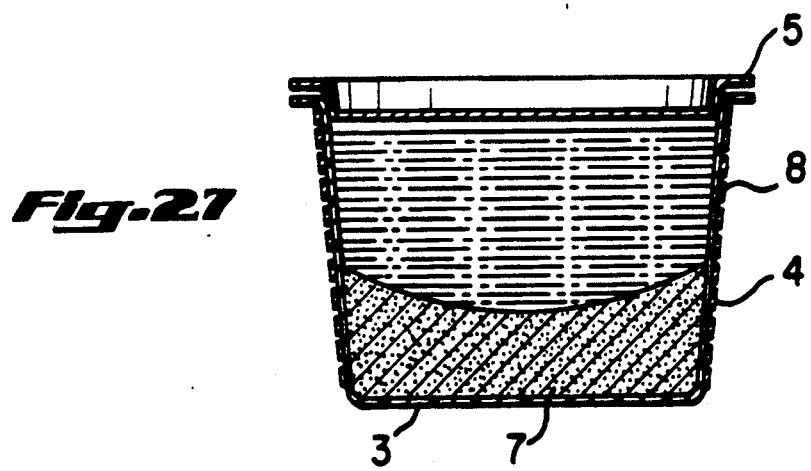

FIG. 27 is a side sectional view of a container similar to that shown in FIG. 1 containing another form of the present invention.

Figure 28:
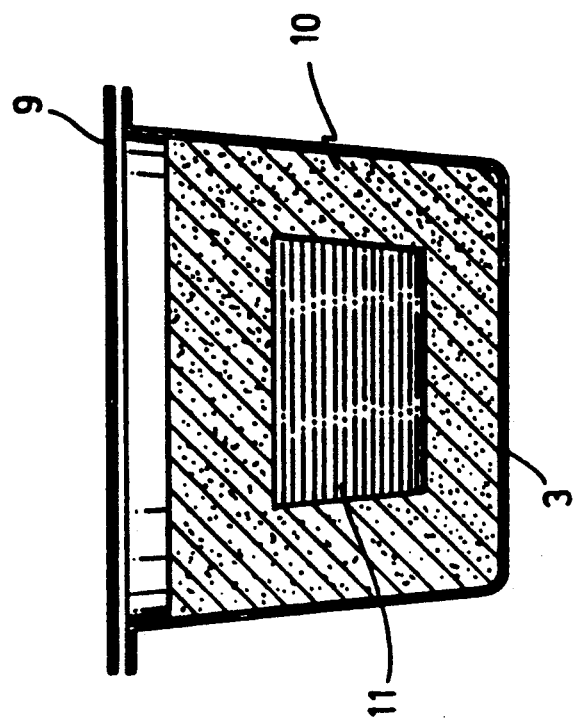

FIG. 28 is a side sectional view of a multi-component food product in a package showing a still further form of the present invention and is similar to that form used in FIGS. 25 and 26, an entirely food enrobed food product.

Figure 29:
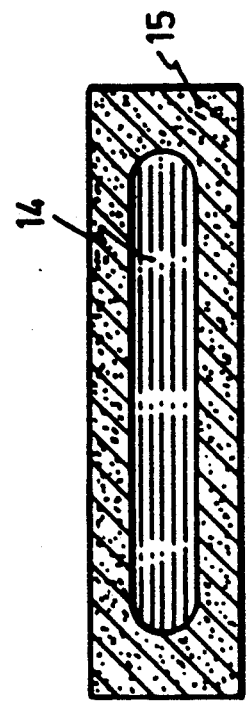

FIG. 29 is a side sectional view of another food product having a control layer inside.

Figure 30:
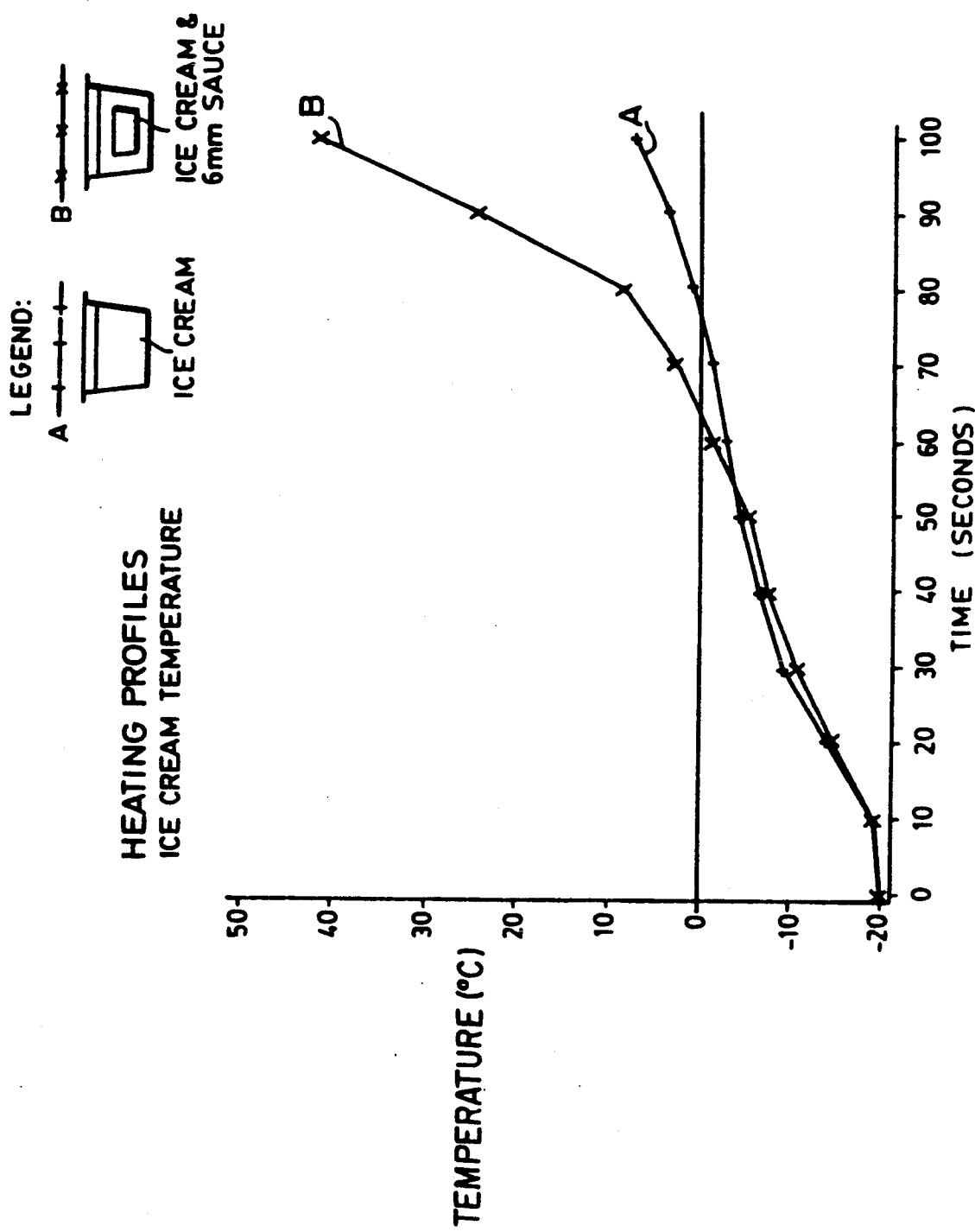

FIG. 30 is a graph showing functional relationships between ice cream temperature and microwave heating time for ice cream in an unshielded container, one of the products was enrobed in a layer of sauce.

Figure 31:
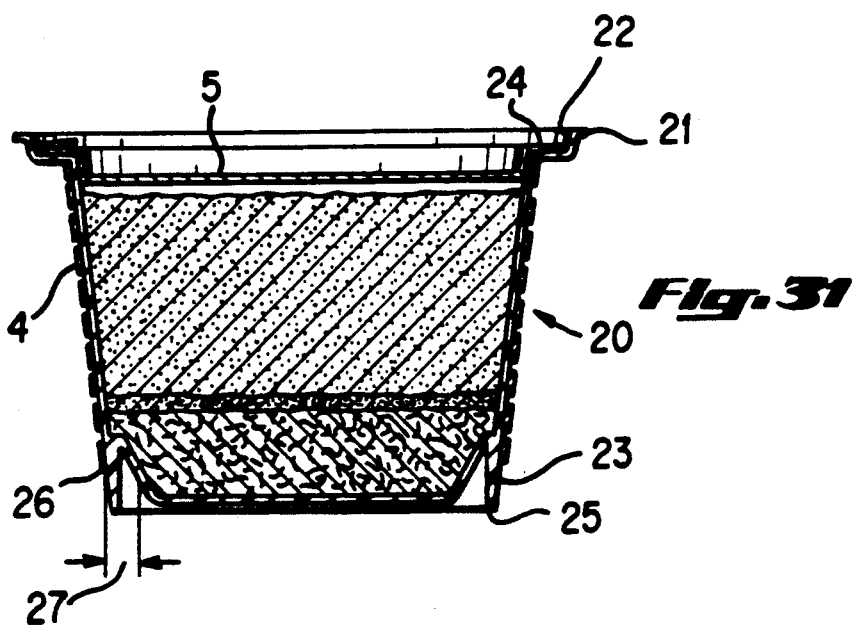

FIG. 31 is a sectional view of a container.

FIG. 32 is a graph showing functional relationships between relative heating rate and distance from the top of a food system for a fudge sauce in an aluminum pan (Example 5).

FIG. 33 is a graph showing functional relationships between relative heating rate and distance from the top for a fudge sauce in a plastic pan as described in Example 5.

FIG. 34 is a graph showing functional relationships between relative heating rate and distance from the top of a food system as described in Example 6.

FIG. 35 is a graph showing functional relationships between relative heating rate and distance from the top for a food system as described in Example 7.

FIG. 36 is a graph showing functional relationships between relative heating rate and distance from the top for a food system as described in Example 8.

Figure 37:
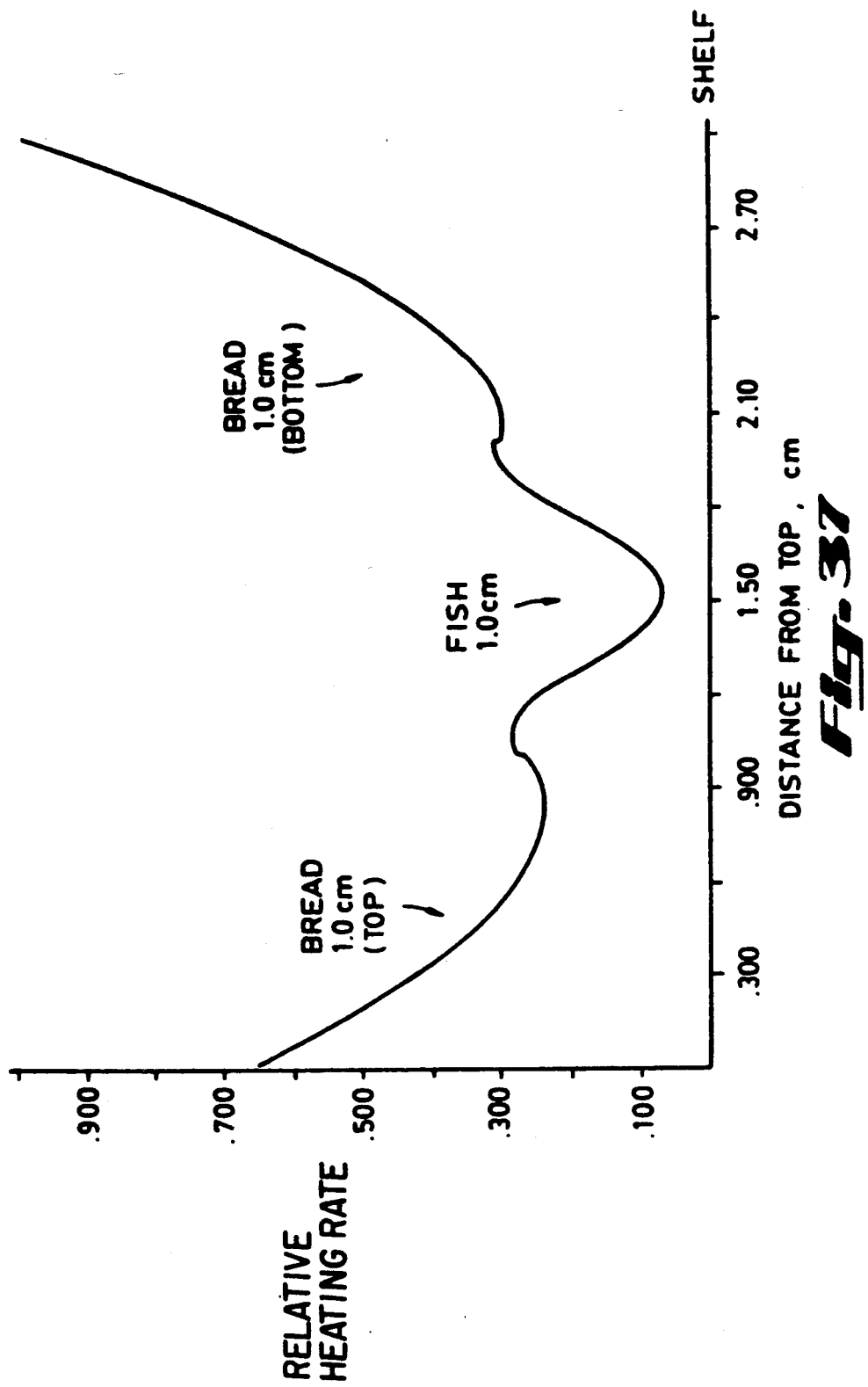

FIG. 37 is a graph showing a functional relationship between relative heating rate and distance from the top for a food system as described in Example 9 wherein fish is positioned between two pieces of bread.

Figure 38:
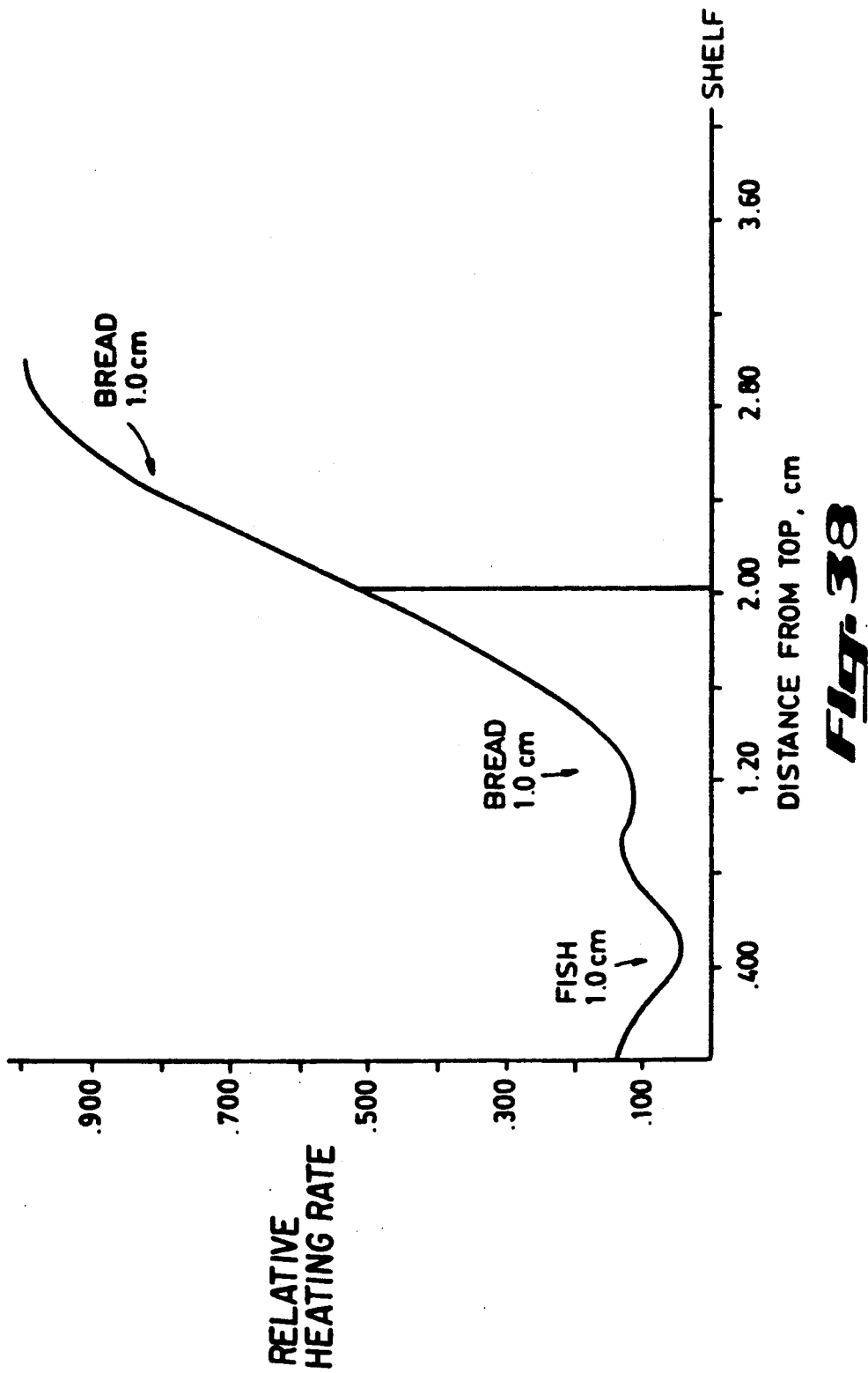

FIG. 38 is a graph showing a functional relationship between relative heating rate and distance from the top for a food system as described in Example 9 wherein fish is placed on top of two pieces of bread.

Figure 39:
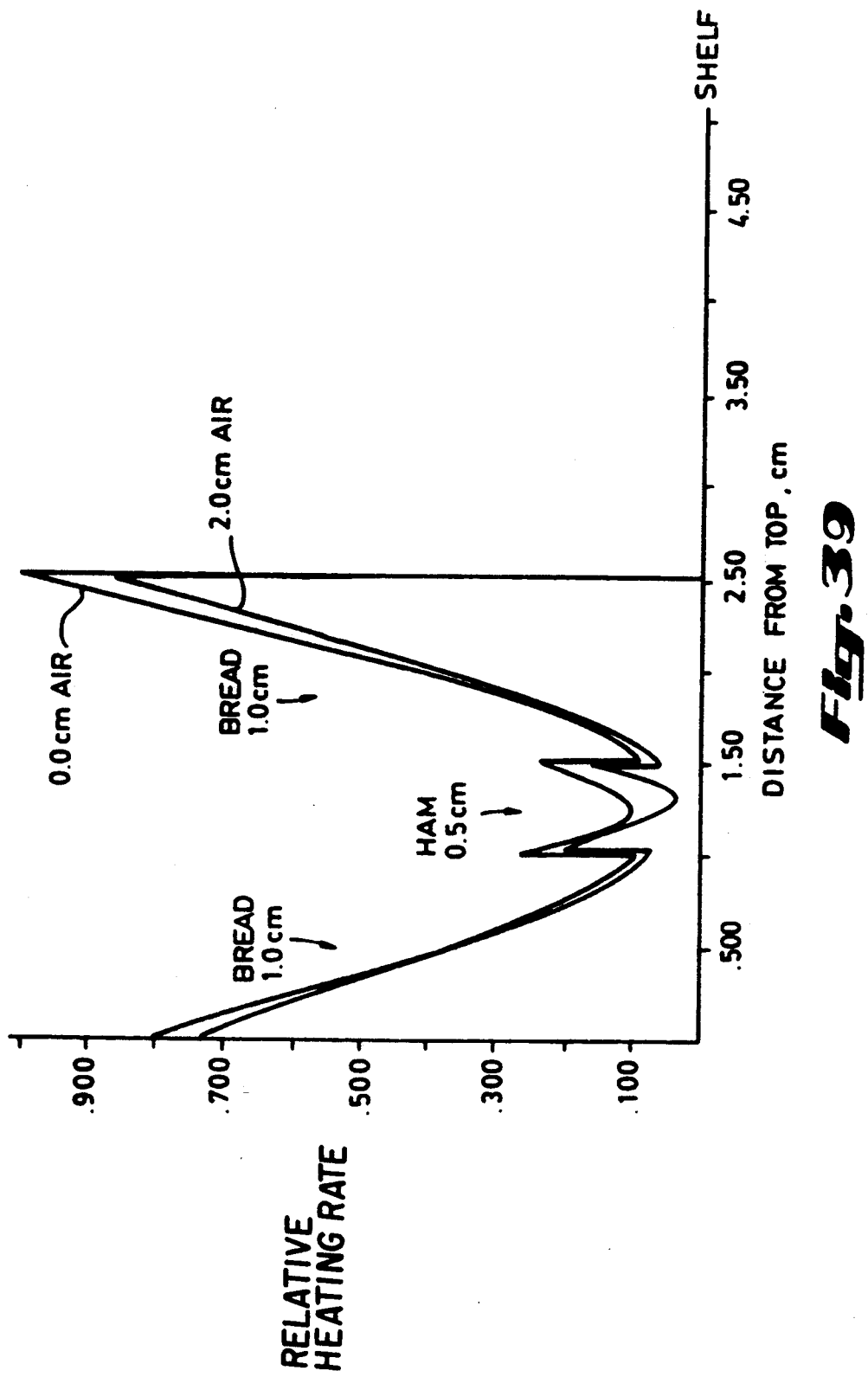

FIG. 39 is a graph showing functional relationships between relative heating rates and distance from the top for a food system as described in Example 10 wherein ham is positioned between two pieces of bread.

FIG. 40 is a graph showing functional relationships between relative heating rate and distance from the top for a food system as described in Example 10 wherein fish is positioned between two pieces of bread.

Figure 41A:
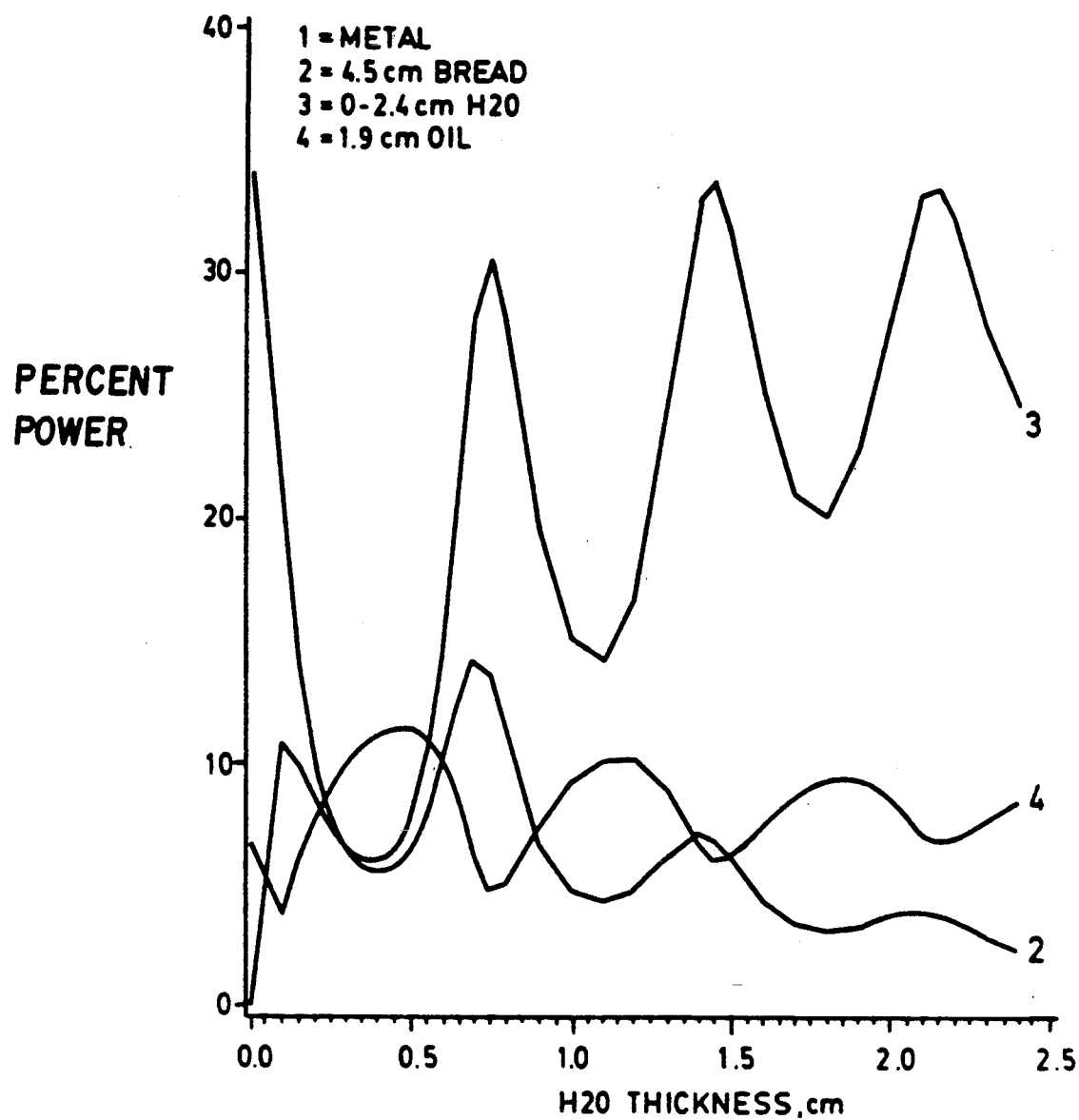

FIGS. 41A, B and C are graphs showing a functional relationship between percent power absorbtion for each layer in a system as a function of the thickness of one layer in the system which is varied. In this figure, the following relative complex dielectric constants were used: oil (2.6–i0.147); water (76.5–i11.1); and bread (2.85–i0.75).

Figure 42A:
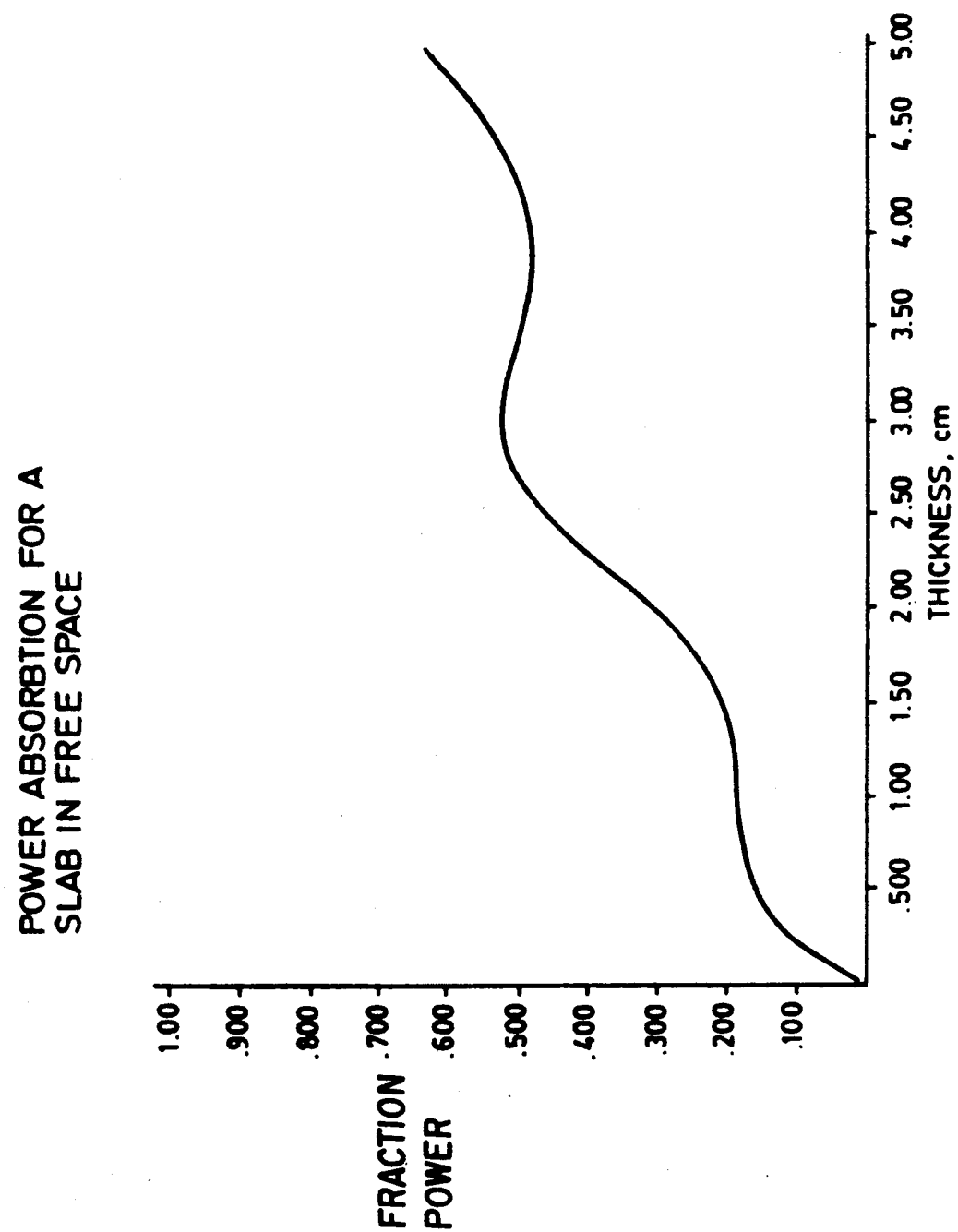

FIGS. 42A, B and C are graphs showing, respectively, the functional relationship between power absorbtion and layer thickness, the first derivative of power absorbtion vs. thickness, and the absolute value of the first derivative of power absorbtion vs. thickness. FIG. 42A was calculated from equation 3 with $E'=5$ and $E''=1$.

DETAILED DESCRIPTION

The physics of microwaves in a food system is extremely complicated and little is known about how microwave heating in foods is accomplished. The complication, in large part, could be due to the fact that food systems themselves are extremely complicated, presenting many looks to the microwave field. Such things as preferential heating, the differing chemical natures of foods, nonhomogeneity, the varying locations that discreet food items with different microwave characteristics are positioned next to one another within a single food system, hot and cold spots in an oven, etc. These all complicate the food scientist's and package designer's jobs in designing food products for heating in a microwave oven.

In developing the hereinafter described differentially heating food products, certain discoveries were made about the characteristics of the edible components of these systems which were a surprise. The major surprises were that through property selection one could control how much incident radiation can be shielded by, or how little will be transmitted through, some food components or edible substances and how little effect conductive heat transfer can have in the overall heating of food products within the short time necessary to heat food items in a microwave oven. Other surprises were that: theoretically an increase in thickness in excess of a minimum does not necessarily substantially change the shielding value and a change in thickness above the minimum can simultaneously change absorbance and reflectance oppositely in cycles. As can be seen in FIGS. 9A, B, and C, absorbance and reflectance cycles with increasing thickness in an opposing manner as thickness increases over small dimensional changes allowing great latitude in product design. The combination of the low microwave transmission of certain food components and the small role that conduction and other forms of heat transfer can play, provided the basis for achieving controlled differential heating in multicomponent food systems, i.e., two or more food or edible components positioned adjacent or proximate to one another. Within a given time of heating in a microwave oven we have been able to achieve predictable and controlled temperatures which were different, say for example, 11° C. or more, with some differentials being as high as 65° C. to 80° C. and even as high as 110° C. (See FIG. 2) over small distances, for example 2 cm. Even more surprising is that the food systems of this invention are tolerant to different ovens and varying heating times. These tolerances are important for the effective preparation of the items by consumers.

Tolerance is important because of timer variation from oven to oven, the different power outputs of different ovens and because of the hot/cold spot phenomena in ovens. This means that for a given time of exposure, the amount of available energy for heating a food product can significantly vary thereby causing the product to be either overheated or underheated. Without tolerance, consumer acceptance of heat sensitive food products could be unacceptably low. Tolerance of products is dependent on the particular product being heated and the consumer concept of quality for that particular product. For example, ice cream, which is very sensitive to heating, has a very small heat tolerance range. Quality ice cream should be stiff or viscous and not soupy. In contrast, soup, which is not sensitive to overheating, would be very tolerant. What is meant by tolerance herein, is that given the above described variabilities in microwave ovens, etc., that a substantial percent of the products after being heated in a microwave oven according to the instructions will have a level of quality acceptable to the consumer. Tolerance can be tested organoleptically which is a standard procedure in the food industry.

FIG. 1 shows a food system which was a basis for the present invention. Food item or component 1 is a brownie and food item or component 2 is ice cream. It was desired to heat the brownie to a serving temperature of approximately 43°–60° C. while the ice cream remained "frozen", i.e., at a temperature of approximately −9° C. or colder without appreciable localized melting of the ice cream for example at the interface between the brownie and ice cream. As used herein, unless otherwise designated, frozen means the product is at a temperature of less than 0° C. Container 3 has a shield 4, preferably metal, on the sidewall, extending from the top down to approximately the top surface of the brownie. The top of the container also has a shielding closure or lid 5, preferably metal, to shield incident radiation from the sides and top of the ice cream. The lid 5 is removably secured to the container 4 and can be glued or heat sealed on and preferably includes a piece of metal foil, for example, aluminum foil, attached to the top of a container in a manner as is known in the art. The shield or control layer 6 is positioned between the layers 1 and 3.

FIG. 27 illustrates another form of the present invention and contains two different edible products 7 and 8. For example, layer 7 can be a sauce, shielding or control layer positioned inside cup 3. The cup 3 can also have the shield 4 therearound. The lid 5 shields the open end of the cup 3 and, as seen in FIG. 1, can be recessed in the cup 3. The layer of product 8 can be, for example, ice cream. The form of the invention shown in FIG. 27 can be, for example, a layer of cheese sauce 7 and a layer of broccoli 8 as described hereinafter in one of the examples.

FIG. 28 shows a still further embodiment of the present invention which includes a cup 3 having a lid 9 secured to the top thereof in any suitable manner. The lid 9 need not be metal if the shielding or control layer 10 has sufficient shield value. Enrobed within the layer 10 is another edible component 11 which can be, for example, ice cream, and the shield layer 10 can be a sauce. If the shield value of the layer 10 is adequate, then the shield 4 as shown in FIGS. 1 and 27 need not be added.

FIG. 29 shows a still further embodiment of the present invention comprising a two-component food product. In this example, the control layer is the layer 14 sandwiched between or encased in edible component 15. In this particular embodiment, the control layer 14 can have its physical properties adjusted as hereinafter described to help control the heating of the exterior layer 15 while controlling the relative values of its own absorbance and reflectance.

In the development of the present invention, a three layer system was initially used, i.e., a layer of brownie, a layer of sauce thereon, and a layer of ice cream on top of the sauce as seen in FIG. 1. It was noted that when the layer of sauce was eliminated there was more heating and melting of the ice cream. Then, various control layers were interposed between the brownie and ice cream. It was initially believed that the improved performance from the sauce layer was due to the thermal insulation of the intermediate layer. To test this theory, experiments were conducted using aluminum foil and a silicone foam insert as the intermediate layer. The results of that type of experimentation are shown in FIG. 2. The surprise was that it was not thermal insulation which was making the sauce layer prevent heating of the ice cream, but it was in fact the nontransmission of microwave energy to the ice cream. This is graphically shown by the fact that the highest temperature differential is achieved by a very good conductor of heat and a perfect reflector of microwave energy, i.e., the aluminum foil, while the good insulator and high transmitter of microwave energy, provided one of the lowest temperature differentials. At this same time, the theoretical understanding was being developed which explained the phenomenon of reflectivity and absorbance as functions of thickness and dielectric properties of certain types of food products.

Thus, by interposing an unneeded intermediate edible layer 6 of sauce between the ice cream 2 and the brownie 1, which was initially added only for meeting the definition of the product concept, i.e., a brownie with chocolate sauce and ice cream, the temperature differential between the brownie and ice cream was substantially increased when the properties of that layer were properly selected.

The shield or control layer(s) can be defined as an edible layer that affects the microwave irradiation of another edible product or component in the food product, i.e., it is capable of being used for control or it is selected or intended for the purpose of control or is suitable for control. It is to be understood that all components have an effect on the system to some degree. The use of the layer as a shield can provide shielding control of the time/temperature relationship and final temperature of one or more of the components of the system.

With the use of the invention, effective heating of the brownie and almost complete elimination of detrimental heating of the ice cream were achieved. It was found that this intermediate layer, if it had a high water content, was very low in transmissivity (high in the sum of absorbance and reflectance) of the incident power thereby acting as an effective edible shield when positioned between the food product to be shielded and the microwave environment. It was also a surprise that the control layer could also enhance heating of the brownie thereby reducing the time of exposure to radiation for a given brownie size. The invention permits the design and use of new types of microwave products because edible instead of nonedible shields, as in U.S. Pat. No. 4,233,325, can be used. This edible shield in combination with the side and top metal shield, as seen in FIG. 1, prevented detrimental heating of the ice cream within the time period required to heat the brownie, thereby improving the performance of the multi-component food system. Thus, this interposed layer is an edible shield which fulfills a long felt need in microwave food heating.

FIG. 2 shows temperature differentials which graphically illustrate the effectiveness of the present invention compared to a food system with no intermediate layer and an ineffective layer.

In order to test the theory of operability of the present invention, certain experiments were conducted. Some of the results are illustrated in FIG. 2. A brownie-sauce-ice cream system was used and opposite ends of the spectrum of reflectance and heat transfer were also tested using a brownie-metal foil or silicone foam-ice cream system. Line A in FIG. 2 shows heating results when an aluminum foil layer was positioned between the brownie and ice cream. This foil, for practical purposes, is a perfect reflector (no transmission or absorbtion) and a perfect conductor of heat. Another experiment utilized an insulating layer, which for practical purposes is a perfect transmitter of microwave energy and a perfect thermal insulator. The particular layer was a silicone foam. Line E in FIG. 2 shows heating results for this foam layer.

FIG. 2 shows a functional relationship between temperature differential and heating time for a three component system as shown in FIG. 1 having a brownie and an ice cream layer with an interposed shielding layer. Temperature differential is the temperature difference between the brownie and the ice cream. The temperatures were taken in four places, two in the brownie 1 cm up from bottom and 2 cm in from the side and two in the ice cream 3 cm up from bottom and 2 cm in from the side with at least 8 runs for each sample with the temperatures being averaged numerically. The sauce had a thickness of 6 mm with the high moisture sauce having a free water content of 37%. (Unless otherwise indicated all component concentrations listed herein are percents by weight). The normal or control sauce had a free water content of 24%. The foil used was aluminum foil with a thickness of 0.0025 cm and the edges fit tightly against the inside wall of the container. The foam pad was a silicon foam having a thickness of 3 mm also fitting tightly against the inside surface of the cup. The no intermediate layer product had the brownie and ice cream in contact with one another. The brownie had a thickness of 1.7 cm and weighed 42 grams and the ice cream had a butter fat content of 12% by weight, an overrun of 70% and a charge weight of 60 grams.

FIG. 2 shows that the lower the transmission of microwave energy, through the use of a reflector like metal foil or higher moisture content sauces, the higher the temperature differential. The foam pad which provided the highest transmission and the best insulation, generally provided the lowest temperatue differential showing that it is the transmission of microwave energy which is the primary cause of heating the shielded component. The temperature profile of heating of the foam layer product is Line E, FIG. 2. The reversal of the curves for the no intermediate layer and the foam pad at about 80 seconds is probably due to conductive heat transfer showing an effect with time.

It can be seen that the aluminum foil, the "perfect" reflector and "perfect" conductor of heat provided the highest temperature differential while the foam, a "perfect" transmitter of microwave energy and "perfect" insulator, provided the lowest temperature differential. The prior art had discussed the need for insulators to prevent detrimental heating. Thus the best performance, with regard to temperature differential, being from the best heat conductor and the worst performance being the poor heat conductor was a surprise. These results provide support for the theory that it is control of the transmission of microwave energy in food systems of this type which is the key contributing factor to achieving temperature differential, not thermal insulation which the prior art considered to be required. Thus, a relatively high heat conductive layer with controlled transmissivity can be effectively used.

The theory of operation of the present invention is further illustrated in FIGS. 9A, B, and C which show curves for reflectance, absorbance, shielding, and related properties of the intermediate layer as a function of layer thickness. The curves are based on calculations. FIG. 9A is specific to the control sauce type intermediate layer described above and having the following properties $E'=13$ and $E''=3.5$ which has a free water content of 24%. FIGS. 9B and 9C utilize different $E'$ and $E''$ values for comparison and would represent layers with increased water contents. The locations and intensities of the maxima and minima on these types of curves are dependent on the dielectric properties of the layer material.

The disposition of microwave energy in the product in FIG. 1 can be approximately defined by the theoretical relationships in FIGS. 9A, B, and C. For example, the amount of microwave power that is delivered to the brownie is largely dependent on the amount of power reflected by the intermediate layer. However, the amount of power that is delivered to the ice cream is largely dependent on both the amount of power reflected by and absorbed in the intermediate layer. Thus, by addition of the amount of power reflected by and absorbed in the intermediate layer, it is possible to determine the amount of power that has been shielded by the intermediate layer as shown in FIGS. 9A, B, and C. The relative heating rate of the intermediate layer which was calculated from the absorbance and thermal load of the layer is also displayed in FIGS. 9A, B, and C. It is apparent that the effectiveness of the layer as a shield can remain high through a wide range of thicknesses, but its absorbing and reflecting properties and subsequently its ability to heat can vary significantly with a change in thickness. In general, an increase or decrease in absorbance or reflectance results in a decrease or increase, respectively, in the other. The relationships described in FIGS. 9A, B, and C show that food materials can act the same as other shielding boundaries and differently because it can also absorb, thereby allowing the achievement of temperature differentials and differential heating as desired in the product in FIG. 1 or the achievement of other beneficial dispositions of microwave power within a food product in an effective and controlled manner.

Another test of the theory of operability of the present invention involved the measurement of the temperature differential between the brownie and the ice cream as a function of intermediate layer thickness. To understand the results one should review FIG. 9A, a theoretical series of curves based on a layer having $E'=13$ and $E''=3.5$. This figure indicates that the percent of power reflected by the intermediate layer should rise from zero to a maxima and then fall to a minima between layer thicknesses of 0 cm and about 1.6 cm. The power reflected by the intermediate layer helps heat the brownie in FIG. 1 and also helps shield the ice cream, thereby, exerting a major effect on the temperature differential between the two components. FIG. 7 illustrates the results of experimentation varying intermediate layer thickness of the brownie-sauce-ice cream system between 0 cm and 1.6 cm. On the three dimensional graphical representation, FIG. 8, temperature differential is plotted as a function of both layer thickness (mm) and microwave preparation time (P, seconds). It is observed that the curve of this plane in space shows a strong relationship to the shape of the reflectance curve of FIG. 9A. Thus, the theory and the practical application of that theory are in good agreement.

Another test of the theory of operability of the present invention involved the measurement of intermediate layer temperatures as a function of intermediate layer thickness. As illustrated in FIG. 9A, the relative heating rate of the intermediate layer is highest at very low thicknesses, falls to a minimum and then rises to a maximum at about 1.6 cm. FIG. 22 illustrates the results of experimentation measuring the sauce temperatures of the brownie-sauce-ice cream system at sauce thicknesses between 0.4 cm and 1.6 cm. As can be seen from this data the heating rate is highest at 0.4 cm (temperature in still lower sauce thicknesses cannot be accurately measured with a Luxtron model 750 fluoroptic thermometric system), slightly lower at 0.8 cm, lowest at 1.2 cm and then higher again at 1.6 cm. A mathematical model of sauce temperature as functions of sauce thickness and microwave preparation time was prepared using this data. The three dimensional representation of this model is illustrated in FIG. 23. It is observed that the curve of this plane in space shows a strong relationship to the relative heating rate curve of FIG. 9A. Thus, again, the theory and the practical application of that theory are in good agreement.

By properly selecting, either by calculation or empirically, the thermal loads of the two main components of the system in combination with proper microwave characteristics of the shield layer effective differential heating can be achieved in a three or more component system. Further, work has also indicated that in a two component system, one component with properly selected properties can also be effectively used to shield the other component to achieve differential heating. For example, this might take the form of cheese sauce and broccoli wherein the broccoli can be on top of the cheese sauce. The cheese sauce can be heated and also act as a shield to prevent the broccoli from objectionable heating or overcooking. The time necessary to heat such systems also needs to be controlled in relation to the physical characteristics of the food system components.

By selecting the relative thermal loads of the components in the multi-component system, the dielectric properties (e.g., $E'$ and $E''$) and geometries of the components of the system, it is possible to reliably control the absorbance, reflectance, transmission, and shielding ability of them and subsequently reliably control the disposition of microwave power in a multi-component food system. Geometry has an effect on the system. For example, the physical dimensions of, the shape of and the relative positions of the components play a part. These can be selected empirically or through experimentation. It is preferred that the shield layer be generally the same shape as the surface it is in contact with, i.e., it coincides with the shape of the edible components adjacent thereto.

The series of curves illustrated in FIGS. 9A, B, and C indicate the dependency of the absorbance, reflectance, shielding ability (absorbance plus reflectance), and layer heating rate on the dielectric constant ($E'$) and dielectric loss factor ($E''$) with varying layer thicknesses. FIG. 9A represents the relationships for the chocolate sauce described above as calculated from a mathematical model of that chocolate sauce layer (24% free water) suspended in space. This sauce is believed to have values of 13.0 and 3.5 for $E'$ and $E''$, respectively at room temperature. As the values of $E'$ and $E''$ increase in FIGS. 9A, B, and C, the intensities (amplitudes) of all the peaks on similar plots increase while the wavelength of the generally sinusoidal curves decreases. This is illustrated in FIG. 9B which is projected for an intermediate layer with the following dielectric properties of $E'=26.0$ and $E''=7.0$. Further increases in these values to $E'=39.0$ and $E''=10.5$ yield the relationships illustrated in FIG. 9C with even higher intensities and lower wavelengths. Consequently, by controlling the thickness and dielectric properties of the intermediate layer it is possible to control the reflectance, absorbance, shielding ability, and heating rate of that layer and vary reflectance and absorbance several times over a wide range of thicknesses above a minimum thickness. This permits the design of numerous products having acceptable performance at different thicknesses. It is also possible to use the above described relationships to design even single component food products to heat in accordance with the same criteria set forth for the multi-component systems.

In addition to controlling the functionality of the active or shield (intermediate) layer one should also consider the properties of the materials (layers) adjacent the active layer. For example, the shielding ability of the intermediate layer can be varied as described above to optimize the shielding effect but the microwave and thermal loads of the component being shielded, and other components as well, should also be considered. If the sauce in the example discussed remains constant and is shielding about 80% of the incident microwave power as is suggested in FIG. 9A, the remaining 20% transmitted through the layer will have a greater effect on raising the temperature of a small amount of ice cream than it will on a large amount just due to the thermal load of the ice cream. This is illustrated in FIG. 21 which shows the effect of the amount of ice cream being shielded with a constant intermediate layer. It can be observed that the small amount of shielded ice cream heats up more rapidly than higher amounts of shielded ice cream.

Therefore, one should first consider the relationships identified in FIGS. 9A, B, and C to optimize the desired property (i.e., reflectance, absorbance, heating rate, and/or shielding ability) of the active (intermediate) layer. One should then consider the effects of the materials in close proximity to the active layer as seen in FIG. 21.

It is likely, in certain cases, such as small single serving type products, say 200 grams or less, where the thermal and microwave loads are small, that these factors will not combine to yield a satisfactory product. If this occurs, the use of packaging shields and/or absorbers, as part of the total product may be required.

As seen in FIGS. 10, 11, 21, 25, and 26, the importance of relative thermal load and the need for shielding in low thermal load products are graphically illustrated.

Performance estimates can also be calculated for systems with and without shielding. This was done for a a 5 cm. cube of ice cream with an assumed E' value of 3 and an E" value of 0.8 and 100% overrun. The time to half-melt the ice cream in a cube form was calculated for differing shielding arrangements. Energy required to half-melt the ice cream of 62.5 grams was 336 calories by calculation which in a 700 watt oven will half-melt in about 26 seconds if unshielded. This can be calculated by the equations:

$$P/V = 2\pi E_o f E'' |E_{rms}|^2 \tag{1}$$

$$T = Q/P \tag{2}$$

Where:
P = Power
V = Volume of product
$E_{rms}$ = Electric field strength
f = Frequency
E" = Dielectric loss
$E_o$ = Permittivity of free space
T = Time required to half-melt
Q = Heat required to half-melt Based on theory, if the product is shielded on all but one side and is in the form of a cube so that all sides are of equal area, incident power on the ice cream is 1/6 of the unshielded cube case which by calculation would take about 2½ minutes to half-melt. If the open side of the shield has positioned therein, a shielding sauce layer with 60% reflection and 20% absorbance by the shield layer, time to-reach half-melt would be approximately six minutes and thirty seconds. However, if one assumes a shielding layer with dielectric properties characteristics of butter 0.8 cm thick having a reflectance of about 25% and an absorbance of about 10%, then the time to half-melt, by calculation, would be about three and a half minutes, i.e., not much different than the unshielded version.

It is seen that the shielded cube decreases the incident microwave power by about 5/6. In addition a poor reflecting layer (e.g., butter with 25% reflection) in the shielded cube (packaging shields on the sides and top) will only be about 53% as effective as the high reflectance sauce product at shielding the ice cream (i.e., melts in 53% of the time). The same amount of ice cream totally unshielded will be 7% as effective and the ice cream in the shielded cube without a sauce layer will be about 40% as effective as the system with a high reflectance sauce. This calculation shows that proper selection of control layer thickness and dielectric properties in combination can be used to practice the invention.

In the practice of the present invention a determination which needs to be made is the desired temperature or heating differential. Another determination which needs to be made is how the product will be distributed. Will it be distributed frozen, refrigerated or shelf stable, i.e., the starting temperature of the product needs to be known. More importantly, the properties of the product just prior to exposure to microwave radiation should be known to properly design the product. Generally a product will be microwaved directly from storage and the storage conditions will be the starting condition of the product. However, a product may be stored at −10° C. but heated after a thaw or preheating period. The microwave properties could be substantially different at these different temperatures. Thus, the properties of the product as hereinafter described are those just prior to the product being exposed to microwave radiation for consumption. This would be after preheating, thawing, etc. either in the microwave, after holding at an elevated temperature or the like. Usually it is the final and major exposure to microwave radiation that prepares the product for consumption that is the condition for which the product is designed. By selecting the relative thermal loads, adjusting the dielectric properties of the components of the food system, the reflectance, absorbance and transmission of the shielding component and the time necessary to heat the portion which should be hotter or require more heat input, the desired differential can be reliably achieved.

In order to practice the present invention effectively, the shielding layer should be immiscible with the other layer(s) in contact therewith. Immiscible means that the two layers remain substantially separate or distinct having a substantially distinct interface between the two layers. Immiscibility can be achieved by the control of the properties of each of the layers or can also be provided by a barrier film between the two layers which is also preferably edible. What is believed to be important is not a complete separation of the layers over time, but the provision of a sharp change or break in dielectric properties (E' and/or E") at the interface between the two layers. Preferably the layers remain immiscible, at least initially during exposure to microwave radiation. Also, the shielding layer should be high in water because 1) water is inexpensive, and 2) water is a very effective and edible shield and has easily variable dielectric properties by the addition of viscosifiers and other soluble materials. The water should preferably be non-frozen, i.e., in this case not in the ice or crystalline form even when it is at a temperature below 0° C. Ice content can be easily affected by the addition of freezing point depressants such as sugars, salt, etc. Also, by adding sufficient viscosifiers such as starch, gums or sugars or others, it could easily be made immiscible with a host of other food product layers and by binding the water effectively with the additives there will be little moisture migration during storage and can be stored over a wide range of temperatures without losing its immiscibility. An edible barrier can also be interposed between two layers to provide immiscibility if less viscous or higher water layers are desired.

As seen in FIGS. 9A, B, and C, by changing the dielectric properties of the shielding layer, which can be easily done by changing the free water content, the functionality of the shield can be easily adjusted.

As seen in FIG. 24, if the shielded product is less tolerant to heat take-up or temperature increase, e.g., small thermal load or degraded by a small increase in temperature or heat uptake, then more shielding is required. Conversely, if the product is more tolerant to heat uptake or temperature increase, then less shielding is required. The tolerance to heat of the shielded product is dependent upon its dielectric properties, its thermal mass and also its sensory attributes. The amount of shielding can be varied as discussed above by varying the makeup of the shielding layer and also by using in combination therewith metal shielding or other shields. As seen from the disclosure herein, the smaller the food item that is to be shielded, generally the more incident radiation which needs to be shielded from the product particularly when it is not very tolerant to heat uptake as for example ice cream.

It is believed important that the boundary between the food component layers be distinct, i.e., provide an abrupt change in impedance at layer boundaries, in order to consistently achieve a desired profile of microwave power deposition within the multi-component food product. Air gaps may occur between food component layers, and it is within the scope of this invention to adjust air gap-thickness(es), or eliminate said gap(s), to achieve a desired profile of microwave power deposition within the multi-component food product. From reviewing the graphs of FIGS. 9A, B and C and FIGS. 41A, B and C, it is seen, particularly for products with high E' and E" values that portions of the power absorbtion curves have very steep slopes as they relate to a change in a particular layer thickness. Thus, desirably, in using FIGS. 9A, B and C, the layer thickness is chosen at about or beyond the peak of the initial incline so that minor variations in thickness do not adversely affect the amount of transmitted microwave energy particularly for systems intolerant to heat uptake. This peak or change in slope of the shield value curve can be approximated by the first point of inflection of the first derivative of the shielded power curve. For example, in FIG. 9A, the first point of inflection occurs near 80%. Also, the required thickness of this layer can be changed by varying the dielectric properties of the layer and achieve the same shield value.

Figure 41B:
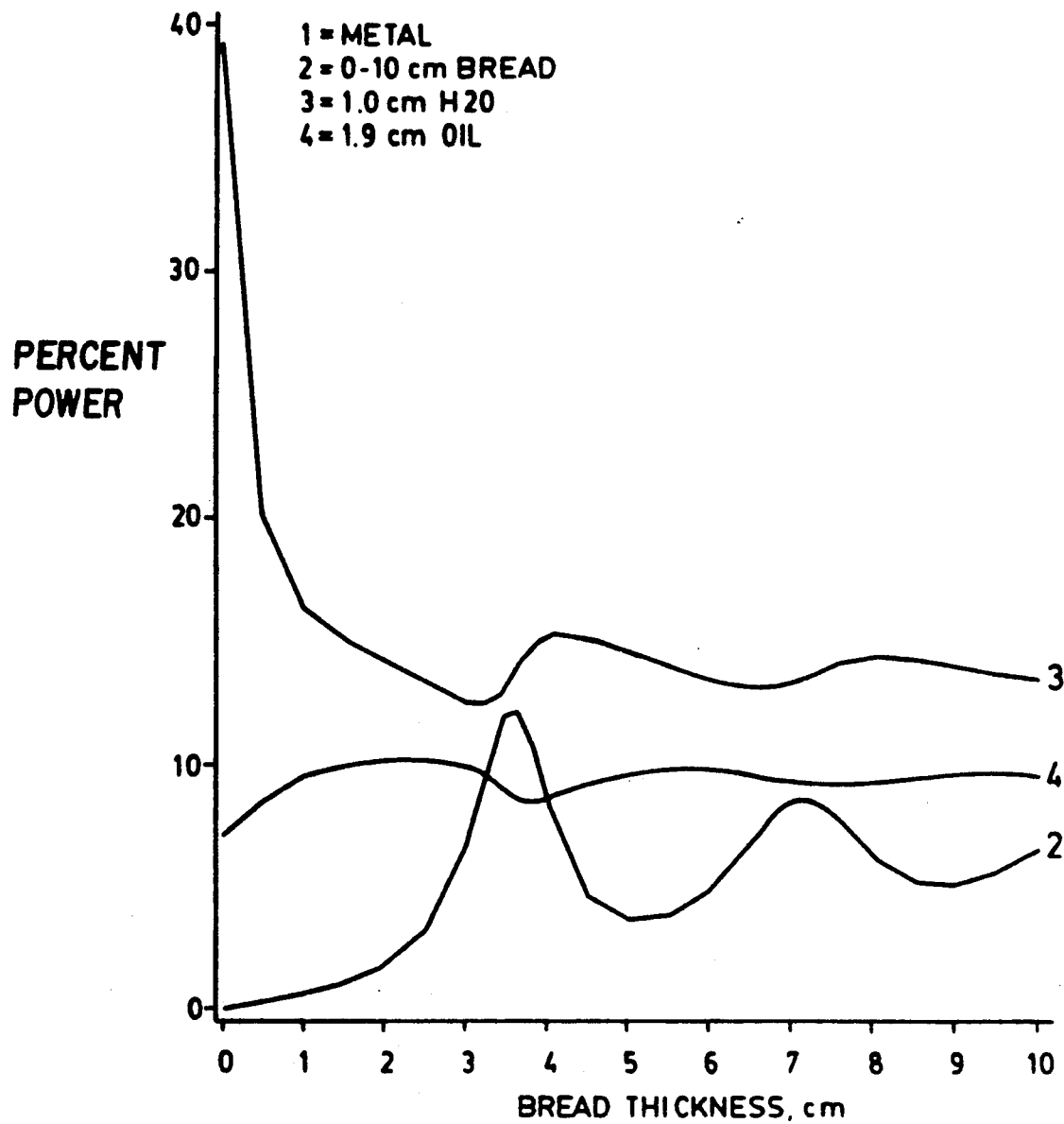
Figure 42B:
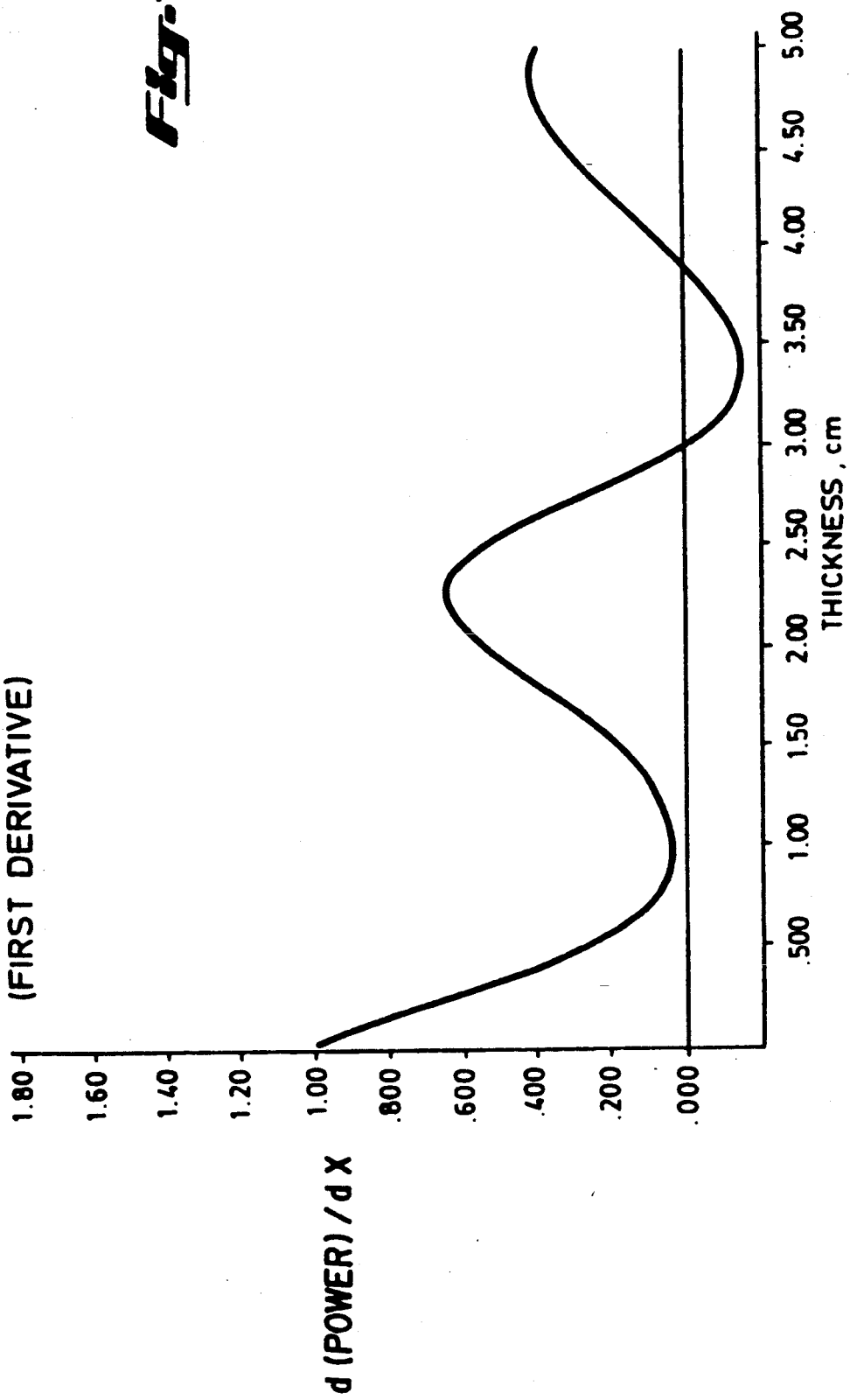
Figure 42C:
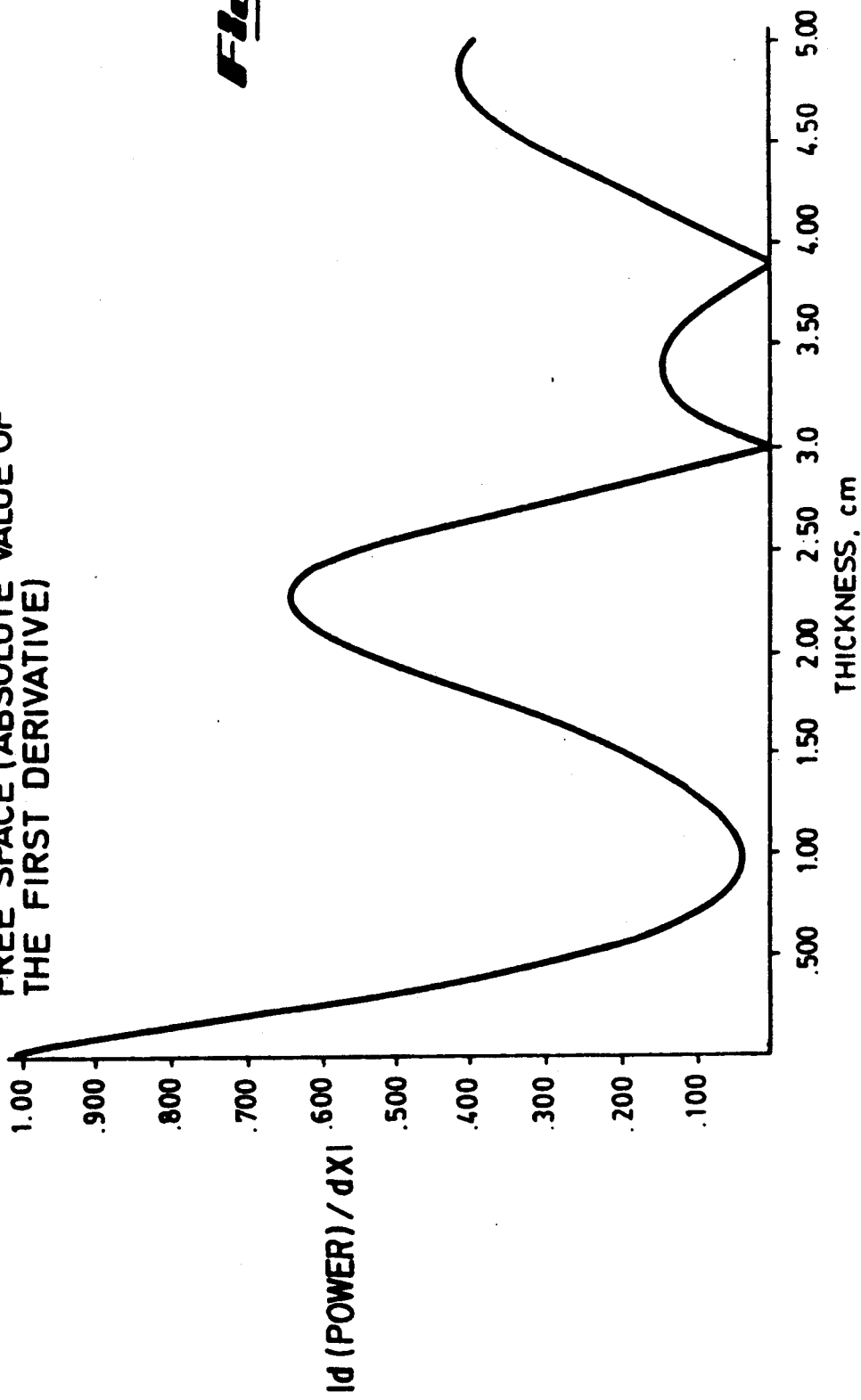

Further, in reviewing FIGS. 41A, B and C, desirably, layer thicknesses are chosen at about a zero or near a local minimum in the curve relating the absolute value of the first derivative of the power absorbtion curve so that minor variations in layer thickness or composition do not adversely affect the amount of absorbed microwave energy, particularly for systems intolerant to heat uptake. Typically, this occurs at about a local maximum or a local minimum in the power absorbtion curve. For example, in FIG. 41A, desirably, the water layer thickness would be approximately 0.4 cm, 0.75 cm, or 1.10 cm, etc., since these thicknesses produce local minima or maxima in the layer power absorbtion and would best enable one to achieve heating rate control. FIG. 41B, illustrates a case where, for bread thicknesses below 2.5 cm, the power absorbtion curves have no local maximum or local minimum; a local power absorbtion minimum occurs for water near 3.2 cm and a local minimum occurs for oil near 3.9 cm. FIG. 42C shows the absolute value of the first derivative of the power absorbtion curve in FIG. 42A. A local minimum in the absolute value of the first derivative of the power absorbtion curve occurs at a thickness of approximately 0.9 cm to 1.0 cm, and zeros in the absolute value of the first derivative of the power absorbtion curve occur at thicknesses near 3.0 cm and 3.8 cm. For the case depicted in FIGS. 42A, B and C, heating rate control would be more easily attained at thicknesses near 0.9 cm to 1.0 cm, 3.0 cm and 3.8 cm than, for example, near thicknesses of 2.3 cm or 4.8 cm. Also, the optimum thickness of this layer can be changed by varying the dielectric properties of the layers in the multi-component food system to achieve substantially the same result. Thus, one can see that a multi-component layered food system can be easily manufactured to attain a desired power deposition profile within the food system.

As described above the shield layer is used to control the amount of energy transmitted to the shielded component. Preferably the shielding layer has thickness such that the shield value (absorbance plus reflectance) just prior to exposure to microwave radiation for consumption is at least about 70%, preferably at least about 80%, and most preferably at least about 90% of the first point of inflection of the shielding power versus thickness curve. These values are determinable by calculation using the following equation to produce a shielding value curve as hereinafter described in reference to determining absorbance and reflectance values. Based on theory and assuming a layer in free space, absorbance, transmission and reflectance can be calculated by Equation 3.

$$A = 1 - |t|^2 - |r|^2 \text{ where:} \tag{3}$$

$$t = \frac{4(n-ik)e^{\frac{-2\pi i(n-ik)d}{\lambda_o}}}{(n-ik+1)^2 \left(1 + \left(\frac{1-(n-ik)}{1+(n-ik)}\right)\left(\frac{(n-ik)-1}{1+(n-ik)}\right)(e^{\frac{-4\pi i(n-ik)d}{\lambda_o}})\right)}$$

and $$r = \frac{\frac{1-(n-ik)}{1+(n-ik)} + \frac{(n-ik)-1}{1+(n-ik)}(e^{\frac{-4\pi i(n-ik)d}{\lambda_o}})}{1 + \left(\frac{1-(n-ik)}{1+(n-ik)}\right)\left(\frac{(n-ik)-1}{1+(n-ik)}\right)(e^{\frac{-4\pi i(n-ik)d}{\lambda_o}})}$$

Where:
A = Fraction of absorbed power
d = Thickness
e = Base of natural log
$i = \sqrt{-1}$
k = Extinction coefficient
n = Refractive index
r = Reflected electric field intensity
t = Transmitted electric field intensity
$\lambda_o$ = Wavelength = 12.24 cm @ 2450 megahertz
$n - ik = \sqrt{E' - iE''}$ The terms absorbance, reflectance and transmission as used herein are defined as follows: absorbance (A) is that part of the incident power that is absorbed, reflectance $|r|^2$ is that part of the incident power that is reflected and transmission $|t|^2$ is that part of the power transmitted through the product or layer.

This equation is graphically illustrated in FIGS. 9A, B, and C. The formula is based on the product being a layer in free space at 2450 megahertz and can probably be improved for accuracy to include layers not in free space. Transmission and reflectance can also be measured by a Genesys Machine (manufactured by Gerling Laboratories) or a Hewlett Packard 8753A network analyzer.

Further, preferably the shielding layer has a substantial amount of water. Also, preferably, this water should be free water and unfrozen at the storage temperature of the product just prior to heating in the microwave oven. Preferably, the free water content be in the range of between about 20% and about 95%, preferably in the range of between about 24% and about 90%, and most preferably in the range of between about 27% and about 85% by weight of shielding layer just prior to exposure to radiation. This free water level can be measured by the procedure set forth in AOAC (methods of analysis) 14th edition, 1984 section 31.118 using an air oven and exposing the sample to 70° C. for 16 hours under a pressure of less than 50 mm HG. Preferably, the shielding component should have less than about 50% ice, preferably less than about 30% ice, and most preferably less than about 10% ice by weight of said component as measured just prior to exposure to radiation. Ice content can be measured by differential scanning calorimetry. The amount of free water and ice can be easily adjusted by controlling the additives to this layer, as described above, which can function as freezing point depressants as well as viscosifiers if desired.

If the water in the shielding layer is ice, its ability to shield is substantially reduced, but could be utilized in systems requiring little shielding.

Also, it is to be understood that the shielding layer as described above can be in multiple layers and can also be nonhomogeneous for example it could contain particulate material. With the described values for the layer applying to the composite layers as well. An example of this would be a sundae with both a chocolate sauce and a caramel sauce positioned adjacent to one another and forming a shield around, for example, ice cream.

The shielding or control layer has thickness and dielectric properties such that of the incident microwave power impinging from the oven side on the exposed, direct or indirect, major surface thereof about 20% to about 90%, preferably about 25% to about 80% and more preferably about 30% to about 80% of the incident power is reflected and about 10% to about 65%, preferably about 15% to about 65% and more preferably about 20% to about 65% of the incident power is absorbed and preferably the sum of reflected and absorbed power for shielding or control exceeds about 60% more preferably about 70% and most preferably about 80%. These values for absorbance and reflectance and also for transmission and shielding (as well as the first point of inflection as disclosed above) as disclosed in the specification and as used in the claims (except as noted below for a composite layer) are determined for a single layer by calculation from the above equation $A = 1 - |t|^2 - |r|^2$.

E' and E" can be measured with a network analyzer, such as a Hewlett Packard network analyzer. By using the E' and E" values in the equation absorbance, reflectance, transmission and shielding can be calculated. E' and E" and hence the absorbance, reflectance, transmission and shielding values are for the product at a temperature the same as that at which the product would be just prior to exposure to microwave radiation for consumption. For a multiple layer "layer", absorbance, reflectance, transmission and shielding can be measured or determined for the composite using a coaxial wave guide at the subject temperature as just described. The shielding value is the numerical sum of reflectance and absorbance values or 1.0 minus transmission.

The thickness of the shielding layer is selected to exceed a minimum thickness preferably above about 0.25 cm more preferably above about 0.4 cm and most preferably above about 0.5 cm. The thickness of the layer can be nonuniform and it is preferred that a major portion, preferably at least about 75% and more preferably at least about 90% and most preferably all, on an area basis, is in excess of these values. It can be seen from FIGS. 9A, B, and C that a thickness in excess of a minimum in practicality will only slightly change the amount of the shielding ability or value of the shielding layer. However, it can be seen from the curves denoted reflectance and absorbance that a further increase in the thickness can change the relative amounts of absorbance and reflectance allowing fine tuning of the time/-temperature relationship for heating during exposure to microwave radiation. This allows for the design of food products to achieve adequate shielding while being able to adjust the temperature of the shielding layer and outer layer(s) without significantly or substantially changing the shielding ability of the shield layer.

The above values are based on a microwave frequency of 2,450 megahertz. These values will change as the frequency changes. The most utilized frequency for operation of home microwave ovens is 2,450 megahertz and an industrially used microwave frequency is 915 megahertz. Thus, if the frequency changes the mode of control is the same but the values for thickness, dielectric properties, absorbance, transmission and reflectance will change but are accommodatable-with the theory and equations.

When viewing layered food systems from the perspective of multi-layer interference effects, it is the system that effects control of each of the edible layers. Power disposition (deposition) or absorbtion in a layer is controlled by the components of the food system. As used herein, food system includes the microwave oven cavity components, e.g. shelf, metal floor, air gap therebetween, packaging components, if any, utensils, if any, heaters, if any, the food layers or components, etc. Thus, if a layer needs little or no power or a lot of power this can be accomplished by manipulation of one or more of the food system components to provide controlled heating. The layered food system approach is described hereinafter.

The heating of any food system or product, including microwave heating, is dynamic and temperature varies with time and location in the product. This is particularly true with microwave heating because of the changing dielectric properties of the product as its temperature changes. Heating results in temperature gradients within each of the components and from component to component in a system. Further, because of the nonuniformity of microwave heating of a food product it can have hot and cold spots within the product. Therefore, it is difficult to define a microwave heated product by its temperature because of the variability of the temperature within such a nonuniformly heated product. Temperature can be measured at various locations within a product to determine an appropriate time/temperature relationship and would normally be done on an empirical basis after determining the proper location and number of the temperature probes. This type of data can be correlated to consumer testing of the product. However, the desired end result of heating is the perception by the consumer of the product temperature or temperature differential and/or the degree of cooking, e.g., overcooked or undercooked.

The time/temperature relationship of the product during heating determines both the final temperature and the degree of cooking, i.e., the total heat or energy uptake. Consumer perception of temperature and degree of cooking can be tested organoleptically, for example, too hot, too cold, overcooked or undercooked. In fact, actual temperature is not necessarily the relevant criteria, but the perception of temperature, for example, two ice creams which are at the same temperature can be consumed, but the sensation of temperature to a consumer is different. This can be caused, e.g., by the differing ice contents of the products, i.e., a high ice content product can be perceived as very cold when in fact it has the same temperature as a lower ice product.

A time/temperature relationship can be measured by temperature probes at given locations which can give a representative but incomplete indication of the dynamics of the system at predetermined locations. Such testing can indicate proper or improper heating. However, the final temperature of the product is better measured organoleptically. Thus, within the desired time range of heating, the product should not be overcooked or undercooked and should not become overly hot or stay too cold from an organoleptic standpoint or one product should not heat faster than another product, whereby, the consumer perceives the resulting product as not being properly heated. Preparation instructions can be devised by both organoleptic testing and temperature measurement systems for different wattage ovens to determine the appropriate time range and time/temperature relationship generally required to achieve an acceptable end product, i.e., within a temperature range for consumption.

Heating of a product is done within a predetermined or selected time/temperature relationship range and the final product temperature should be within a predetermined or selected temperature range. The final temperature can be that desired for consumption or the product can cool from the final temperature or equilibrate before consumption. The ranges are predetermined or selected by evaluating the heated or cooked product (s) for ensuring adequate heating to provide an acceptably cooked and/or appropriate temperature for consumption.

It can also be seen from FIGS. 9A, B, and C that there are several ways to design a product to achieve similar desired end results for a given product. If one needs to preselect the dielectric properties or the free water level because of product constraints, then an adjustment in the thickness of the shielding layer above a minimum thickness will vary the heating characteristics or time/temperature relationship as described above. It should be noted, according to theory, that absorbed power initially increases with an increase in thickness but quickly reaches a relatively flat response, i.e., a further increase does not substantially increase or decrease absorbance. Thereafter, further increases can substantially increase or decrease absorbance. Thus, with a given sauce, i.e., dielectric properties or free water level, the thickness can be varied to control the heating characteristics or time/temperature relationship. It would be preferred to preselect a range or ranges of thicknesses such that a change in thickness results in a relatively small increase or decrease or change in absorbance and reflectance values so that the thickness is not critical. If the layer thickness is a constraint, then the dielectric properties or free water level can be adjusted to achieve the same control over the heating characteristics of the shielding sauce layer. Another aspect of utilizing the invention is that the dielectric properties or free water level can be determined to be within predetermined ranges and also, the thickness can be predetermined to be within a predetermined range. Then, both the thickness and dielectric properties or free water level can be varied within these ranges to achieve the proper heating characteristics or time/temperature relationships during heating. Even more significantly, in making a three-layer product, for example, the brownie, sauce, and ice cream product, by changing the reflectance of the shield, thereby oppositely changing the absorbance of the shielding layer, the heating characteristics or time/temperature relationship of the brownie can be changed. The reflectance value of the shield can be increased or decreased thereby allowing fine tuning of the heating of the brownie by providing it more or less energy. Thus, it can be seen that the invention herein provides means for controlling the heating characteristics of one component foods as well the different components of a multi-component food system in an easy manner.

The foregoing explanation is based generally on a single-layer edible component positioned in free space. Although this is a good explanation and an effective way to make food products, further work illustrates the unexpected importance of other layers in the food system including those in a microwave oven and the interaction of layers. It has been surprisingly found through a theoretical analysis that all layers, whether part of the food product, package and even the oven should not necessarily be ignored in order to achieve desirable, predictable and/or consistent heating results. The magnitude of the effect of a change in a layer on the layer itself or other layers in the product in some cases was much larger than expected. A change in one layer affects the heating characteristics of the remaining layers and itself to some degree (in some cases inconsequentially).

When performing this analysis one should include all layers relevant to system heating. The analysis can be done using interference analysis techniques. Since the food product to be heated most often is in proximity to the oven's glass (plastic or ceramic) shelf which in turn lies above an air gap and the metal cavity floor, one should include all of these layers along with the food component layer(s) in the analysis, although in some cases the properties of particular layers may prove inconsequential to overall system heating. In general however, one should consider the effects on the food product of layers heretofore believed unimportant to food product heating. Thus, system analysis should include the air layer above the food product or package, the top product or package layer, subsequent product or package layers—including any air gaps, and the glass (plastic or ceramic) shelf, air gap, and metal cavity floor. These are all layers and some, e.g., the metal floor or a metal shield would be considered by some to not have dielectric properties and the computer program will accommodate them as hereinafter described. As used herein all layers of whatever material have thickness and dielectric properties including metal.

Extension of the single-layer treatment to multiple layers allows for one or more layers to be adjusted to control the disposition of microwave power within one or more layers in close proximity. The shield or control layers can be defined as one or more layers that affect the microwave power absorbtion, reflection and transmission of one or more edible products or components in the food product, i.e. they are capable of being used for control or they are selected or intended for the purpose of control or are suitable for control. It is understood that all components even oven and food package components, e.g., the metal floor, the shelf, the gap between the floor and shelf, packaging material, metal shields, microwave heater (e.g., that disclosed in U.S. Pat. Nos. 4,641,005 to Seiferth, 4,230,924 to Brastad et al or 4,267,420 to Brastad) etc. have an effect on the system to some degree. The use of one or more layers as shields can provide shielding control of the time/temperature relationship and final temperature of one or more of the components of the system.

Due to the fact that the multiple-layer free space treatment is inherently more complex than the single-layer treatment a better means of manipulating the important parameters involved has been devised. In the prior description involving the single-layer treatment, the inflection point of the first derivative of the shielding power curve of the control layer was used as a means of describing the shield layer's properties. It is more effective to adjust power absorbtion in the layer or layers and associated desired heating rates of those layers to make a heating controlled food system.

It is documented in food science literature that foods vary with respect to their dielectric properties. Dielectric properties are important in describing how microwaves affect a food material. The wavelength of microwaves vary within food products and other materials dependent on their dielectric properties which are dependent on temperature. Microwave power absorbtion is also dependent on the dielectric properties of food products and other materials. When several food or edible materials with different dielectric properties are assembled possibly with other materials in a multi-layered configuration, the microwave radiation will change wavelength and power absorbtion will change as the microwave travels through each of the layers. At the boundaries between the layers reflection can occur diverting some of the microwave back into a layer it has just traversed to be absorbed or transmitted. It will also interact with the incoming microwave to create a standing wave. The standing wave generated in this manner is dependent on the relationship between the phases of the incoming and reflected microwaves. Since microwaves are cyclic in nature the phase of the wave at the point that it interacts is dependent on the distance that the microwave has traversed as well as its wavelength. In the case of a multi-layer food product in an oven this distance is the thickness of the layers. Consequently, microwaves in a multi-layer food product would be in the form of a series of standing waves. The shape of these standing waves and the microwave power that is absorbed from them is dependent on the dielectric properties and thickness of each of the component layers. This invention teaches how the dielectric properties and thicknesses of the component layers of multi-layer food products can be manipulated to obtain desired power absorbtion and subsequently the heating rates in preselected layers.

At least one of four parameters should be considered when making a food product with desired power absorbtions in selected component layers. The number of layers, the position of each layer relative to each other layer, the thickness of each layer, and the dielectric properties (relative dielectric constant and relative dielectric loss factor) of each layer. A first step in practicing the invention is to identify the desired power absorbtion for the food product layer(s) of interest within the product as a whole and in some cases to identify certain layers within which the degree of absorbtion is inconsequential with respect to the overall food product quality. Then one of the layers of interest is tuned to its desired power absorbtion. This is accomplished by manipulating one or more of the four parameters described above for it or one or more of the layers so the system beginning with those layers where a preselected power absorbtion is not desired and possibly ending with the layer of interest until the desired power absorbtion is attained. A second layer and subsequent layers of interest can then be tuned in a similar manner. It is very likely that tuning subsequent layers will affect the power absorbtion of layers previously tuned. This is because each layer has an effect, which may vary in intensity, on the power absorbtion of all the layers in the food product.

Retuning layers previously tuned is done in a similar manner. Prioritizing layers of interest and identifying or adding layers where preselected power absorbtion is not desired may be done to produce a component food product where the layers of interest have desired power absorbtion.

It is understood that dielectrics change with temperature and will therefore change as the food product is subjected to microwave radiation. It is also understood that thickness of layers can change with temperature as in expanding cake batter. For the purposes of this invention, unless otherwise designated, dielectric properties and layer thicknesses are described as those present in the product immediately or just prior to subjecting it to a microwave field for the purposes of preparation. The invention can also be practiced by selecting values for the above-identified four parameters at the end of the heating cycle. An example of a product for which this latter method could be used is a product where surface crisping is desired. One would want to put a power disposition maximum at the desired time during the heating process at the outer surfaces and perhaps a power minimum in the interior.

As discussed above, it is believed important that the boundary between the food component layers be distinct, i.e. provide an abrupt or sharp change in impedance (or relative dielectric constants) at layer boundaries, in order to consistently achieve a desired profile of microwave power deposition within each layer of a multi-component food product. Air gaps may occur between food component layers, and it is within the scope of this invention to also adjust air gap thickness(es), or eliminate these gap(s), to achieve a desired profile of microwave power deposition within a food product. From reviewing the graphs of FIGS. 41A, B and C, it is seen, particularly for products with high $E'$ and $E''$ values that portions of the power absorbtion curves have very steep slopes as they relate to a change in a particular layer thickness. Thus, desirably, layer thicknesses are chosen at about a zero or a minimum in the absolute value of the first derivative of the power absorbtion versus thickness curve so that minor variations in thickness or composition do not adversely affect the amount of absorbed microwave energy, particularly for systems intolerant to heat uptake. Typically, this occurs at about a local maximum or a local minimum in the power absorbtion curve. For example, in FIG. 41C, desirably, the water layer thickness would be approximately 0.4 cm (local minimum), 0.75 cm (local maximum), or 1.10 cm (local minimum), etc. to achieve heating rate control. FIG. 9D illustrates a case where the power absorbtion curve has no local maximum or minimum. In this case, a minimum in the absolute value of the first derivative of the power absorbtion occurs at a thickness of approximately 0.9 cm to 1.0 cm. For the case depicted in FIG. 9D, heating rate control would be more easily attained at a thickness of approximately 0.9 cm to 1.0 cm than, for example, at thicknesses of 0.2, 0.5, or 1.5 cm. Also, the required thickness of this layer can be changed by varying the dielectric properties of the layers in the multi-component food system to achieve substantially the same result. Thus, it can be seen that a multi-component layered food system can be easily made to attain a desired power deposition profile within the food system.

The dimensional tolerance needed of any particular layer within the food product in order to gain heating rate control and thus practice the invention depends on the wavelength of microwaves, for example, at 2.45 GHz, in the layer(s) whose thicknesses may vary. In FIGS. 41A and 41B the calculated effects of varying the thickness of different layers within a multi-layer system is shown. The program in Appendix A was used to make the calculations relating to FIGS. 41A, B and C and FIGS. 42A, B and C. For the purposes of these calculations, a four-layer model system was chosen consisting of a metal pan (bottom), bread, water and oil (top). The model input parameters are given in the table below.

| | MODEL INPUT PARAMETERS: | | | | | |
|---|---|---|---|---|---|---|
| Layer # | Material | Thickness | E' | E" | cp | ρ |
| 4 top | Oil | 1.90 cm | 2.60 | 0.147 | 0.4 | 0.85 |
| 3 | Water | Varies | 76.50 | 11.100 | 1.0 | 1.0 |
| 2 | Bread | Varies | 2.85 | 0.750 | 0.5 | 0.15 |
| 1 bottom | Metal pan | 0.05 cm | — | — | — | — |

In the case shown in FIG. 41A the water layer thickness was varied within the system:

MW power→1.9 cm OIL/0–2.4 cm WATER/4.5 cm BREAD/METAL←MW power

FIG. 41A shows that the percentage power absorbed by oil, bread and water layers all show successive local maxima and minima when plotted against water layer thickness, even though in this series of runs only the water layer thickness was varied. Thus, changes in any one layer can have profound effects on power absorbtion throughout the system. The change in water layer thickness required to move along the power absorbtion vs. thickness curve from any layer's local power absorbtion maximum (or minimum) to that layer's next maximum (or minimum) is very nearly equal to one-half of the microwave wavelength in water.

| Layer # | Material | Peak-to-Peak Distance | |
|---|---|---|---|
| 4 top | Oil | 0.681 cm | |
| 3 | Water | 0.703 cm | λ/2 = 0.698 cm for WATER |
| 2 | Bread | 0.696 cm | |

In the case shown in FIG. 41B the bread layer thickness was varied within the system:

MW power→1.9 cm OIL/1.0 cm WATER/0–10 cm BREAD/METAL←MW power

FIG. 41B shows that the percentage power absorbed by oil, bread and water layers all show successive local maxima and minima when plotted against bread layer thickness, even though in this series of runs only the bread layer thickness was varied. The change in bread layer thickness required to move along the power absorbtion vs. thickness curve from any layer's local power absorbtion maximum (or minimum) to that layer's next maximum (or minimum) is very nearly equal to one-half of the microwave wavelength in bread.

| Layer # | Material | Peak-to-Peak Distance | |
|---|---|---|---|
| 4 top | Oil | 3.642 cm | |
| 3 | Water | 3.468 cm | λ/2 = 3.595 cm for BREAD |
| 2 | Bread | 3.584 cm | |

These two runs show that it is possible to predictably control microwave power absorbtion in one layer by adjusting the thickness of that layer or the thickness of another layer within the system. The degree of heating rate control which can be exerted on any layer depends on the thickness, dielectric constant and position of each layer in the entire multi-component system. Thus, FIG. 41B shows that adjusting the bread layer thickness from about 2.5 cm to about 3.8 cm. can change power absorbtion in the oil layer (layer #4) from about 10.0% to about 8.4% absorbed power, a 16% decrease. FIG. 41A however, shows that adjusting the water layer thickness from about 0.75 cm to about 0.5 cm can change power absorbtion in the oil layer from about 4.8% to about 11.6% absorbed power, a 142% increase. In another run, shown in FIG. 41C, the water layer thickness was varied within the system:

MW power→3.8 cm OIL/0–2.4 cm WATER/4.5 cm BREAD/METAL←MW power

Figure 41C:
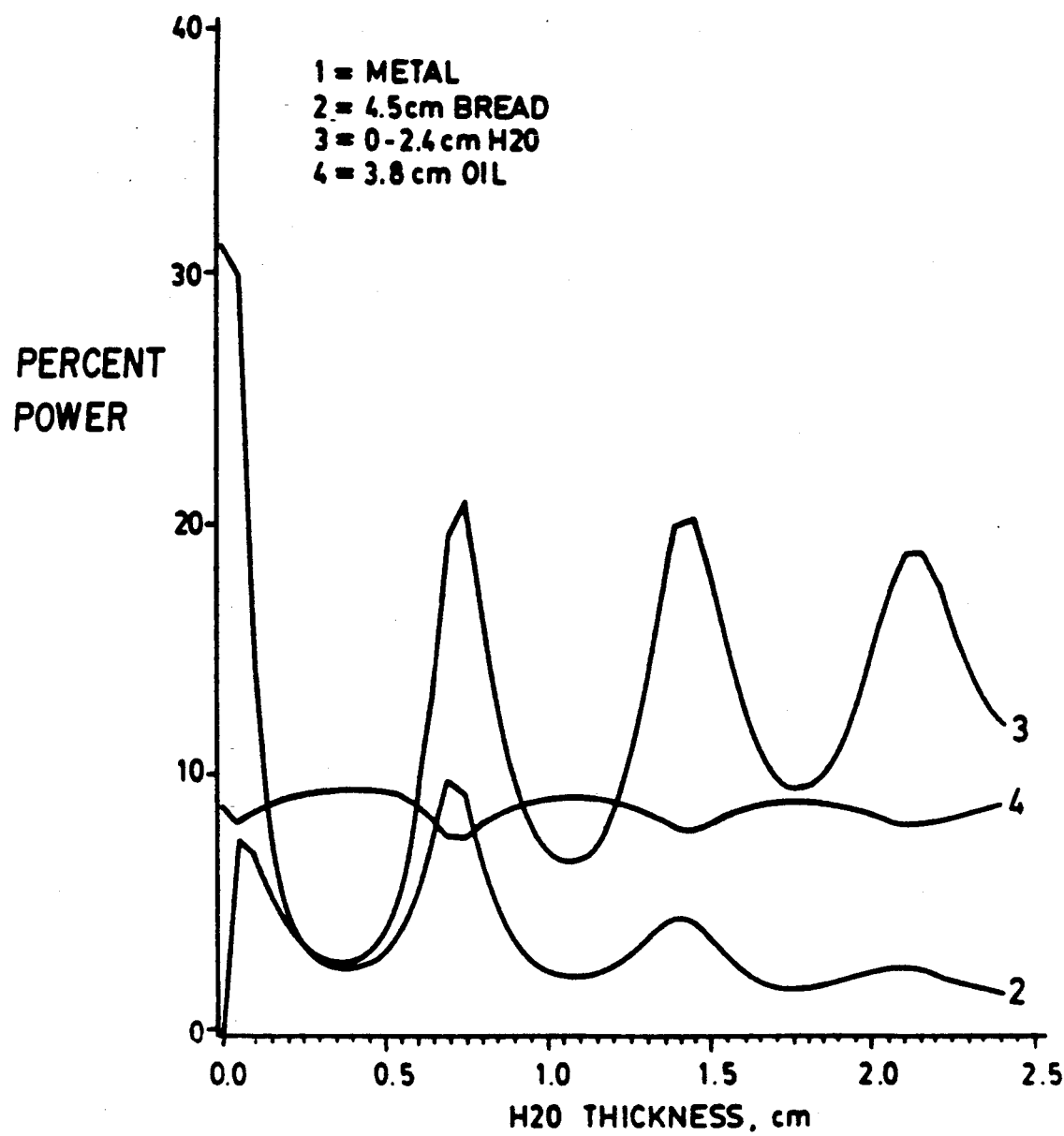

FIG. 41C shows that adjusting the water layer thickness from about 0.75 cm to about 0.40 cm can change power absorbtion in the oil layer (layer #4) from about 7.3% to about 9.4% absorbed power, a 28% increase.

This example shows that the degree of heating rate control attainable for any layer within a particular system varies in heretofore unexpected ways and can be surprisingly sensitive to thickness changes to any component in the system.

This example can be further analyzed to determine the degree of control over thickness required for each layer of a multi-component food product system in order to attain heating rate control and thus practice the invention. The system will in general be least sensitive to minor thickness variations (and thus most tolerant to manufacturing processes) when a component thickness is such that the power absorbtion vs. component thickness curve is at a local maximum or a local minimum. In FIG. 41C these local maxima and local minima occur at water layer thicknesses of about 0.40, 0.75, 1.10, 1.45, 1.75 and 2.15 cm. It is well known in mathematics that the local rate of change (the first derivative) of a curve is zero at local maxima and local minima. The system and/or its components should be such that the selected or target thickness of a component has a tolerance of less than about ±2.5% preferably less than about ±5% and more preferably less than about ±7.5% of the wavelength of the microwave in the component at the temperature just prior to exposure to microwave radiation. Likewise, the system and/or its components should be such that the selected or target thickness and "n" as described hereafter approximately obey the inequality of equation 7, preferably approximately equation 6 and more preferably approximately equation 5.

FIGS. 41C and 41B where the water and bread layer thicknesses, respectively, were varied, show that adequate heating rate control is attained when the thickness of each layer in a multi-component system does not vary from its selected target, established or average value by more than about ±7.5% of the microwave wavelength in that layer. Layer thickness can vary across a layer as previously discussed in relation to a discussion of FIGS. 9A, B and C. The wavelength in any material is a function of frequency and the dielectric constant. At 2.45 GHz, the wavelength in the material is given by equation 4. Each edible component or all edible components or any portion of the edible components have thickness at a temperature just prior to exposure to microwave radiation and the variation in the thickness for a substantial number thereof is maintained within this tolerance range of at least one of a selected and an average value of the thickness. This thickness control is for the purpose of maintaining consistent product performance for a substantial number of repetitively made similar products.

$$\lambda, cm = 12.24/n \quad (4)$$

Where:
n = Refractive index of the material,
$\sqrt{E' - iE''} = n - ik$
$\lambda$ = Microwave wavelength in the material.

Better heating rate control is attained when the thickness of each layer in a multi-component system does not vary from its target or established value by more than about ±5% of the microwave wavelength in that layer, and still better heating rate control is attained when the thickness of each layer in a multi-component system does not vary from its target or established value by more than about ±2.5% of the microwave wavelength in that layer.

Another aspect of the present invention is the ability to utilize the invention to provide consistent performance results from product to product. Once a product has been designed and found workable, it is important to ensure that each subsequent similar product or a substantial number of those products, i.e., more than 50% and preferably more than 80% of the products, are similar or substantially identical in performance capability.

In general, both layer thicknesses and dielectric constants may vary and suitable control over both of these properties is necessary to achieve heating rate control and practice the invention. The control of thickness and dielectric properties as hereafter described is for the purpose of maintaining consistency of performance of repetitively produced similar products as just described for control of thickness. The dielectric properties are those at a temperature just prior to exposure to microwave radiation. Good heating rate control can be attained if the variation in thickness and n, the real part of the square root of the complex dielectric constant as defined above, in each layer approximately obey inequality 5:

$$n\Delta t + t\Delta n < (0.075)(12.24) cm \quad (5)$$

Where: t = layer thickness, cm

Better heating rate control can be attained if the variation in thickness and dielectric constant in each layer approximately obey inequality 6:

$$n\Delta t + t\Delta n < (0.05)(12.24) cm \quad (6)$$

Still better heating rate control can be attained if the variation in thickness and dielectric constant in each layer approximately obey inequality 7:

$$n \Delta t + t\Delta n < (0.025)(12.24) cm \quad (7)$$

If the layer dimensions are fixed the heating rates of the food or edible component(s) can be controlled by manipulating one or more of the dielectric properties of the various food components to determine their wavelength therein and hence the fraction of incident power absorbed by each component in the system and therefore its heating rate and heating profile within the system.

Power absorbtion is shown in FIG. 42A.
The 1st derivative of FIG. 42A is shown in FIG. 42B.
The absolute value of 1st derivative of FIG. 42A is shown in FIG. 42C.

There are many ways to use the invention herein to achieve desired end results for a multi-layered food product in a microwave oven. There are four fundamental variables that can be manipulated: layer dielectrics, layer thickness, number of layers, and the positions of the layers relative to each other. Layers herein include oven components, package components or other components in the oven, e.g., cooking utensils. To make a product using the invention herein, these variables can be preselected, selected, varied or not considered. Desired end results include desired heating characteristics of one or more component layers of a multi-layer food product as described by any one or combination of the following measurable responses: heat to within a preselected temperature range or to a temperature within that preselected temperature range; heat within a preselected time range; heat within a preselected temperature range within a preselected time range; heat to a temperature within a preselected temperature range within a preselected time range; have a preselected deposition of power within at least one of the layers of edible components at a time just prior to exposure to microwave radiation or at a time at the end of exposure to microwave radiation; and/or have a preselected deposition of power within one or more or all of the layers of edible component at a time just prior to exposure to microwave radiation or at the end of exposure to microwave radiation; and/or have one or more of the layers of edible component heat within a desired or preselected time/temperature relationship range. An example of the desired power deposition end result would be the desire to heat on the outer surfaces of a particular layer and not in the center or vice versa.

Consequently, there are four fundamental variables and there are fifteen combinations of these four variables (order is unimportant, includes sets of 4, 3, 2 and 1 variables(s)). If the variables can be selected (or preselected), varied or not considered the number of possible combinations is eighty-one because this is considered a three-level, four-variable, full factorial, statistical design. Some of these combinations would not be useful for the purposes of design (e.g. the combination when all the fundamental variables are not considered). Any one of these variables can be individually selected or changed, or any combination of these four variables can be selected or changed. Responses from a change in one or more variables in one or more layers would be to obtain one or more of the above discussed desired end results. It has been found that the power deposition profile within food systems can be adjusted in surprising ways by manipulation of component layer thickness or its relative dielectric constant or dielectric properties since E' and E" are coupled. In certain systems the percent of incident power absorbed in a particular layer can be changed by nearly a factor of ten by manipulation of component layer thicknesses or dielectric constants. Of course the total number of responses considered expands the possibilities accordingly.

By way of example, it might be necessary to preselect the dielectric properties and/or thicknesses of one or more of the layers due to food product and/or oven and/or package constraints and it might be desired to achieve a preselected time/temperature relationship in those layers. It is then possible to vary the dielectrics of the other layers and/or thicknesses of the other layers and/or the positions of the layers and/or the number of layers to achieve this desired end result. Another application might require a preselected number and position of layers and a desired preselected disposition of power within one of the edible layers. It is then possible to vary the dielectric properties and thicknesses of one or more or all of the layers to obtain this desired end result. Another application might require preselected dielectric properties of all of the edible layers and a desired average criticality in one or more of the edible layers. It is then possible to vary the thicknesses of layers and/or the number of layers and/or the positions of layers relative to each other to obtain this desired end result.

Thus, it can be seen that the invention herein provides many ways of controlling the heating characteristics of preselected layer(s) of a food product containing one or more layers. The making of food systems with desired end results is greatly facilitated using the computer program (Appendix A) contained herein. It is possible to theoretically evaluate many combinations using this computer program and thus avoid an inefficient empirical approach to obtaining desired end results in multi-layer (or multi-component) microwave food systems. The program allows the use of interference analysis techniques to evaluate or analyze layer effects and change or manipulate responses in one or more layers of the food system and the food product can be changed in accordance with or in response to the output or results of the evaluation. A discussion of interference analysis techniques can be found in "*Dielectrics and Waves*", A. R. von Hippel, MIT Press 1954, pp. 58–60 and "*Field Theory of Guided Waves*", R. E. Collins, McGraw-Hill Co. 1960, pp. 76–96, the disclosures of which books are incorporated herein by reference.

The included computer program can be used to calculate the local heating rate within a food product-/package system without regard to heat or mass transfer. It is written in the ASYST language, available from the Macmillan Software Company and runs on an IBM PC, XT, or AT with at least 512K of memory and an 8087 mathematics coprocessor. The program calculates the local electric field at position x using interference analysis techniques and then calculates the heating rate at x using equation 2.

$$Q \text{ deg C./sec} = \frac{(2\pi)(2.45 \times 10^9)(8.854 \times 10^{-14})(E''(x))|E_{rms}(x)|^2}{4.1868 \, cp(x)\rho(x)} \quad (8)$$

Where:
$E_{rms}(x)$ = Electric field at position x cm, in volts/cm.
$cp(x)$ = Heat capacity at x, in cal/gm degree C.
$\rho(x)$ = Density at x, in gm/ml.
$E''(x)$ = Relative dielectric loss factor at position X.

Analysis of a food system begins with measurement or estimation of the food component complex dielectric constants, densities, heat capacities, and the physical dimensions for each layer in the system. The data is entered in the model, and if an undesired heating rate profile is obtained, the thickness and dielectric constant of each layer in the system can be varied systematically until more suitable results are obtained. Usually, layers whose thickness is less critical (for example to the product concept) are varied first. Sometimes, the analysis suggests addition of an air gap, for example, between the bottom product layer and the oven shelf obtained by interposing a cardboard box, whose thickness can be adjusted to optimize the product heating profile. It may be desirable to re-configure the product, for example, by changing the order in which particular food components are layered within the product. In other cases, the addition of a reflective packaging element (e.g., of metal) and an air gap of an optimized thickness may be indicated.

The program can handle metal thicknesses up to 0.05 cm. Beyond this thickness, the calculated electric fields beyond the metal layer become so small that the computer reaches an underflow condition and program execution is halted. Since the overwhelmingly preponderant effect of a "thick" (i.e. thicker than a few hundred angstroms) metal layer is to provide a reflection coefficient near −1.0 (the negative sign arises from the 180° phase change which occurs at the metal surface) the precise metal thickness used in the calculations is unimportant.

As described herein, one or more food products (or systems) either in a superposed or layered relationship or in side-by-side relationship or in single layers can be made. The foregoing analytical technique using interference analysis can be used to make a food product. To accomplish this, one first selects at least one food product and determines a time/temperature relationship range and/or final temperature within a temperature range for said food product to follow or achieve, respectively, during heating in a microwave oven. The performance characteristics, including, e.g., relative heating rate, power deposition and tolerance of the food system, food product or food products are analyzed using the interference analysis techniques. The results of the analysis are used to make an adjustment in at least one of the food products (edible components) whereby the food product (one or more of the edible components) will generally heat within the time/temperature range and reach a temperature generally within the temperature range during microwave heating. As discussed, the food product can be a plurality of food products which can be in superposed layers. A product is then made by the foregoing method.

In the method of making such a food product or products, the edible component(s) has thickness, dielectric properties and position within a microwave oven.

One or more of these properties can be adjusted individually or in any combination for the purpose that the edible component(s) will heat within a preselected time/temperature relationship range to a temperature within a preselected temperature range when exposed to microwave radiation. The foregoing interference analysis techniques can be used to analyze the food product or system particularly in relationship to its component'(s) thickness, dielectric properties and/or position and adjusting one or more of these properties either individually or in combination by applying the results of the analysis. The position, as just described, includes position of the particular component within an oven and/or relative to other edible components.

As can be seen, these analysis techniques provide results which can be used to balance the properties of at least one edible component for the purpose of estimating at least one of power and energy distribution within the food product. After a product is made, it can be tested for performance and thereafter further balancing as above described can be done so that the edible component will heat within a preselected time/temperature relationship range and/or to a temperature within a preselected temperature range when exposed to microwave radiation.

The heating characteristics or time/temperature relationship of the brownie or exposed component can be varied by varying its thickness and/or dielectric properties or free water level. Also, the heating characteristics or time/temperature relationship of the directly exposed component can be varied by varying the thickness and/or dielectric properties or free water level of an indirectly exposed control layer adjacent thereto, i.e., by varying its absorbance and reflectance as described above. Thus, the final brownie temperature can be controlled or adjusted by the control or adjustment of the indirectly exposed control layer's thickness and/or dielectric properties or free water level characteristics. For example, the brownie can remain relatively cool during heating while the sauce layer can be made to heat to a relatively higher temperature by having high absorbance and low reflectance. The brownie can be heated to a relatively higher temperature and the control layer to a relatively lower temperature by its having high absorbance and low reflectivity. Another product concept that could use this control mechanism could be a filled pastry or brownie or a product where the control layer is inside one or more surrounding products or between two or more products or layers.

An evaluation of FIGS. 9B, D, E, F, and G shows the effect of changing $E'$ and/or $E''$. A decrease in $E'$ dampens the effect of thickness on reflectance, absorbance and shielding if $E''$ remains generally constant. An increase in $E''$ also dampens the effect of thickness on reflectance, absorbance and shielding if $E'$ remains generally constant. In particular, the thickness at which successive maxima or minima occur for reflectance and absorbance are increased or decreased by decreasing or increasing, respectively, $E'$. $E'$ and $E''$ can be adjusted to achieve a desired value for at least one of absorbance and reflectance at a selected thickness so that the food product will heat within a predetermined time/temperature relationship range when exposed to microwave radiation. Conversely, the $E'$ and/or $E''$ value can be selected and the thickness adjusted to achieve the same performance characteristics. The value of $E'$ and/or $E''$ is preferably adequate to provide an acceptable tolerance for the range of or variation in product thickness.

Thus, the critical nature of thickness can be changed, e.g., reduced, making the manufacture and heating of foods less critical. Another method to control the shape of the reflectance and absorbance curves is to change the value of n and K, respectively the real and imaginary parts of the square root of the complex dielectric permittivity. As n increases, the thicknesses at which successive maxima and minima occur in the absorbance and reflectance curves decrease. As K increases, the intensity difference between successive maxima and minima in the absorbance and reflectance curves decreases. The converse of the above manipulations results in opposite changes.

$E'$ and $E''$ can be changed by changing the free water level and/or by changing the concentration of and the solutes in the food or edible product or the other components therein. Typically a change in $E'$ or $E''$ will result in a change in the other but it is possible to effect a much larger change in one than the other.

What is meant by direct exposure to microwave radiation is that on first impingement of the radiation, the radiation has not passed through another food product whereas indirect exposure means the radiation has just passed through another food. Passage through or reflection from packaging or oven components does not mean the food is not directly exposed.

It can be seen that in some circumstances one can preselect a thickness of the control layer and vary the dielectric properties or free water level to achieve the appropriate heating characteristics or time/temperature relationship of the shielded product. Also, one can preselect the dielectric properties or free water level and vary the thickness of the control layer to achieve the desired heating characteristics or time/temperature relationship of the shielded product. Still further, one can have in the product a given control layer thickness and have dielectric properties or free water level selected to achieve desired heating characteristics or time/temperature relationship of the nonshielded or exposed layer or conversely, the control layer can have given dielectric properties or a given free water level and have thickness selected to achieve the desired heating characteristics or time/temperature relationship of the nonshielded or exposed layer. Still further, in the process of making the product one can select a thickness for the control layer and vary the dielectric properties or free water level to provide the desired heating characteristics or its time/temperature relationship of the control layer or conversely, one can have selected dielectric properties or free water level and vary the thickness to provide the desired heating characteristics or time/temperature relationship of the control layer. Likewise, one can in the process of making the product select thickness and dielectric properties or free water level from within predetermined ranges of values and select values from within the range to provide the desired heating characteristics and/or time/temperature relationship in the same manners just described. Also, in the product one can have a given value of thickness or dielectric properties and free water level from within a predetermined range and have a value for the other selected from within a predetermined range.

From the above, it can be seen that the present invention can be utilized in several ways to control the disposition of microwave energy in the different components of the multi-component system. This can be accomplished by varying one or more properties over a wide range providing flexibility in product concepts.

A particularly preferred embodiment is that shown in FIG. 1 and is described hereinafter. It includes a brownie positioned in the bottom of a shielded cup having a layer of chocolate sauce positioned thereover and in contact therewith and having positioned over the sauce a layer of ice cream in contact with the sauce each contact surface being generally flat. Each layer has a substantially uniform thickness but it is particularly desired for the sauce to have a uniform thickness. The metal shield and the sauce cooperate with one another to substantially completely and preferably completely surround the ice cream to prevent leakage of microwave radiation through gaps between the shielding layer and the metal shield. When data were taken for comparison of similar or the same products the temperature probes were located in positions that were believed would provide the most valid and/or reliable data even if they were in different locations in the same or different products. The attempt was to locate the probes in constant positions relative to the geometry of the containers.

FIG. 3 shows the results of a series of experiments to test a two layer system of ice cream and sauce. The ice cream and sauce are substantially as described for the product used in the FIG. 2 experiments. FIG. 3 shows the effect of the thickness of the shielding layer on ice cream temperature for various heating times. The graphs shows that for increasing control layer (sauce) thickness, the higher the shielding effect of the shielding component. Further increases in thickness would be expected to increase the shield value but at a reduced rate. The data agrees with the theoretically obtained shield power curve of FIG. 9A. FIG. 3 was corrected for different starting temperatures to better show the results.

When viewing FIG. 3 in conjunction with FIG. 9A, it is seen that absorbance and reflectance both vary oppositely with increasing thickness with these curves having a somewhat sinusoidal shape. This means that an increase in thickness can both increase and decrease absorbtion and reflection. However, when evaluating the shielded power curve (which is total incident power minus the transmitted power), it is seen, from a practical standpoint, that an increase in thickness results in an increase in shielded power or a decrease in transmitted power with only a slight reversal of that trend after a first thickness peak or maximum. However, this change is of a minor nature and practically is of little consequence. It can be seen from these graphs that with a desired amount of shielded power that the absorbance and reflectance can be changed to change the heating characteristics of the shielding layer, i.e., it can be made to heat more or less by adjusting the dielectric properties of the shielding layer. The theoretical approach of FIG. 9A is supported by actual data taken which is illustrated in FIG. 3.

FIGS. 4, 5, 6, and 7 illustrate various temperature relationships as functions of microwave heating time for food component systems with and without a shielding layer. The brownie and ice cream components of this system are substantially as those described in the explanation of FIG. 2. FIG. 2 also includes other than an edible shielding layer, i.e., aluminum foil and silicon foam and also shows the use of two edible shielding layers with different water content. These four figures show the effect of the use of a shielding layer versus a product without a shielding layer and the effect of the amount of shielding provided by the shield layer. The graphs show that the lower the microwave transmissivity the higher the temperature differential.

FIG. 8 is a graph illustrating a functional relationship between temperature differential, shielding layer thickness and microwave heating time. The graph was generated by calculation using a model constructed with the raw data of FIG. 7. The product had a sauce with dielectric properties the same as those used in FIG. 9A.

FIGS. 9A, B, and C are families of curves showing the functional relationship between percent of reflected power, absorbed power, shielded power, and relative heating rate as functions of the shielding layer thickness. This was based on calculations using $E'$ values of 13, 26, and 39 and $E''$ values of 3.5, 7.0, and 10.5, respectively. As $E'$ and $E''$ change, the characteristics of the shielding or control effect of the intermediate layer also change, i.e., as $E'$ and $E''$ increase in value the amplitude of the variables increase and the wavelengths decrease. Higher $E'$ and $E''$ values are for higher free water level sauces.

There is currently being sold a microwaveable ice cream sundae called Hot Scoop. It contains a total product weight of 150 grams which comprises approximately 90 grams of ice cream and about 60 grams of sauce. Sauces available are a chocolate sauce, caramel sauce and a mint flavored sauce. Heating experiments were conducted on the chocolate and mint products measuring the ice cream temperature at 2 cm from the sidewall and 1 cm below the sauce layer on top and attempting to measure the sauce temperature at 2 cm from the sidewall through the top cover and into the sauce at a depth of 4 mm to 6 mm which was difficult in view of the thinness of sauce and the dynamic property of the product when it is heated, e.g., the sauce sinks into the ice cream and the ice cream comes up around the sides when heated. The sauce temperature readings, although taken as well as could be done, are probably not very accurate. The temperature differential between the sauce and the ice cream was calculated from the temperature measurements graphically depicted in FIG. 10 as a function of heating time. As shown, Hot Scoop product achieved no measurable temperature difference between the ice cream and sauce indicating that the ice cream and sauce were heating, at least where measured and as measured, at the same rate providing no differential temperature.

In contrast, by practicing the present invention, it is seen in FIG. 10 that much greater differential heating was achieved. Product against which the Hot Scoop product was tested was in a metal shielded cup as seen in FIG. 1 with a total component weight of 134 grams comprising 60 grams of ice cream, 32 grams of sauce, and 42 grams of brownie with the shielding sauce having a thickness of 0.6 cm. Further, it can be seen in FIG. 11 that the heating time of the Hot Scoop product is extremely critical while the heating time for the invention product is much more tolerant to heating time variations in a microwave oven. Also, the invention product is designed to substantially prevent movement of the layers, particularly the shield layer, substantially throughout heating. This is accomplished by having generally flat layers or coplanar layers.

To further illustrate the importance of practicing differential heating in accordance with the present invention other experiments were run. Heating experiments were conducted using a container as shown in FIG. 1 having a height of 6.03 cm, a bottom diameter of 6.98 cm, and a top diameter of the sidewall of 8.46 cm, and a 7° sidewall taper containing ice cream. In the first series of experiments, ice cream was placed in the cup and was coated entirely with a 6 mm layer of Mellocream sauce. The ice cream was standard ice cream and the Mellocream is a standard fudge sauce available from J. Hungerford Smith Company. The cup had no shielding label or lid. In these experiments using the Mellocream, the 6 mm coating of sauce weighed 120 grams. The ice cream weighed 50 grams and had a height of 27 mm giving a total weight in the cup of 170 grams and a total height of 39 mm. Temperature probes were located 18 mm in and 15 mm up, one on each side and 19 mm in and 24 mm up, one on each side to measure the temperature of the ice cream. Also, the same cup was used and contained 170 grams of ice cream, 60 mm high with no sauce. FIG. 30 shows the functional relationship between the ice cream temperature and heating time for the sauce (line B) and no sauce (line A) versions. Both were unsuccessful in retaining the ice cream quality after heating. There was no significant difference between the heating of the shielded product and the nonshielded ice cream.

A similar series of experiments were run using a similar but larger cup with no metal shielding. In this case a 12 mm thick fudge shield was used using standard ice cream and standard Mellocream fudge sauce. The cup had a bottom inside diameter of 96 mm and a top inside diameter of 106 mm and a height of 96 mm. The sauce coating was 12 mm thick and weighed 444 grams and completely surrounded the ice cream. The ice cream weighed 100 grams and had a height of 36 mm providing a total weight of product of 544 grams and a total height of 60 mm. Temperature probes were located 20 mm in and 22 mm up and 20 mm in and 45 mm up, one on each side. This product was compared to 314 grams of unshielded ice cream in the same cup. The ice cream had a height of 60 mm. FIGS. 25 and 26 show a functional relationship between temperature and microwave time showing effectiveness of the shielding layer when the thickness and the relative thermal loads are properly selected. Thus, without the proper selection of properties effective shielding is not achieved. To shield an ice cream product such as Hot Scoop only with sauce to prevent melt-down of the ice cream would require substantially more sauce and ice cream than when metal shielding is used.

In some of the following examples using ice cream, brownie and sauces in juxtaposed layers in a plastic cup the following description applies. A preferred embodiment is shown parenthetically for the products and container. The brownie is made from a brownie mix and is baked to about a 14% moisture content. Approximate formula of the brownie mix, by weight of mix, is flour 29.1% (31.0%), enrichment 0.024% (0.026%), sugar 51.8% (55.15%), shortening 7.5% (8.0%), cocoa 0.37% (2.09%), cocoa 1.96% (2.35%), cocoa 2.21% (0.40%) (the three cocoas are different), soda 0.05% (0.054%), salt 0.76% (0.81%), vanilla flavor 0.14% (0.15%), chocolate liquor 6% (0%), and albumin 0.6% (0%). Eggs, oil, (chocolate liquor) and water are added to the mix to form a batter with the approximate formula of the batter, for a dry mix with albumin (egg 5.90%), mix 71% (65.76%), Durkex 100 oil 11.6% (11.45%), (chocolate liquor 4.20%) and water 17.3% (12.70%). It is preferred that the vertical edge of the brownie when in the cup is spaced from the bottom end of the shield 4 at least 3 mm when localized heating of the brownie has occurred when positioned closer.

A brownie with a thickness of preferably above 0.5 cm. more preferably above 1.0 cm, and most preferably above 1.5 cm. The thickness of the brownie can be non-uniform and it is preferred that a major portion, preferably at least about 75% and more preferably at least 90% and most preferably all, on an area basis, is in excess of these values. The brownie should have a relative dielectric constant (E') of preferably above 1.0, more preferably above 1.5 and most preferably above 2.0 at −24° C. The brownie should have a relative dielectric loss factor (E") preferably above 0.05, more preferably above 0.10 and most preferably above 0.15 at −24° C. The dielectric properties can be non-uniform throughout the brownie due to heterogeneities and it is preferred that a major portion, preferably at least about 75% and more preferably at least about 90% and most preferably all, on a volume basis, are in excess of these values.

A preferred intermediate layer in this product is a fudge sauce and hereinafter is referred to as a "control sauce" and contains the approximate following percentages by weight of ingredients: Sugar 15.6%, corn syrup 9.2%, high fructose corn syrup 10.3%, sweet condensed milk 30.6%, shortening 8%, cocoa 7%, nonfat dry milk 1% salt 0.3%, vanilla 0.25%, starch 1.2%, alginate 0.6%, and distilled water 15.87%. Higher moisture sauces vary primarily from this formula by the amount of water therein. Another acceptable sauce is Johnston's Red Label sauce which is commercially available. For flowability, the sauce should have good shear thinning properties.

A sauce layer with a thickness of preferably above 0.2 cm, more preferably above, 0.4 cm and most preferably above 0.6 cm. The thickness of the sauce layer can be non-uniform and it is preferred that a major portion, preferably at least about 75%, and more preferably 90% and most preferably all, on an area basis in excess of these values. The sauce should have a relative dielectric constant (E') of preferably above 4.0, more preferably above 5.0 and most preferably above 6.0 at −24° C. The sauce should have a relative dielectric loss factor (E") preferably above 0.5, more preferably above 1.5 and most preferably above 2.5 at −24° C. The dielectric properties can be non-uniform throughout the sauce due to heterogeneities and it is preferred that a major portion, preferably at least about 75% and more preferably at least about 90% and most preferably all, on a volume basis, are in excess of these values.

A preferred ice cream has an overrun of 70%, a butterfat content of approximately 12%, vanilla flavor and a churned out fat content of approximately 1.25%. The fat globule size preferably is about 3 microns to about 10 microns as compared to a normal ice cream which has unchurned fat with a fat globule size of about 1 to 2 microns. It was unexpectedly found that ice cream containing a churned out fat content by weight of ice cream of about 1% to about 2% preferably about 1.2% to about 1.8% most preferably about 1.4% to 1.6% by weight of ice cream was more stable during microwave exposure. Churned out fat means that the fat globule sizes are about 3 microns to about 10 microns in diameter. The reason for improved microwave exposure stability is unclear. Normal ice cream has little or no churned out fat, about 0.3% or less by weight.

An ice cream layer with a thickness of preferably above 0.7 cm, more preferably above, 1.4 cm and most preferably above 2.1 cm. The thickness of the ice cream layer can be non-uniform and it is preferred that a major portion, preferably at least about 75%, and more preferably 90% and most preferably all, on an area basis in excess of these values. The ice cream should have a relative dielectric constant (E') of preferably below 10.0, more preferably below 8.0 and most preferably below 6.0 at −24° C. The ice cream should have a relative dielectric loss factor (E'') preferably below 4.5, more preferably below 3.5 and most preferably below 2.5 at −24° C. The dielectric properties can be non-uniform throughout the ice cream due to heterogeneities and it is preferred that a major portion, preferably at least about 75% and more preferably at least about 90% and most preferably all, on a volume basis, are in excess of these values.

An air gap can also be provided between the ice cream and should be between about 1 cm and about 2 cm.

A preferred package for single serve products is shown in FIG. 1. It has a container 3 wall thickness of 0.15 cm and is made from high density polyethylene with the dimensions as described above. It is preferred that the top 5 be 48 gauge (0.0011 cm) polyethylene of 7 pound low density polyethylene as the outer laminant with a 35 gauge (0.0009 cm) foil laminated thereon with a 1.5 ml (0.0025 cm) extrudable hot melt as the inner laminant with the foil between the inner and outer laminants. A preferred shielding label 4 material is a 48 gauge (0.0011 cm) polyethylene of 7 pound low density polyethylene material as an outer laminant with a 28 gauge (0.0007 cm) aluminum foil layer laminated between the outer laminant and a 2 mil (0.005 cm) Surlyn inner laminant. A preferred cup 3 diameter is 8.1 cm in diameter when the cup is cylindrical, but if frusto conical it is preferred that the minimum diameter be in the range of 7.0 cm to 8.5 cm inches while the height of the aluminum portion of the label is preferred to be 6.1 cm in height with the two ends electrically connected or spaced apart about 0.32 cm.

The immediately above described preferred package was found effective for heating certain food products. The package shown in FIG. 31 is another preferred package and provides some advantages over the operation of the package shown in FIG. 1. The container 20 has a wall 23 thickness of which varies from 0.06 cm to 0.08 cm and is made from high density polyethylene. As the tapered side wall 23 would approximately 7° and outside lip 21 diameter of approximately 9.97 cm. A step 22 outside diameter of approximately 9.6 cm and an outside diameter at the top of the tapered wall 23 of approximately 8.6 cm. The overall height from the bottom of the cup to the top is approximately 6.5 cm, the height of the shelf 24 in the bottom of the package is approximately 6.2 cm. The outside diameter of the bottom 25 is approximately 7.13 cm. The package 20 has a shield label 4 as described above and extends from the bottom of the shelf 24 down toward the bottom of the container 20 has a height of approximately 5.4 cm The bottom edge 26 of the label is spaced from the food product by the gap 27 by a distance of approximately 0.5 cm.

As described above for the container 3, the package 20 has a top 5.

The above described shielded cup is particularly good for the prevention of arcing in single size serving containers.

The above identified figures which are based on the three component brownie-sauce-ice cream system or the brownie and ice cream system utilize the above described brownie sauce and ice cream in a tapered sidewall cup as described. The graphs illustrate the operability of the present invention.

Many of the figures presented herein are plots of relative heating rate versus the distance from the top of the system under evaluation. Relative heating rate is calculated for any point on this curve by dividing the actual heating rate at a specific distance from the top by the highest actual heating rate occurring in the entire range of distances evaluated. Thus, the highest heating rate is given a value of 1.0 and all other heating rates are given values less than 1.0.

To show operability of the present invention the following additional examples are provided.

EXAMPLE 1

Experimentation was conducted to demonstrate the shielding effect of a cheese sauce to avoid overcooking of broccoli which is desired to be heated to a serving temperature and retain crispness. Broccoli and cheese sauce were placed in a tapered wall cup with metal shielding on the side and top as described above. The broccoli was heated both with the cheese sauce shield and without a cheese sauce shield. A shear press measurement was used to measure the crispness of the broccoli after heating. The shear press value of raw broccoli and the microwave heated broccoli with no cheese sauce and with cheese sauce was measured with the heating time being about 3 minutes and 30 seconds in a 770 watt oven. FIG. 12 shows graphically the effect of the use of a cheese layer shield on the degree of broccoli cooking. The broccoli with the cheese sauce shield was significantly crisper than the nonshielded version which was not crisp, and was only slightly less crisp than a raw broccoli. Thus, the effectiveness of cheese sauce layer to shield broccoli positioned on top of the cheese sauce is demonstrated. The broccoli was 70% stems and 30% florets cut to 1 cm to 2 cm in length and 0.8 cm to 1.5 cm in diameter. The cheese sauce had a moisture content of approximately 75.5% by weight of the cheese sauce. The cheese sauce weight was 26 grams and was 6 mm in height (thickness). The broccoli weight was 64 grams in the cheese sauce shielded version for a total weight of 90 grams and was microwaved for three minutes and thirty seconds. The unshielded version contained 90 grams of broccoli and was also microwave heated for three minutes and thirty seconds. In the unheated broccoli, 50 grams of broccoli was used. The reduced weight was due to space requirements in the cup.

EXAMPLE 2

A bread and gravy system was used in the above described tapered wall metal shielded cup having a lower layer of gravy with bread on top. This was compared to bread in an identical cup, but using two layers of bread and no gravy. The firmness of the bread was measured after heating in both systems to compare the unshielded to the shielded bread. The bread was a standard white bread cut to fit the inside diameter of the cup and the gravy was Home Style gravy made by H. J. Heinz Company. In the gravy version, 48 grams of gravy with a height of 11 mm was used and 10 grams of bread with a height of 11 mm for a total weight of 58 grams and a total height of 22 mm were microwaved for 25 seconds in a 770 watt oven. In the unshielded version, two pieces of bread, both weighing 10 grams and having a height of 11 mm, were heated for a combined total of 20 grams of product and a 22 mm height and were heated for 25 seconds in the same oven. FIG. 13 graphically shows the toughening of the bread which occurs upon further heating with a much higher toughening or pounds force per gram of bread in a system without a shield than with the shield. The testing was done on an Instron machine. A layer of Saran film was interposed between the bread and gravy to prevent moisture migration so that this would not effect the bread toughening testing.

EXAMPLE 3

A strawberry shortcake product was made using a layer of Cool Whip brand topping with a strawberry filling between it and a layer of shortcake which was on the bottom of the tapered wall cup having the metal shielded side and top. This product was compared to a similar product without the strawberry filling between the Cool Whip and shortcake. In the shielded version, the shortcake weighed 28 grams and had a height of 1.8 cm, the filling weight was 60 grams and had a height of 1 cm, the topping had a weight of 25 grams and a height of 2.2 cm for a total weight of 113 grams and a total height of 5 cm. In the unshielded version, the shortcake weighed 28 grams and had a height of 1.8 cm, topping weight of 40 grams, and a height of 3.2 cm for a total weight of 68 grams and a total height of 5 cm. Temperature probes were located 3 cm in and 3.7 cm up and 2 cm in 1 cm up, one on each side. FIGS. 14 through 17 graphically illustrate the effect of heating on these two different systems and the effectiveness of the shielding effect of the intermediate filling layer. It is interesting to note that FIG. 14 shows a relatively flat response curve after the initial increase in temperature differential for the filled version compared to the nonfilled version and that the shortcake temperature shown in FIG. 16 generally followed the same curve for both the filled and nonfilled versions. FIG. 17 shows topping temperatures illustrating the large increase in temperature of the nonfilled or nonshielded version as opposed to the shielded version. A review of FIGS. 14 through 17 indicates that the strawberry filling is acting as an absorber, not a reflector, while still providing shielding. This is indicated by the cake temperature profiles in FIG. 16.

EXAMPLE 4

An apple pie a la mode product was made in the shielded tapered wall cup as described above. Product consisted of a 50 gram layer of ice cream which was positioned over a 20 gram layer of Chef Pierre brand prebaked crumb topping which in turn was positioned over a 110 gram layer of prebaked Chef Pierre apple filling for a shield. This product was compared to 175 grams of ice cream in the same cup. The location of the two temperature probes were 4 cm up and 2 cm in and 1 cm up and 2 cm in, with one on each side at each location. FIGS. 18 through 20 graphically illustrate the heating responses of the two different products showing the effectiveness of the apple pie filling as a shielding layer.

The above examples illustrate that the present invention is an effective and tolerant way of achieving temperature differential in multi-component food systems. It shows that a low temperature differential can be achieved as well very high temperature differentials. The invention provides for the manufacture of many food items which heretofore have not been available for microwave heating. In fact, a brownie and ice cream system could not be differentially heated in any other manner if the two components are packaged together. This is achievable because of the short time required to heat foods in a microwave oven and the use of the shielding layer.

EXAMPLE 5

ONE LAYER FUDGE SAUCE/METAL OR PLASTIC PAN EXAMPLE

Fudge sauce of known dielectrics ($E'=18.00$, $E''=9.16$, temperature=23° C.) was uniformly placed in 9"×13" pans. One series was run in aluminum pans ($E'=1.0$, $E''=2.67\times10^8$, thickness=0.05 cm, heat capacity=1.2 cal/g deg C, density=2.7 g/ml) and one series was run in plastic pans ($E'=2.2$, $E''=1.1\times10^{-3}$, thickness=0.175 cm, heat capacity=0.5 cal/g deg C, density=1.0 g/ml). Each series contained three pans where the sauce was 1 cm thick and three pans where the sauce was 2 cm thick. Four Luxtron temperature measurement probes were placed at a depth of 0.45 cm and four Luxtron temperature measurement probes were placed at a depth of 0.80 cm in close proximity in each pan prior to exposure to microwaves. Heating rates were measured in a microwave oven with a glass shelf ($E'=4.05$, $E''=4.29\times10^{-3}$, thickness=0.6 cm, heat capacity=1.0 cal/g deg C, density=1.0 g/ml) and an air gap below the described product system and above the reflective floor of the oven. Average relative heating rates ratios between the two probes depths were calculated from the resultant time/temperature curves. Relative heating rate curves (see FIG. 33 for plastic pan cases and FIG. 32 for aluminum pan cases) were also obtained using the data described above and using the computer program contained herein. Predicted relative heating rate ratios were calculated from the computer generated data. These measured and predicted ratios are presented in the table below:

| Pan Type | Fudge Sauce Thickness | Predicted Heating Rate Ratio | Observed Heating Rate Ratio |
| --- | --- | --- | --- |
| Metal | 1 cm | 4.0 | 1.3 |
| Metal | 2 cm | 2.0 | 1.3 |
| Plastic | 1 cm | 0.4 | 0.9 |
| Plastic | 2 cm | 1.1 | 1.0 |

Possible causes of differences between predicted and observed values include probe placement, variations in overall sauce layer thickness, and thermal transfer (which is not accounted for by the computer program contained herein).

EXAMPLE 6

Cheese/Fudge Sauce Example

The following multi-layer food system was constructed:

| Layer | E' | E" | Thickness | Heat Capacity (cal/g deg C.) | Density (g/ml) |
| --- | --- | --- | --- | --- | --- |
| Sauce | 14.9 | 8.7 | Variable | 0.65 | 1.1 |
| Cheese | 22.0 | 18.7 | 1.00 cm | 0.70 | 1.1 |
| Plastic | 2.2 | $1.1\times10^{-3}$ | 0.18 cm | 0.50 | 1.0 |
| Metal | 1.0 | $2.7\times10^8$ | 0.05 cm | 0.20 | 2.7 |

Layers of the fudge sauce and the commercially-obtained Velveeta cheese were uniformly placed in six Tupperware pans. The cheese was placed in the bottom of these pans and fudge sauce was placed above the cheese at a thickness of 0.6 cm in three of the pans and 1.0 cm in the other three pans. The bottoms of the pans were covered with aluminum foil. Luxtron temperature probes were located at 0.4 cm from the top surface in the fudge sauce layers in all the samples and in the center of the cheese sauce layer at depths of about 1.2 cm to 1.3 cm from the top surface when the fudge layer was 0.6 cm thick and about 1.6 cm to 1.7 cm from the top surface when the fudge layer was 1.0 cm thick. Temperatures at these probe locations were measured at two second intervals for 40 seconds after exposure to microwave radiation. Heating rates were measured from these curves and the ratios of the heating rates between the probe locations were calculated. Using the computer program contained herein, predicted heating rates were obtained (see FIG. 34) and similar ratios were calculated. Comparisons of predicted and actual values are contained in the following table:

| Fudge Sauce Thickness | Predicted Heating Rate Ratio Between Probes | Observed Heating Rate Ratio Between Probes |
| --- | --- | --- |
| 0.6 cm | 1.3 | 1.8 |
| 1.0 cm | 3.0 | 2.3 |

Possible causes of difference between predicted and observed heating rate ratios include probe placement, variations in overall layer thicknesses, and thermal transfer (which is not accounted for in the computer program contained herein).

EXAMPLE 7

Fish Crisping Example

A 3 millimeter thick corrugated cardboard pad ($E'=1.00$, $E''=0.00$) was placed on the glass shelf ($E'=4.0$, $E''=4.0\times10^{-3}$, thickness=0.6 cm, heat capacity=1.0 cal/g deg C, density=1.0 g/ml) in a microwave oven. Below the glass shelf was a 0.9 cm air gap above the reflective floor of the microwave oven. On this pad was placed a susceptor with a surface resistance of about 500 ohms/square. On top of the susceptor was placed a batter-coated fish fillet of varying thickness ($E'=44.5$, $E''=10.5$, heat capacity=1.00 cal/g deg C, density=1.00 g/ml). Over the fish was a 3.17 cm air layer ($E'=1.00$, $E''=0.00$) and on top was metallized shield ($E'=1.00$, $E''=2.67\times10^8$, thickness=$5.00\times10^{-2}$ cm, heat capacity=1.2 cal/g deg C, density=2.7 g/ml). Multi-layer systems containing fillet thickness of about 1.30, 1.12, 0.93, and 0.74 were assembled in this manner and subjected to microwave preparation. Crispness of the fillets was measured by a sensory panel on a scale from 0 (not crisp) to 60 (very crisp). The table below summarizes these crispness scores.

The computer program contained herein was used to generate predicted heating rates for these four systems as shown in FIG. 35. It is observed from this figure that the relative heating rate within the fish layer varies considerably from being high on the edges and low in the center (as in the 0.74 cm and 0.93 cm samples) to low (as in the 1.12 cm and 1.30 cm samples), and that sample crispness correlated with predicted susceptor heating rate. These predictions are in good agreement with the observed crispness scores.

| Fillet Thickness | Crispness Score |
| --- | --- |
| 0.74 cm | 38 |
| 0.93 cm | 41 |
| 1.12 cm | 38 |
| 1.30 cm | 25 |

EXAMPLE 8

Theoretical Example of Brownie/Sauce/Ice Cream/Metal

Using the computer program contained herein, predicted heating rate data (see FIG. 36) on the following multi-layer system were obtained:

| Layer | E' | E'' | Thickness | Heat Capacity (cal/g deg C.) | Density (g/ml) |
| --- | --- | --- | --- | --- | --- |
| Metal | 1.0 | $2.7\times10^8$ | 0.05 cm | 1.2 | 2.7 |
| Ice Cream | 5.96 | 2.5 | 2.3 cm | 4.4 | 0.6 |
| Sauce | 11.9 | 7.0 | Variable | 0.6 | 1.1 |
| Brownie | 2.6 | $4.0\times10^{-1}$ | 1.7 cm | 0.5 | 0.7 |
| Shelf | 4.0 | $4.3\times10^{-3}$ | 0.6 cm | 0.2 | 2.23 |
| Air | 1.0 | 0.0 | 0.9 cm | 0.24 | $1.3\times10^{-3}$ |

Fudge sauce thickness was varied from 0.2 cm to 1.0 cm in steps of 0.2. It can be seen from FIG. 36 that these small changes in thickness of the sauce layer (denoted by the peaks beginning at about 2.4 cm from the top on the figure) have a large effect on the average relative heating rates of the ice cream layer (denoted by the peaks at about 1.4 cm from the top). Although the relative heating rate of the brownie (the peaks the farthest from the top) does not appreciably change in these examples, the ratio of the average relative heating rate of the brownie to the average relative heating rate of the sauce or ice cream does vary considerably. Thus, it is predicted that this system can be designed to obtain varying relative heating rates for the ice cream and sauce layer by varying the sauce layer thickness. It is also predicted that the ratio of relative heating of the brownie layer to the relative heating rate of either of the other layers can be adjusted by varying the sauce layer thickness. Therefore, it is predicted that a variety of relative heating rates and thus a variety of final preparation temperatures and/or times may be achieved by varying the chocolate sauce layer in this system.

EXAMPLE 9

Fish Sandwich (Position of Layers Example)

Relative heating rates were generated for three edible layers (two slices of bread and one slice of fish) using the computer program contained herein and the data in the table below. Two different stacking orders were evaluated. In the first stacking order the fish was placed between the two slices of bread in the conventional manner (see FIG. 37). In the second stacking order the fish was placed on top of the two slices of bread (see FIG. 38). Surprisingly, it was predicted that the fish would have a lower relative heating rate when it was on the top of the bread slices than it would have between the two bread slices. This is observed in comparing the relative heating rate curve from the top to a distance 1 cm from the top in FIG. 38 to the relative heating rate curve from 1 cm to 2 cm from the top in FIG. 37.

| Layer | E' | E" | Thickness | (cp) Heat Capacity (cal/g deg C.) | (ρ) Density (g/ml) |
|---|---|---|---|---|---|
| Bread | 2.85 | 0.75 | 1.0 cm | 0.5 | 0.15 |
| Fish | 44.5 | 10.5 | 1.0 cm | 1.0 | 1.0 |
| Shelf | 4.0 | $4.0 \times 10^{-3}$ | 0.6 cm | 0.2 | 2.23 |
| Air | 1.0 | 0.0 | 0.9 cm | 0.24 | $1.3 \times 10^{-3}$ |

EXAMPLE 10

Effect of Positioning the Product in the Oven on the Shelf or Raised

The effect of an air gap external to the product which can have an effect on heating performance is shown in FIGS. 39 and 40. These figures show a theoretical comparison of the relative heating rate in a fish sandwich and a ham sandwich as they are placed on the oven's glass shelf or raised 2.0 cm above the shelf, for example, by interposing a cardboard box. The physical parameters used in the model calculations are given below:

| | FISH SANDWICH PARAMETERS | | | | | |
|---|---|---|---|---|---|---|
| Layer # | Material | Thickness | E' | E" | cp | ρ |
| 4 (top) | Bread | 1.0 cm | 2.85 | 0.75 | 0.5 | 0.15 |
| 3 | Fish | 1.0 cm | 44.5 | 10.5 | 1.0 | 1.0 |
| 2 | Bread | 1.0 cm | 2.85 | 0.75 | 0.5 | 0.15 |
| 1 (bottom) | Air | 0–2 cm | 1.0 | 0.00 | 0.24 | $1.3 \times 10^{-3}$ |
| — | Glass shelf | 0.6 cm | 4.0 | $4.3 \times 10^{-3}$ | 0.2 | 2.23 |
| — | Air gap | 0.9 cm | 1.0 | 0.00 | 0.24 | $1.3 \times 10^{-3}$ |
| — | Metal floor | 0.2 | Conductivity = $3.5 \times 10^5$ (ohm cm)$^{-1}$ | | | |

| | HAM SANDWICH PARAMETERS | | | | | |
|---|---|---|---|---|---|---|
| Layer # | Material | Thickness | E' | E" | cp | ρ |
| 4 (top) | Bread | 1.0 cm | 2.85 | 0.75 | 0.5 | 0.15 |
| 3 | Ham | 0.5 cm | 51.8 | 29.0 | 1.0 | 1.0 |
| 2 | Bread | 1.0 cm | 2.85 | 0.75 | 0.5 | 0.15 |
| 1 (bottom) | Air | 0–2 cm | 1.0 | 0.00 | 0.24 | $1.3 \times 10^{-3}$ |
| — | Glass shelf | 0.6 cm | 4.0 | $4.3 \times 10^{-3}$ | 0.2 | 2.23 |
| — | Air gap | 0.9 cm | 1.0 | 0.00 | 0.24 | $1.3 \times 10^{-3}$ |
| — | Metal floor | 0.2 | Conductivity = $3.5 \times 10^5$ (ohm cm)$^{-1}$ | | | |

| | | MODEL RESULTS | | |
|---|---|---|---|---|
| | Layer #1 | % POWER ABSORBED | | |
| | (air gap) thickness | Bread (#4) | Meat (#3) | Bread (#2) |
| FISH | 0.0 cm | 7.1% | 50.1% | 10.7% |
| | 2.0 cm | 6.7% | 26.3% | 8.6% |
| HAM | 0.0 cm | 12.3% | 30.7% | 15.3% |
| | 2.0 cm | 12.4% | 23.1% | 13.3% |

In the fish sandwich example, the percentage power absorbed and the relative heating rate (FIG. 40) in the fish layer are quite sensitive to the air gap thickness between product and glass shelf while in the ham sandwich example, the percentage power absorbed and the relative heating rate (FIG. 39) in each layer is relatively insensitive to the air gap thickness.

APPENDIX A
© COPYRIGHT

THE PILLSBURY COMPANY 1987
ALL RIGHTS RESERVED

```
INTEGER SCALAR L

INTEGER SCALAR GLOBAL    2000 GLOBAL :=   \ ==> 2000 points, LMAX layers

INTEGER SCALAR LMAX      10 LMAX :=       \ Max # of layers permissible

INTEGER SCALAR SLICE     GLOBAL LMAX / SLICE :=

ECHO.OFF

INTEGER SCALAR L1

INTEGER SCALAR K1

INTEGER SCALAR K2

INTEGER SCALAR K3
```

```
INTEGER SCALAR K4
INTEGER SCALAR I1
INTEGER SCALAR I2
INTEGER SCALAR I3
INTEGER SCALAR I4
INTEGER SCALAR NSLICE
INTEGER DIM[ 2 ] ARRAY FLAG
INTEGER DIM[ 25 ] ARRAY C
DP.REAL DIM[ 25 ] ARRAY QM
REAL DIM[ 50 ] ARRAY XOBS
REAL DIM[ 50 ] ARRAY YOBS
REAL DIM[ 3 ] ARRAY XC
REAL DIM[ 3 ] ARRAY YC
DP.REAL DIM[ 2 ] ARRAY DS
DP.REAL SCALAR E
DP.REAL SCALAR PB
DP.REAL SCALAR PINC
DP.REAL SCALAR XSHIFT
DP.REAL SCALAR DMIN
DP.REAL SCALAR DMAX
DP.REAL SCALAR DXI
DP.REAL SCALAR STEP
DP.REAL SCALAR QMAX
DP.REAL SCALAR QMW
DP.REAL SCALAR RS
DP.REAL SCALAR RM
DP.REAL SCALAR RSI
DP.REAL SCALAR SF
DP.REAL SCALAR SB
DP.REAL SCALAR P
DP.REAL SCALAR PP
DP.REAL SCALAR F
DP.REAL SCALAR N1
DP.REAL SCALAR E1
DP.REAL SCALAR SM
DP.REAL SCALAR SM1
```

```
DP.REAL SCALAR Z
DP.REAL SCALAR T1
DP.REAL SCALAR T2
DP.REAL SCALAR DELTA
DP.REAL DIM[ GLOBAL ] ARRAY QG
DP.REAL DIM[ GLOBAL ] ARRAY QGR
DP.REAL DIM[ GLOBAL ] ARRAY XG
DP.REAL DIM[ SLICE ] ARRAY XI
DP.REAL DIM[ LMAX 4 + ] ARRAY DX
DP.REAL DIM[ LMAX 4 + ] ARRAY CP
DP.REAL DIM[ LMAX 4 + ] ARRAY RHO
DP.REAL DIM[ LMAX 4 + ] ARRAY QAVG
DP.REAL DIM[ LMAX 4 + ] ARRAY X0
DP.REAL DIM[ LMAX 4 + ] ARRAY PPA
DP.COMPLEX DIM[ LMAX 4 + ] ARRAY N
DP.COMPLEX DIM[ LMAX 4 + ] ARRAY G_
DP.COMPLEX DIM[ LMAX 4 + ] ARRAY GD_
DP.COMPLEX DIM[ LMAX 4 + ] ARRAY GD2_
DP.COMPLEX DIM[ LMAX 5 + ] ARRAY RE
DP.COMPLEX DIM[ LMAX 5 + ] ARRAY TE
DP.COMPLEX DIM[ LMAX 5 + ] ARRAY TR
DP.COMPLEX DIM[ LMAX 5 + ] ARRAY RI
DP.COMPLEX SCALAR NI
DIM[ LMAX 4 + , 1 ] STRING.ARRAY WHAT
1 STRING AA
RAD
FAST.VIDEO.PLOTS.ON
: CALC.Q  0. DUP DUP DUP DUP XG := X0 := QAVG := QG := PPA :=
0. 0. Z=X+IY DUP DUP G_ := GD_ := GD2_ :=
STACK.CLEAR 0. 0. Z=X+IY DUP DUP DUP RI := RE := TE := TR :=
N [ 1 ] 1. - N [ 1 ] 1. + / DUP RI [ 1 ] := RE [ 1 ] :=
2. N [ 1 ] * N [ 1 ] 1. + / TE [ 1 ] :=
1. N [ L ] - 1. N [ L ] + / RI [ L1 ] :=
1.D Z=0+IY N * -2.D * DPI * 12.236294D / G_ :=
-4.0D DPI * 12.236294D / PP :=
G_ DX * DUP EXP GD_ := 2.D * EXP GD2_ :=
```

```
  L1 1 DO
    I 1 + I1 := N [ I1 ] N [ I ] - N [ I1 ] N [ I ] + / RI [ I1 ] :=
    GD2_ [ I ] RE [ I ] * RI [ I1 ] +
    GD2_ [ I ] RE [ I ] * RI [ I1 ] * 1. + / RE [ I1 ] :=
    2. N [ I1 ] * N [ I1 ] N [ I ] + /
    GD2_ [ I ] RE [ I ] * RI [ I1 ] * 1. + / TE [ I1 ] :=
  LOOP
  TE [ L1 ] TR [ L1 ] :=
  1 L DO
    TE [ I ] GD_ [ I ] * TR [ I 1 + ] * TR [ I ] :=
    X0 [ I 1 + ] DX [ I 1 + ] + X0 [ I ] :=
  -1 +LOOP
  L1 4 DO
    GLOBAL 1 + I 3 - SLICE * - K4 :=
    DX [ I ] DUP SLICE FLOAT / SWAP XI []FILL
    2. DX [ I ] * XI - G_ [ I ] * EXP RE [ I ] *
    XI G_ [ I ] * EXP + TR [ I 1 + ] * E * ZMAG DUP *
    3.255364E-4 * CP [ I ] / RHO [ I ] /
    N [ I ] DUP * ZIMAG * NEG QG SUB[ K4 , SLICE ] :=
    XI X0 [ I ] + XG SUB[ K4 , SLICE ] :=
  LOOP
  0. 0. Z=X+IY DUP DUP DUP RE := TE := TR := RI :=        \ BELOW
  N [ L ] 1. - N [ L ] 1. + / DUP RI [ L1 ] := RE [ L1 ] :=
  2. N [ L ] * N [ L ] 1. + / TE [ L1 ] :=
    3 L DO                    \ BELOW beam incident on #3, the glass shelf
      I 1 - I1 := N [ I1 ] N [ I ] - N [ I1 ] N [ I ] + / RI [ I ] :=
      GD2_ [ I ] RE [ I 1 + ] * RI [ I ] +
      GD2_ [ I ] RE [ I 1 + ] * RI [ I ] * 1. + / RE [ I ] :=
      2. N [ I1 ] * N [ I1 ] N [ I ] + /
      GD2_ [ I ] RE [ I 1 + ] * RI [ I ] * 1. + / TE [ I ] :=
    -1 +LOOP
  TE [ 3 ] TR [ 3 ] :=
  L1 3 DO
    TE [ I 1 + ] GD_ [ I ] * TR [ I ] * TR [ I 1 + ] :=
  LOOP
  0. X0 [ 4 ] := \ re-define x-axis zero from BELOW to #4, first product lay
```

```
L1 4 DO
  I 1 + I1 :=  X0 [ I ] DX [ I ] + X0 [ I1 ] :=
  GLOBAL 1 + I 3 - SLICE * - K4 :=
  DX [ I ] DUP SLICE FLOAT / SWAP XI []FILL
  2. DX [ I ] * XI - G_ [ I ] * EXP RE [ I1 ] *
  XI G_ [ I ] * EXP + TR [ I ] * E * ZMAG DUP *
  PB * 3.255364E-4 * CP [ I ] / RHO [ I ] /
  N [ I ] DUP * ZIMAG * NEG REV[ 1 ] QG SUB[ K4 , SLICE ] + DUP
  QG SUB[ K4 , SLICE ] :=  MEAN QAVG [ I ] :=
LOOP
QAVG PP * 4.1868 * DX * CP * QG SUB[ K2 , I2 ] []MAX QMAX :=
RHO * PINC / PP / PPA := ;
: R.SUB   XG SUB[ K2 , I2 ] QGR SUB[ K2 , I2 ] ;
: Q.SUB   XG SUB[ K2 , I2 ] QG SUB[ K2 , I2 ] ;
: SCREEN.SET.UP
  16 GRAPHICS.DISPLAY.MODE GRAPHICS.DISPLAY AXIS.DEFAULTS
  3 VUPORT.COLOR 3 CURSOR.COLOR 0 AXIS.COLOR 0 LABEL.COLOR
  0 COLOR "  " SYMBOL XC YC XY.AUTO.PLOT SOLID ;
: HP.SET.UP
  HP7440 PLOTTER.DEFAULTS AXIS.DEFAULTS 1 AXIS.COLOR 1 LABEL.COLOR
  \ " VS 10" GRAPH.COMMAND
  VERTICAL GRID.OFF HORIZONTAL GRID.OFF
  1 COLOR "  " SYMBOL XC YC XY.AUTO.PLOT SOLID ;
: R.LABEL.SCREEN 0 COLOR NORMAL.COORDS
  .3 .98 POSITION " Relative Heating Profile" LABEL
  .35 .05 POSITION " Distance from Top, cm" LABEL
  270 LABEL.DIR .025 .8 POSITION " Relative Heating Rate" LABEL
  .975 .3 POSITION " shelf" LABEL   .05 .05 POSITION WORLD.COORDS ;
: R.LABEL.HP 1 COLOR NORMAL.COORDS
  .4 .98 POSITION " Relative Heating Profile" LABEL
  .4 .05 POSITION " Distance from Top, cm" LABEL
  90 LABEL.DIR .05 .4 POSITION " Relative Heating Rate" LABEL
  .97 .15 POSITION " shelf" LABEL   WORLD.COORDS ;
: Q.LABEL.SCREEN 0 COLOR NORMAL.COORDS
  .4 .975 POSITION " Heating Profile" LABEL
  .35 .05 POSITION " Distance from Top, cm" LABEL
```

```
  270 LABEL.DIR .025 .75 POSITION " Degrees C / Sec" LABEL

.975 .3 POSITION " shelf" LABEL .05 .05 POSITION

-1 0 SCI.FORMAT CR LABEL.SCALE.Y . ." * Y-Axis" -1 3 FIX.FORMAT

WORLD.COORDS ;

: Q.LABEL.HP 1 COLOR NORMAL.COORDS

.5 .975 POSITION " Heating Profile" LABEL

.4 .05 POSITION " Distance from Top, cm" LABEL

90 LABEL.DIR .05 .45 POSITION " Degrees C / Sec" LABEL

.97 .15 POSITION " shelf" LABEL -1 0 SCI.FORMAT CR

LABEL.SCALE.Y . ." *Y-Axis" -1 3 FIX.FORMAT WORLD.COORDS ;

: MENU.PLOT

CR ." Report:"        CR ."    REPORT.SCREEN"  CR ."    REPORT.PRN"

CR ." New Case:  GO"  CR ." Change a Layer:"   CR ."    CHANGE"

CR ." Plot:"          CR ."    PLOT.SCREEN"    CR ."    Q.PLOT.SCREEN"

CR ."    PLOT.HP"     CR ."    Q.PLOT.HP"

CR ." Scan  a Layer:" CR ."    SCAN"           CR ."    Q.SCAN" ;

: PLOT.SCREEN

SCREEN.SET.UP 0 COLOR R.SUB XY.DATA.PLOT R.LABEL.SCREEN MENU.PLOT ;

: PLOT.HP

HP.SET.UP 1 COLOR R.SUB XY.DATA.PLOT R.LABEL.HP 0 COLOR MENU.PLOT ;

: RESTORE   CR ." Calculating . .

E DUP * DUP PB * + 376.73 / PINC := CALC.Q  QG  QMAX / QGR :=

XG SUB[ K2 , I2 ] []MAX DUP DUP XC [ 2 ] := XC [ 3 ] := 300. /

DUP XSHIFT := XG + XG := PLOT.SCREEN ;

: METAL

.5 DELTA := 1 FLAG := RS DUP RM := SB .1 * * INV T1 :=

BEGIN

RS RM - 0. <=

IF

DELTA RM RS - RS / * T1 * T1 + T1 :=

FLAG [ 1 ] FLAG [ 2 ] := 1 FLAG [ 1 ] :=

FLAG [ 1 ] FLAG [ 2 ] = NOT

IF

DELTA .5 * DELTA :=

THEN

ELSE
```

```
            DELTA RM RS - RS / * T1 * T1 + T1 :=

FLAG [ 1 ] FLAG [ 2 ] := -1 FLAG [ 1 ] :=

FLAG [ 1 ] FLAG [ 2 ] = NOT

IF

DELTA .5 * DELTA :=

THEN

THEN

T1 P / Z :=   Z 10. <

IF

1. F := 0. DUP N1 := SM :=

BEGIN

1. N1 + N1 := N1 F * F :=

-1. N1 ** Z N1 ** * F / N1 / SM + SM1 :=

SM1 SM - SM1 / SM1 SM := ABS 1E-5 <

UNTIL

-.57721 Z LN - SM - E1 :=

ELSE

0. E1 :=

THEN 1. 3. 8. / Z / -

6. 10. Z * - Z 2.  - Z 3.  + Z NEG EXP * Z / 16. / +

12. Z 2. ** - Z * 16. / E1 * + SB * SF :=

SF T1 * INV RM := RS RM - RS / ABS 1E-4 <

UNTIL 1.0D SF 733.69362D * Z=X+IY CONJ SQRT ;

: INPUT.DATA

CR ."    Layer " K1 . CR ." e'  = " #INPUT

IF

CR ." e'' = " #INPUT Z=X+IY CONJ SQRT N [ K1 3 + ] :=

CR ." Layer thickness, cm = " #INPUT DX [ K1 3 + ] :=

CR ." Heat capacity, cal/g = " #INPUT CP [ K1 3 + ] :=

CR ." Density, g/ml = " #INPUT RHO [ K1 3 + ] := CR

" F" WHAT "[ K1 3 + ] ":= CR

ELSE

INTEN.ON CR ." Layer type:  A, M, or S ? " "INPUT AA " := CR INTEN.OFF

AA " A" "=
```

```
            IF
                    CR ."     Layer" K1 . ." = Air"
                    CR ."     Thickness, cm = " #INPUT DX [ K1 3 + ] :=
                    1.293E-3 RHO [ K1 3 + ] := .24 CP [ K1 3 + ] :=
                    1. 1E-9 Z=X+IY CONJ N [ K1 3 + ] := CR
                    " A" WHAT "[ K1 3 + ] ":= CR
            THEN
                AA " M" "=
            IF
                    CR ."     Layer" K1 . ." = Metal"
                    CR ." _ Thickness, cm = " #INPUT DX [ K1 3 + ] :=
                    2.71 RHO [ K1 3 + ] := 1.208 CP [ K1 3 + ] :=
                    1.0D 3.65E5 733.69362D * Z=X+IY CONJ SQRT N [ K1 3 + ] :=
                    " M" WHAT "[ K1 3 + ] ":= CR
            THEN
                AA " S" "=
            IF
                    CR ."     Layer" K1 . ." = Susceptor"
                    1. RHO [ K1 3 + ] := 1E6 CP [ K1 3 + ] :=
                    CR ."     Bulk Conductivity, (Ohm cm)^-1 = " #INPUT SB :=
                    CR ."     e Mean Free Path, cm = " #INPUT P :=
                    CR ."     Surface Resistance, Ohm/sq (typical Rs>=500) = "
                    #INPUT RS := METAL N [ K1 3 + ] := T1 DX [ K1 3 + ] :=
                    " S" WHAT "[ K1 3 + ] ":= CR
            THEN
THEN STACK.CLEAR ;
: OVEN.SET.UP
    .2 DX [ 1 ] := 1.D -3.65E5 733.69326D * Z=X+IY SQRT N [ 1 ] :=
    1. 1E-6 Z=X+IY CONJ N [ 2 ] :=
    CR ." Oven Parameter Set-up:" CR
    CR ." Incident Electric Field (V/cm) RMS = " #INPUT E :=
    CR ." Ratio of incident power BELOW/ABOVE = " #INPUT PB :=
    CR ." Distance from metal floor to glass shelf, cm = " #INPUT DX [ 2 ] :=
    CR ." Enter properties of glass shelf:"
    CR ."      e' = " #INPUT
    CR ."      e'' = " #INPUT Z=X+IY CONJ SQRT N [ 3 ] :=
```

```
    CR ."     Shelf thickness, cm = "  #INPUT DX [ 3 ] := ;

: GO    STACK.CLEAR.NORMAL.DISPLAY

" F" WHAT ":= 0. DUP DUP DUP XI := XC := YC := DX :=

1. DUP DUP YC [ 3 ] := RHO := CP := 1. Z=X+I0 N :=

CR ."                     MODEL GEOMETRY :" CR

CR ." Top     | Layer | Layer |...| Layer | Layer ||| Glass | Air | Metal"

CR ." Surface |  #n   | #(n-1)|...|  #2   |  #1   ||| Shelf | Air | Floor"

CR ."                      COPYRIGHT"

CR ."                  THE PILLSBURY COMPANY"

CR ."                       1987" CR

CR ." Enter the number of layers in your model, NOT including the oven floor

CR ." the glass shelf or the air layer between them.  Use GO to change oven

CR ." parameters.  This version of OVEN accomodates up to 10 product/package

CR ." layers, and more can be added if necessary." CR

INTEN.ON

CR ." Note that the BOTTOM LAYER is Layer #1."

CR ." Be sure CAPS LOCK is ON."

CR ." For layers of Air, Metal, or Susceptors, answer the request for e'"

CR ." with a <CR> and follow instructions."

CR INTEN.OFF   OVEN.SET.UP

CR ." # of PRODUCT/PACKAGE Layers = " #INPUT 3 + L :=  1 L + L1 :=

L1 4 DO

I 3 - K1 := INPUT.DATA

LOOP

SLICE L 3 - * I2 :=  GLOBAL 1 + L 3 - SLICE * - K2 :=  RESTORE ;

: REPORT.BODY   -1 3 FIX.FORMAT

CR ." Top     | Layer | Layer |...| Layer | Layer ||| Glass | Air | Metal"

CR ." Surface |  #n   | #(n-1)|...|  #2   |  #1   ||| Shelf | Air | Floor"

CR ." INPUT DATA:  Incident E-field =" E . . " volts/cm RMS      "

CR ."              Incident power ratio: BELOW/ABOVE =" PB .

."   =>" PINC . . " watts/cm^2"

CR ." Layer         e*          Thickness       Cp            Rho"

CR ."                              cm         cal/g deg C     g/ml" C

4 L DO

-1 0 FIX.FORMAT I 3 - . 8 4 FIX.FORMAT ."    " N [ I ] DUP * . . "
```

```
          DX [ I ] . ."           " CP [ I ] . ."            " RHO [ I ] . CR
-1 +LOOP
   ." Shelf " N [ 3 ] DUP * . ."       " DX [ 3 ] . ."
      CP [ 3 ] . ."          " RHO [ 3 ] .
CR ." Air    " N [ 2 ] DUP * . ."      " DX [ 2 ] . ."
CR ." Metal Floor " CR
4 L DO
     WHAT "[ I ] " S" "=
 IF
  CR ." SUSCEPTOR LAYER #" -1 2 FIX.FORMAT I 3 - .
         ."                   Rs, Ohm/sq = " RS . -1 2 SCI.FORMAT
   CR ."   e* (equivalent) =" N [ I ] DUP * . ."  Thickness, cm =" T1 .
   CR ."   Conductivity/(ohm cm) =" SB . ."      Mean free path, cm =" P . C
 THEN
-1 +LOOP
CR ." RESULTS:"
CR ." Layer    Heating Rate, deg C/s         %Power"
CR ."             AVG      MAX       MIN        ABSORBED" CR
4 L DO
    -1 0 FIX.FORMAT I 3 - . ."        " 6 4 FIX.FORMAT QAVG [ I ] . ."    "
    GLOBAL 1 + I 3 - SLICE * - K1 := QG SUB[ K1 , SLICE ] []MIN/MAX . ."     "
    ."        " -1 2 FIX.FORMAT PPA [ I ] 100. * . ." %" CR
-1 +LOOP ;
: MENU.REPORT
CR ." ---------------------------------------------------------------------"
CR ." Report->Printer: REPORT.PRN   New Case: GO   Change a Layer: CHANGE"
CR ." Plot:  PLOT.SCREEN, Q.PLOT.SCREEN, PLOT.HP, Q.PLOT.HP"
CR ." Scan a Layer:  SCAN, Q.SCAN" ;

: REPORT.SCREEN  NORMAL.DISPLAY REPORT.BODY MENU.REPORT ;
: REPORT.PRN     -OUT>PRINTER CONSOLE.OFF
  CR ." ---------------------------------------------------------------------
  REPORT.BODY CR "DATE "TYPE  . "  " "TIME "TYPE       CR
  CR ." ---------------------------------------------------------------------
  CR CONSOLE ;
: Q.MENU  CR ." Expt'l Data:" CR ." DATA.LOAD" CR ."  DATA.PLOT" ;
```

: Q.PLOT.SCREEN  QG SUB[ K2 , I2 ] []MAX YC [ 3 ] :=  SCREEN.SET.UP

0 COLOR Q.SUB XY.DATA.PLOT Q.LABEL.SCREEN MENU.PLOT Q.MENU

1. YC [ 3 ] := ;

: Q.PLOT.HP  QG SUB[ K2 , I2 ] []MAX YC [ 3 ] :=  HP.SET.UP

1 COLOR Q.SUB XY.DATA.PLOT Q.LABEL.HP 0 COLOR MENU.PLOT Q.MENU

1. YC [ 3 ] := ;

: LBL

-1 2 FIX.FORMAT  CR WHAT "[ I3 ] " S" "=

IF

." Rs = " RS .

ELSE

." D = " DX [ I3 ] .

THEN ;

: PLOT.SCAN

LBL R.SUB XY.DATA.PLOT NORMAL.COORDS .05 .05 POSITION WORLD.COORDS ;

: JUMP

WHAT "[ I3 ] " S" "=

IF

DMIN STEP K3 * + RS :=  METAL N [ I3 ] :=  T1 DX [ I3 ] :=

ELSE

DMAX STEP K3 * - DX [ I3 ] :=

THEN ;

: MENU.SCAN

CR ." SCAN Layer" I3 3 - . CR ." Max =" DMAX .

CR ." Min =" DMIN .     CR ." Step =" STEP . CR

CR ." New Scan:"       CR ." SCAN"        CR ." Q.SCAN"

CR ." Scan->Plotter:"  CR ." SCAN.HP"     CR ." Q.SCAN.HP"

CR ." Restore Initial" CR ."  Conditions:" CR ." RESTORE"

CR ." New Case: GO" XG XSHIFT NSLICE * - XG := ;

: SCAN.SET.UP  0. DUP QM := DS := 0 C := RS RSI :=

1 DUP DUP DUP DUP C [ 2 ] := C [ 5 ] := C [ 8 ] := C [ 11 ] := C [ 14 ] :=

2 DUP DUP DUP DUP C [ 3 ] := C [ 6 ] := C [ 9 ] := C [ 12 ] := C [ 15 ] :=

CR ." Layer #" #INPUT 3 + I3 :=  WHAT "[ I3 ] " S" "=

IF

DX [ I3 ] DXI :=  N [ I3 ] NI :=

```
    CR ." Max Rs, Ohm/sq = " #INPUT DS [ 1 ] :=
    CR ." Min Rs, Ohm/sq = " #INPUT DS [ 2 ] :=
    DS []MIN/MAX DMAX := DMIN :=
    CR ." Rs Step Size," CR ."   Ohm/sq = " #INPUT STEP :=
    DMAX DMIN - STEP / NSLICE :=
    DMIN RS :=  METAL N [ I3 ] := T1 DX [ I3 ] :=
ELSE
    DX [ I3 ] DXI := N [ I3 ] NI :=
    CR ." Max D, cm = " #INPUT DS [ 1 ] :=
    CR ." Min D, cm = " #INPUT DS [ 2 ] :=
    DS []MIN/MAX DMAX := DMIN := DMAX DX [ I3 ] :=
    CR ." Step Size, cm = " #INPUT STEP :=
    DMAX DMIN - STEP / NSLICE :=
THEN
    CR ." Calculating . ."  0. DUP XC [ 2 ] := XC [ 3 ] :=
    L1 4 DO
       XC [ 3 ] DX [ I ] + XC [ 3 ] :=
    LOOP
    XC [ 3 ] DUP XC [ 2 ] := 300. / XSHIFT :=
    1 NSLICE + 0 DO
       I K3 := JUMP CALC.Q QMAX QM [ I 1 + ] :=
    LOOP ;
: SCAN  SCAN.SET.UP QM []MAX QMW := 1. YC [ 3 ] :=
    SCREEN.SET.UP R.LABEL.SCREEN
    1 NSLICE + 0 DO
       I K3 := JUMP CALC.Q QG QMW / QGR :=
       I 1 + XSHIFT * XG + XG :=
       C [ I 1 + ] COLOR SOLID PLOT.SCAN
    LOOP
    DXI DX [ I3 ] := RSI RS :=  NI N [ I3 ] :=  MENU.SCAN ;
: SCAN.HP  HP.SET.UP R.LABEL.HP
    1 NSLICE + 0 DO
       I K3 := JUMP CALC.Q QG QMW / QGR :=
       I 1 + XSHIFT * 2. / XG + XG :=
       I 1 + COLOR SOLID PLOT.SCAN  REPORT.PRN
    LOOP
```

```
    DXI DX [ I3 ] := RSI RS :=   NI N [ I3 ] :=  0 COLOR   MENU.SCAN ;

: Q.PLOT.SCAN

LBL Q.SUB XY.DATA.PLOT NORMAL.COORDS .05 .05 POSITION WORLD.COORDS ;

: Q.SCAN   SCAN.SET.UP QM []MAX QMW := QMW YC [ 3 ] :=

SCREEN.SET.UP Q.LABEL.SCREEN

1 NSLICE + 0 DO

I K3 := JUMP CALC.Q

I 1 + XSHIFT * XG + XG := C [ I 1 + ] COLOR SOLID Q.PLOT.SCAN

LOOP

DXI DX [ I3 ] := 1. YC [ 3 ] := MENU.SCAN Q.MENU ;

: Q.SCAN.HP QMW YC [ 3 ] := HP.SET.UP Q.LABEL.HP

1 NSLICE + 0 DO

I K3 := JUMP CALC.Q

I 1 + XSHIFT * 2. / XG + XG :=

I 1 + COLOR SOLID Q.PLOT.SCAN REPORT.PRN

LOOP

DXI DX [ I3 ] := RSI RS :=   NI N [ I3 ] :=

1. YC [ 3 ] := 0 COLOR CR MENU.SCAN Q.MENU ;

: DATA.PLOT   WORLD.COORDS 2 COLOR " +" SYMBOL XOBS SUB[ 1 , I4 ]

YOBS SUB[ 1 , I4 ] XY.DATA.PLOT 0 COLOR

NORMAL.COORDS .05 .05 POSITION WORLD.COORDS ;

: DATA.LOAD  0. DUP YOBS := XOBS :=

CR ." # X-Y Pairs," CR ." 50 max = " #INPUT I4 := CR

1 I4 + 1 DO CR I . CR ." Q Deg C/Sec =" CR #INPUT YOBS [ I ] :=

CR ." Cm from TOP =" CR #INPUT XOBS [ I ] := CR LOOP DATA.PLOT MENU.PLOT

: CHANGE   NORMAL.DISPLAY CR ." Which layer do you want to change? "

#INPUT K1 := INPUT.DATA RESTORE ;

: GRO   GRAPHICS.READOUT NORMAL.COORDS 0.65 0.93 READOUT>POSITION

.5 .5 POSITION 0 CURSOR.COLOR WORLD.COORDS ;

ECHO.ON
```

What is claimed and desired to be secured by letters patent is:

1. A microwave heatable food product comprising:
   a first edible component;
   a second edible component proximate said first edible component; and
   a reflective packaging element proximate at least one of said edible components; at least one of a group of properties consisting of thickness and dielectric properties of at least one of said edible components having been adjusted and said reflective packaging element having been positioned whereby said edible components will heat to within a predetermined time/temperature relationship range during exposure to microwave radiation.

2. The food product of claim 1, the thickness and dielectric properties of said at least one of said edible components having been adjusted.

3. The food product of claim 2 wherein said second edible component is positioned between said first edible component and said reflective packaging element.

4. The food product of claim 1 wherein said reflective packaging element comprises a metal shield.

5. The food product of claim 1, the thickness of said at least one of said edible components having been adjusted.

6. The food product of claim 1, the dielectric properties of said at least one of said edible components having been adjusted.

7. The food product of claim 6, a free water content of said at least one of said edible components having been adjusted.

8. The food product of claim 6, an E' value of said at least one of said edible components having been adjusted.

9. The food product of claim 6, an E" value of said at least one of said edible components having been adjusted.

10. A method of making a microwave heatable food product, said method comprising:
providing a first edible component;
providing a second edible component proximate said first edible component;
providing a reflective packaging element proximate at least one of said edible components; and
adjusting at least one of a group of properties consisting of thickness and dielectric properties of at least one of said edible components and positioning said reflective packaging element whereby said edible components will heat to within a predetermined time/temperature relationship range during exposure to microwave radiation.

11. The method of claim 10 wherein said adjusting step comprises adjusting the thickness and dielectric properties of said at least one of said edible components.

12. The method of claim 10 wherein said adjusting step comprises adjusting the thickness of said at least one of said edible components.

13. The method of claim 10 wherein said adjusting step comprises adjusting the dielectric properties of said at least one of said edible components.

14. The method of claim 13 wherein said adjusting step comprises adjusting a free water content of said at least one of said edible components.

15. The method of claim 13 wherein said adjusting step comprises adjusting an E' value of said at least one of said edible components.

16. The method of claim 13 wherein said adjusting step comprises adjusting an E" value of said at least one of said edible components.

17. A method of controlled microwave heating of a food product comprising:
placing a food product in a microwave oven, said food product having a first and second edible components and a reflective packaging element proximate at least one of said edible components, at least one of a group of properties consisting of thickness and dielectric properties of at least one of said edible components having been adjusted and said reflective packaging element having been positioned whereby said food product will heat to within a predetermined time/temperature relationship range during exposure to microwave radiation; and
exposing said food product to microwave radiation for a time period sufficient to heat said food product to a temperature within a predetermined range.

18. The method of claim 17, the thickness and dielectric properties of said at least one of said edible components having been adjusted.

19. The method of claim 17, the thickness of said at least one of said edible components having been adjusted.

20. The method of claim 17, the dielectric properties of said at least one of said edible components having been adjusted.

21. The method of claim 20, a free water content of said at least one of said edible components having been adjusted.

22. The method of claim 20, an E' value of said at least one of said edible components having been adjusted.

23. The method of claim 20, an E" value of said at least one of said edible components having been adjusted.

* * * * *